US011946633B1

(12) United States Patent
Olsson et al.

(10) Patent No.: US 11,946,633 B1
(45) Date of Patent: Apr. 2, 2024

(54) SUBMERSIBLE LIGHT FIXTURE WITH MULTILAYER STACK FOR PRESSURE TRANSFER

(71) Applicant: SeeScan, Inc., San Diego, CA (US)

(72) Inventors: Mark S. Olsson, La Jolla, CA (US); John R. Sanderson, IV, Panama City, FL (US); Jon E. Simmons, Poway, CA (US); Brian P. Lakin, Escondido, CA (US); Steven B. Weston, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

(21) Appl. No.: 17/335,044

(22) Filed: May 31, 2021

Related U.S. Application Data

(63) Continuation of application No. 16/278,689, filed on Feb. 18, 2019, now Pat. No. 11,029,015, which is a
(Continued)

(51) Int. Cl.
*F21V 31/00* (2006.01)
*F21V 3/04* (2018.01)
(Continued)

(52) U.S. Cl.
CPC .............. *F21V 31/005* (2013.01); *F21V 3/04* (2013.01); *F21V 3/06* (2018.02); *F21V 5/04* (2013.01); *F21V 7/00* (2013.01); *F21V 15/01* (2013.01); *F21V 23/005* (2013.01); *F21V 23/0442* (2013.01); *F21V 23/06* (2013.01); *F21V 29/507* (2015.01); *F21V 29/70* (2015.01);
(Continued)

(58) Field of Classification Search
CPC . F21V 31/005; F21V 3/04; F21V 3/06; F21V 5/04; F21V 7/00; F21V 15/01; F21V 23/005; F21V 23/0442; F21V 23/06; F21V 29/507; F21V 29/70; F21V 21/30; F21Y 2101/00; F21Y 2105/10; F21Y 2115/10
See application file for complete search history.

(56) References Cited

U.S. PATENT DOCUMENTS 4,683,523 A * 7/1987 Olsson .................... F21V 31/00 362/158
4,996,635 A * 2/1991 Olsson .................... F21V 31/00 362/267
(Continued)

OTHER PUBLICATIONS

USPTO Patent Trial and Appeal Board, Decision on Appeal 2017-002392 for U.S. Appl. No. 12/844,759, PTAB Decision, Dec. 21, 2017, U.S.

*Primary Examiner* — Tsion Tumebo
(74) *Attorney, Agent, or Firm* — Steven C. Tietsworth, Esq.; Michael J. Pennington, Esq.

(57) ABSTRACT

Lighting apparatus for high pressure underwater use are disclosed. In one embodiment the lighting apparatus comprises a housing for withstanding ambient exterior pressure at a depth of approximately 500 feet or more, a transparent pressure bearing window positioned at a forward end of the housing, and a multilayered stack for bearing substantially all of the loading applied to the transparent pressure bearing window at a depth of approximately 500 feet or more disposed in the housing behind the transparent pressure bearing window is disclosed.

19 Claims, 44 Drawing Sheets

Related U.S. Application Data continuation of application No. 15/069,953, filed on Mar. 14, 2016, now Pat. No. 10,215,394, which is a continuation of application No. 13/930,511, filed on Jun. 28, 2013, now Pat. No. 9,285,109, which is a continuation of application No. 12/844,759, filed on Jul. 27, 2010, now Pat. No. 10,352,550.

(60) Provisional application No. 61/229,693, filed on Jul. 29, 2009.

(51) Int. Cl.

| | |
|---|---|
| ***F21V 3/06*** | (2018.01) |
| ***F21V 5/04*** | (2006.01) |
| ***F21V 7/00*** | (2006.01) |
| ***F21V 15/01*** | (2006.01) |
| ***F21V 21/30*** | (2006.01) |
| ***F21V 23/00*** | (2015.01) |
| ***F21V 23/04*** | (2006.01) |
| ***F21V 23/06*** | (2006.01) |
| ***F21V 29/507*** | (2015.01) |
| ***F21V 29/70*** | (2015.01) |
| ***F21Y 101/00*** | (2016.01) |
| ***F21Y 105/10*** | (2016.01) |
| ***F21Y 115/10*** | (2016.01) |

(52) U.S. Cl.

CPC ........... *F21V 21/30* (2013.01); *F21Y 2101/00* (2013.01); *F21Y 2105/10* (2016.08); *F21Y 2115/10* (2016.08)

(56) References Cited

U.S. PATENT DOCUMENTS

| | | | | |
|---|---|---|---|---|
| 7,303,301 | B2 | 12/2007 | Koren et al. | |
| 9,151,484 | B1 * | 10/2015 | Olsson | F21V 31/00 |
| 2005/0111222 | A1 * | 5/2005 | Olsson | F21V 25/04<br>362/267 |
| 2006/0187653 | A1 * | 8/2006 | Olsson | F21V 5/041<br>362/111 |
| 2007/0139913 | A1 * | 6/2007 | Savage | F21V 31/04<br>362/101 |
| 2008/0273327 | A1 * | 11/2008 | Wilcox | F21V 5/007<br>362/311.06 |
| 2009/0180281 | A1 * | 7/2009 | Ahland, III | F21V 29/763<br>362/234 |
| 2011/0019416 | A1 * | 1/2011 | Poissonnet | F21S 8/00<br>362/249.02 |
| 2018/0352121 | A1 * | 12/2018 | Chapman | H04N 23/56 |

* cited by examiner

SUBMERSIBLE LIGHT FIXTURE WITH MULTILAYER STACK FOR PRESSURE TRANSFER

CROSS-REFERENCE TO RELATED APPLICATIONS

This application is a continuation of and claims priority to U.S. Utility patent application Ser. No. 16/278,689, entitled SUBMERSIBLE LIGHT FIXTURE WITH MULTILAYER STACK FOR PRESSURE TRANSFER, filed Feb. 18, 2019, which is a continuation of and claims priority to U.S. Utility patent application Ser. No. 15/069,953, now U.S. Pat. No. 10,215,394, entitled SUBMERSIBLE LIGHT FIXTURE WITH MULTILAYER STACK FOR PRESSURE TRANSFER, filed Mar. 14, 2016, which is a continuation of and claims priority to U.S. Utility patent application Ser. No. 13/930,511, now U.S. Pat. No. 9,285,109, entitled SUBMERSIBLE LED LIGHT FIXTURE WITH MULTILAYER STACK FOR PRESSURE TRANSFER, filed Jun. 28, 2013, which is a continuation of and claims priority to U.S. Utility patent application Ser. No. 12/844,759, now U.S. Pat. No. 10,352,550, entitled SUBMERSIBLE LED LIGHT FIXTURE WITH MULTILAYER STACK FOR PRESSURE TRANSFER, filed Jul. 27, 2010, which claims priority under 35 U.S.C. § 119(e) to U.S. Provisional Patent Application Ser. No. 61/229,693, entitled SUBMERSIBLE LED LIGHT FIXTURE WITH LAMINATE STACK FOR PRESSURE TRANSFER, filed Jul. 29, 2009. The content of each of these applications is incorporated by reference herein in its entirety for all purposes.

This application is also related to co-assigned U.S. patent application Ser. No. 12/036,178, entitled LED ILLUMINATION SYSTEM AND METHODS OF FABRICATION, filed Feb. 22, 2008 and to co-assigned U.S. patent application Ser. No. 12/185,007, entitled DEEP SUBMERSIBLE LIGHT WITH PRESSURE COMPENSATION, filed Aug. 1, 2008. The content of each of these applications is incorporated by reference herein in its entirety for all purposes.

FIELD

This disclosure relates generally to light fixtures for use in underwater applications or other applications subject to high pressures. More particularly, but not exclusively, the disclosure relates to deep submersible light fixtures that incorporate light emitting diodes (LEDs) as illumination elements.

BACKGROUND

Semiconductor LEDs have largely replaced conventional incandescent, fluorescent and halogen lighting sources in many applications due to their long life, ruggedness, color rendering, efficacy, and compatibility with other solid state devices.

In marine applications, LEDs are becoming more widely accepted for their energy efficiency, instant on-off, color purity, and vibration resistance. However, the underwater environment presents problems for lighting devices due to high pressures, especially at depth.

SUMMARY

In accordance one aspect, the disclosure relates to a submersible luminaire including a housing and a transparent pressure bearing window positioned at a forward end of the housing. Window supporting structure is mounted in the housing behind the transparent window. A water-tight seal is located between the window and the housing. A circuit element is configured and positioned within the housing behind the window supporting structure to bear at least some of the pressure applied to the transparent window. At least one solid state light source is mounted on the circuit element behind the transparent window.

Various additional aspects, features, and functions are further described below in conjunction with the appended drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Overview

Figure 1:
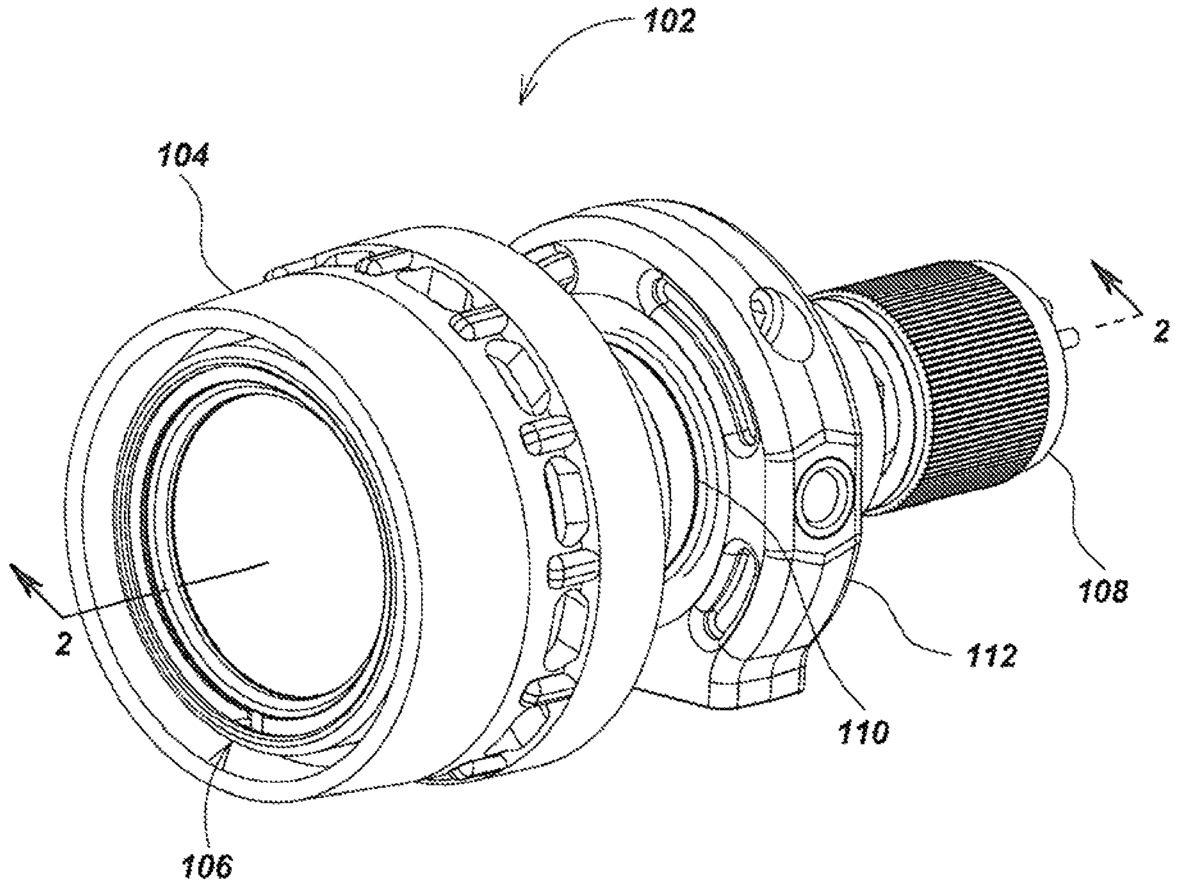
FIG. 1 is an isometric view of the exterior of an embodiment of the present invention in the form of an underwater multilayer LED light fixture.

Light emitting diodes (LEDs) are now the most efficient light source widely available, having surpassed High Intensity Discharge (HID) lamps in lumens/watt. For underwater application, a design must use either a pressure-protected housing to isolate the LEDs from ambient pressure, or immerse the LEDs in an inert, non-conductive fluid-filled pressure compensation environment. There are disadvantages to fluid-filling an LED light, notably with light beam control and contamination of the LED phosphor coating. Thus, a preferred embodiment protects the LEDs from external pressure rather than using a fluid-filled pressure compensation design.

LEDs project light from the front while heat must be conducted from the back. LED light fixtures as described in U.S. patent application Ser. No. 12/036,178 of Mark S. Olsson, et al., filed 22 Feb. 2008 entitled "LED Illumination System and Methods of Fabrication," provide for such conductive dissipation. The entire disclosure of said application is hereby incorporated by reference. Use of a sapphire window, as illustrated in alternate embodiments of the present invention, provides high light transmissivity as well as high thermal conductivity. The sapphire window allows excess heat to be drawn out of the front of the fixture as well as through the rear metallic housing, and into a surrounding cooler environment, such as the deep ocean. A specific advantage of the present invention is the ability to draw additional heat away from a printed circuit board (PCB) by conductive transfer of heat through a multilayer stack overlaying the front of the PCB and optionally connected by a plurality of metallic screws to the rear heat sink. This effectively creates a second path for heat transfer away from the LEDs, as heat is then passed both forward through the sapphire window, and to the rear to exit through the metallic light body into the surrounding cooler environment. This design innovation will allow brighter lights in smaller packages.

Recent manufacturing developments reduce the size of the LED package to only a few times the die footprint itself. Examples of suitable solid state light sources for use in underwater laminate include Cree Incorporated's XP series, Philips Lumileds Lighting Company's Luxeon Rebels, and OSRAM Opto Semiconductor's OSLON. A subtle, but important implication of the LED package miniaturization is that the respective size of the open land area around the LEDs is increased and may be used for structural support of a clear window with a minor unsupported aperture over the plurality of LEDs.

The present invention provides a light fixture wherein a multilayer stack provides a waterproof and pressure resistant barrier for an LED array mounted to one side of a PCB. As will be illustrated, each layer within the stack provides a clear and distinct function, and together comprises a unique solution to underwater lighting design.

Under increasing external pressure, the clear window presses on a multilayer stack which distributes that load around the LEDs and onto the surface area of the PCB located between the LEDs. This PCB rests on an underlying light head that is structurally able to bear the full compressive pressure load of the deep ocean environment.

According to one embodiment of the present invention, a surface mount LED light, fixture includes a metal core printed circuit board (MCPCB) having a rear side and a front side. A plurality of LEDs is mounted to the front side of the MCPCB. A flat LED spacer made of an electrically non-conductive high compressive strength material is placed over the MCPCB with apertures cut to fit around the ceramic bases of each individual LED. Above this is a flat window support spacer made of high compressive strength material with apertures cut to fit around the silicone domes of each individual LED. The height of the window support spacer may be reduced by manually trimming the silicone dome on each LED if desired. Alternately, the height of the window support spacer may be lengthened and the apertures increased in size to allow the use of beam forming apparatus such as reflectors or lenses. The use of one or more thin layers of Kapton plastic sheet within the multilayer stack allows for the compliant and uniform distribution of pressure over the full area by eliminating point loading, and additional electrical isolation of the LED electrical circuit. The clear window is supported by the multilayer stack. An O-ring between the window and the light head body seals the light fixture interior from the exterior environment. Alternate embodiments of the present invention may use a radial seal, a face seal, or any other seal type without restriction.

The ability of the clear window of any material to survive high external pressures with a non-pressure compensated interior volume comes from its ability to resist the stress imposed by the external pressure. Designers can optimize combinations of material strength, thickness, geometric shape, and aperture size to provide the strength and rigidity to resist maximum design pressure. The clear windows may be made from any one of several clear materials including borosilicate glass (Pyrex®), sapphire, or clear plastic sheet, such as acrylic (Plexiglas®), polycarbonate (Lexan®), or transparent nylons. Clear plastic window materials whose yield strength is reduced by exposure to heat are still useful in LED light fixtures which have adequate ability to conductively dissipate heat into the local environment thereby keeping the window from reaching its Vicat softening point or heat deflection temperature. The advantages of the sapphire window were mentioned earlier.

The LED light fixtures of the present invention are able to conduct excess heat through the metallic light head body, to the surface of the light head body, then into the surrounding fluid or gas environment in which the LED light fixture is immersed. LEDs may be mounted to the PCB with a substrate of flexible circuit material, thermally conductive plastic, metal, ceramic, diamond, or other material with a high heat transfer coefficient. One embodiment uses an MCPCB made with copper, aluminum, steel, or other thermally conductive ferrous or non-ferrous metal as the central core. Ceramic and synthetically grown diamonds are alternative materials that would function as a central core. An alternate embodiment incorporates LEDs mounted to substrate of flexible circuit material that is held in firm and uniform contact with the light head body, which acts as the heat sink.

An alternate embodiment of this invention incorporates a self-adjusting face seal groove that permits manufacturing variation in the multilayer stack-up height, maintaining the optimum O-ring groove depth dimension, while allowing the multilayer stack to take the full compressive load.

FIG. 1 illustrates an embodiment of the present invention in the form of an underwater multilayer LED light fixture 102. A cowl 104 surrounds and protects a light head subassembly 106 which is slightly recessed below the level of the front opening of the cowl 104. An underwater electrical connector 108 is mounted on the rear of a housing 110, permitting connection to an electrical power supply (Not illustrated). A mounting bracket 112 grips the exterior of the housing 110.

Figure 2:
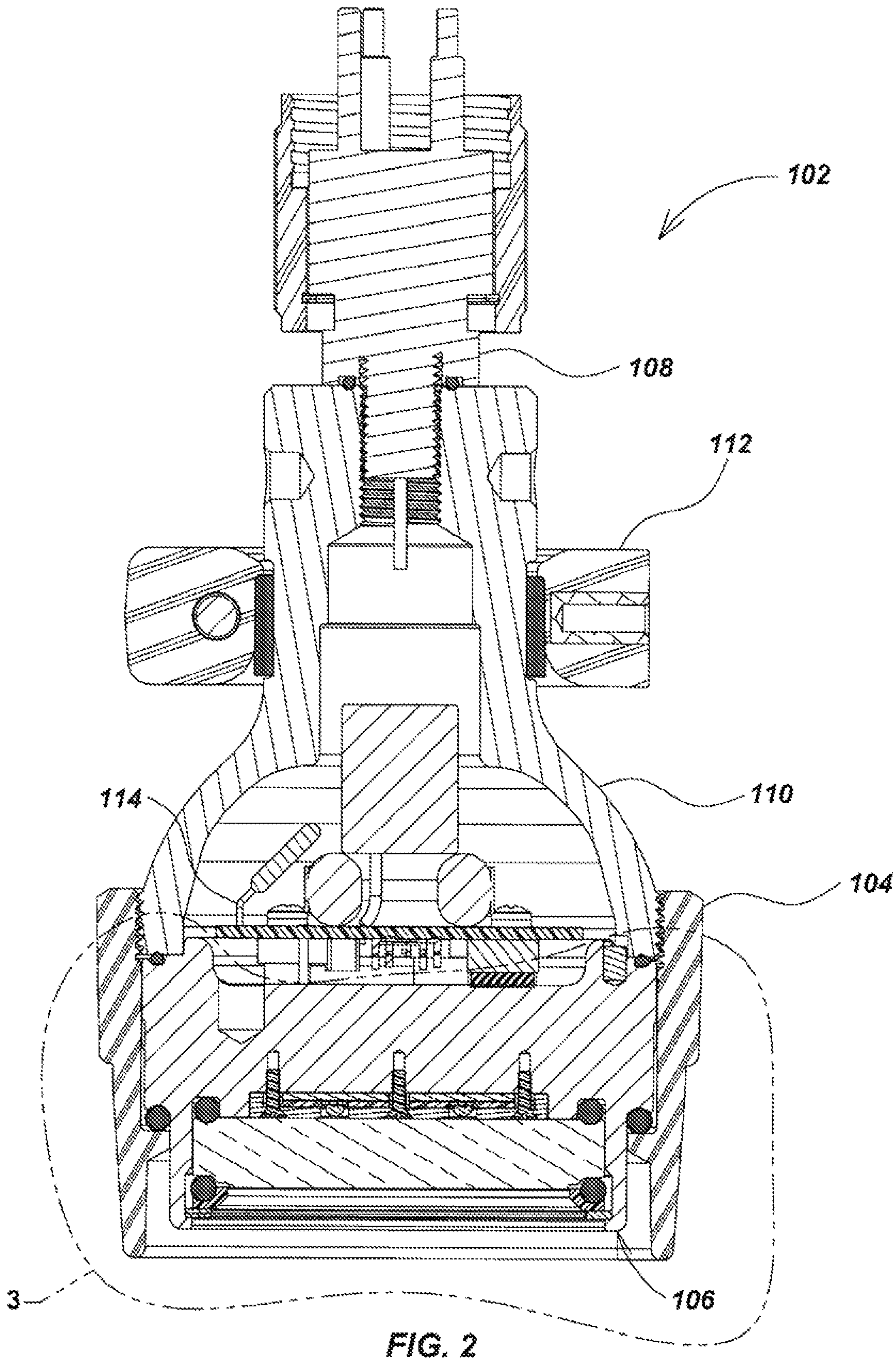
FIG. 2 is a vertical sectional side view of the underwater multilayer LED light fixture of FIG. 1 taken along line 2-2 of FIG. 1.

Illustrated in FIG. 2 are the cowl 104, the light head subassembly 106, the underwater electrical connector 108, the housing 110, the mounting bracket 112, and an electronics driver circuit board 114 to convert and condition input electrical power and supply constant current to the LEDs.

Figure 3:
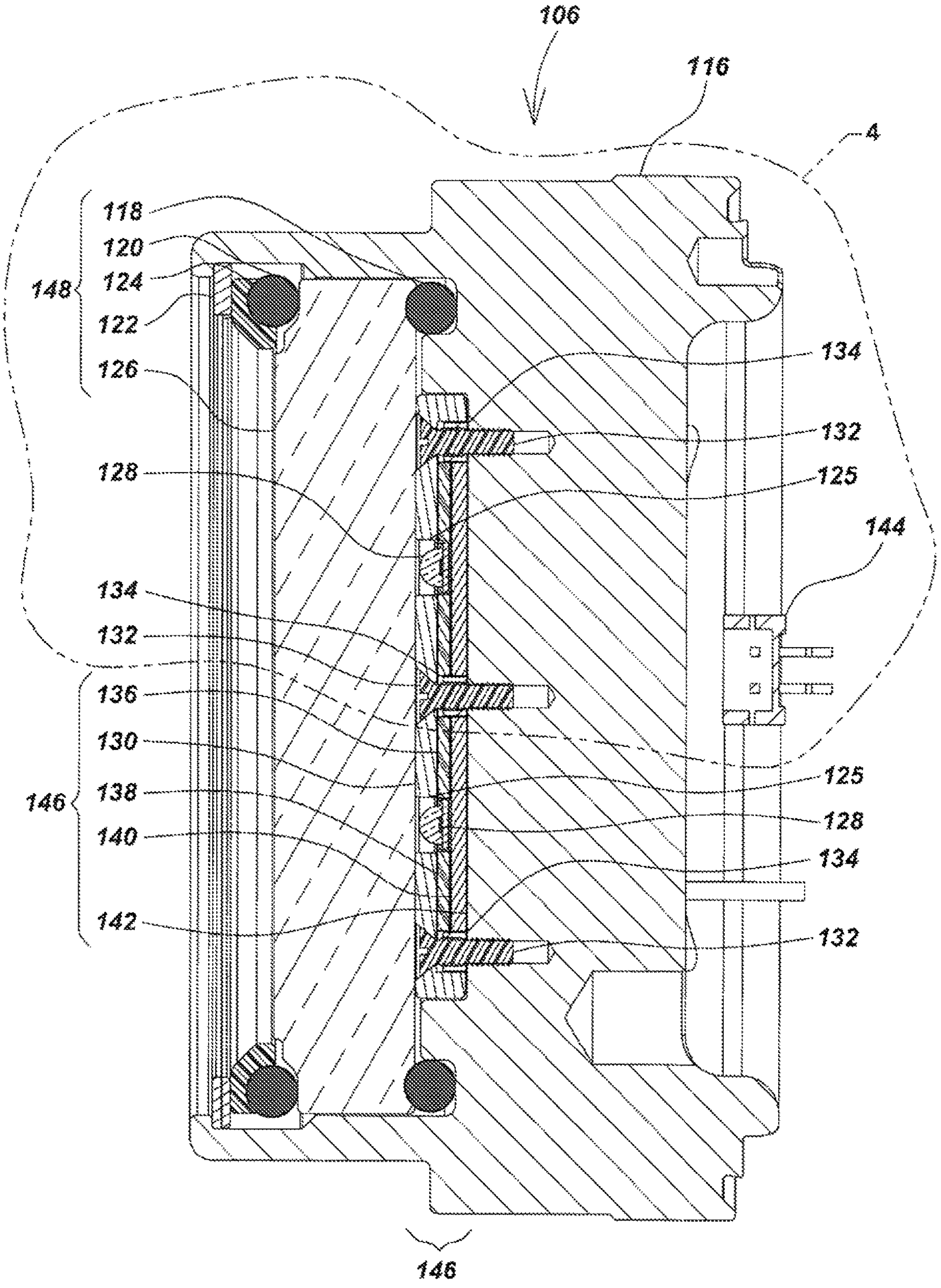
FIG. 3 is an enlarged fragmentary view of a light head subassembly of FIG. 2 illustrating the details of one embodiment of a multilayer stack.

Referring to FIG. 3, the light head subassembly 106 includes a multilayer stack 146 comprised of a window support spacer 130, a front Kapton sheet 136, an LED spacer 138, a light engine printed circuit board 140, and a rear Kapton sheet 142. The light engine printed circuit board 140 is populated with a plurality of LEDs 128. The window support spacer 130, the front Kapton sheet 136, and the LED spacer 138 have a plurality of apertures 125 through which the plurality of LEDs 128 may protrude. Other elements illustrated include a generally cylindrical housing in the form of a light head body 116, a retaining ring 122, an O-ring retainer 124, a window front O-ring 120 used for initial compressive loading of a window 126, a window face seal O-ring 118, a plurality of recessed flat head screws 132, a plurality of flat head screw insulating sleeves 134, and an electrical connector 144 for connecting the electronics driver circuit board 114 in FIG. 2, to the plurality of LEDs 128.

The window support spacer 130 and the LED spacer 138 are first a high compressive strength material to resist the compressive force of ambient pressure at depth, such as, but not limited to, PEEK plastic, ULTEM, ceramic, or a common metal such as aluminum, steel, copper, or zinc. The window support spacer 130 may be machined, injection molded or die cast. In one embodiment, the light head body 116 is machined from a thermally conductive metal, such as an aluminum alloy, that will assist with heat transfer away from the plurality of LEDs 128 and the light engine printed circuit board 140. In alternate embodiments, the light head body 116 may be made by one of several alloys of beryllium-copper alloy, stainless steel, titanium alloy, cupronickel alloy, or any other metal or metal alloy, or a thermally conductive plastic. The window 126 may be made from clear plastic, borosilicate glass, sapphire, or other transparent materials. A sapphire window is particularly desirable since its hardness will resist scratching and its high coefficient of heat transfer will help dissipate heat from the plurality of LEDs 128.

The window face seal O-ring 118 rests in a groove in the light head body 116, and provides a water tight, pressure resistant seal to the window 126. The window front O-ring 120 provides a compliant pre-load to compress and energize the window face seal O-ring 118, but does not serve a sealing function. The O-ring retainer 124 holds the window front O-ring 120 in position. The multilayer stack 146 is compressed and retrained by a window and retainer subassembly 148 comprised of the retaining ring 122, the O-ring retainer 124, the window front O-ring 120, the window 126, and the window face seal O-ring 118. Under increasing external pressure found at deeper ocean depths, the window 126 is pressed inwards, through the multilayer stack 146, but around the plurality of LEDs 128 which are within the plurality of apertures 125, and directly to the light head body 116.

Figure 4:
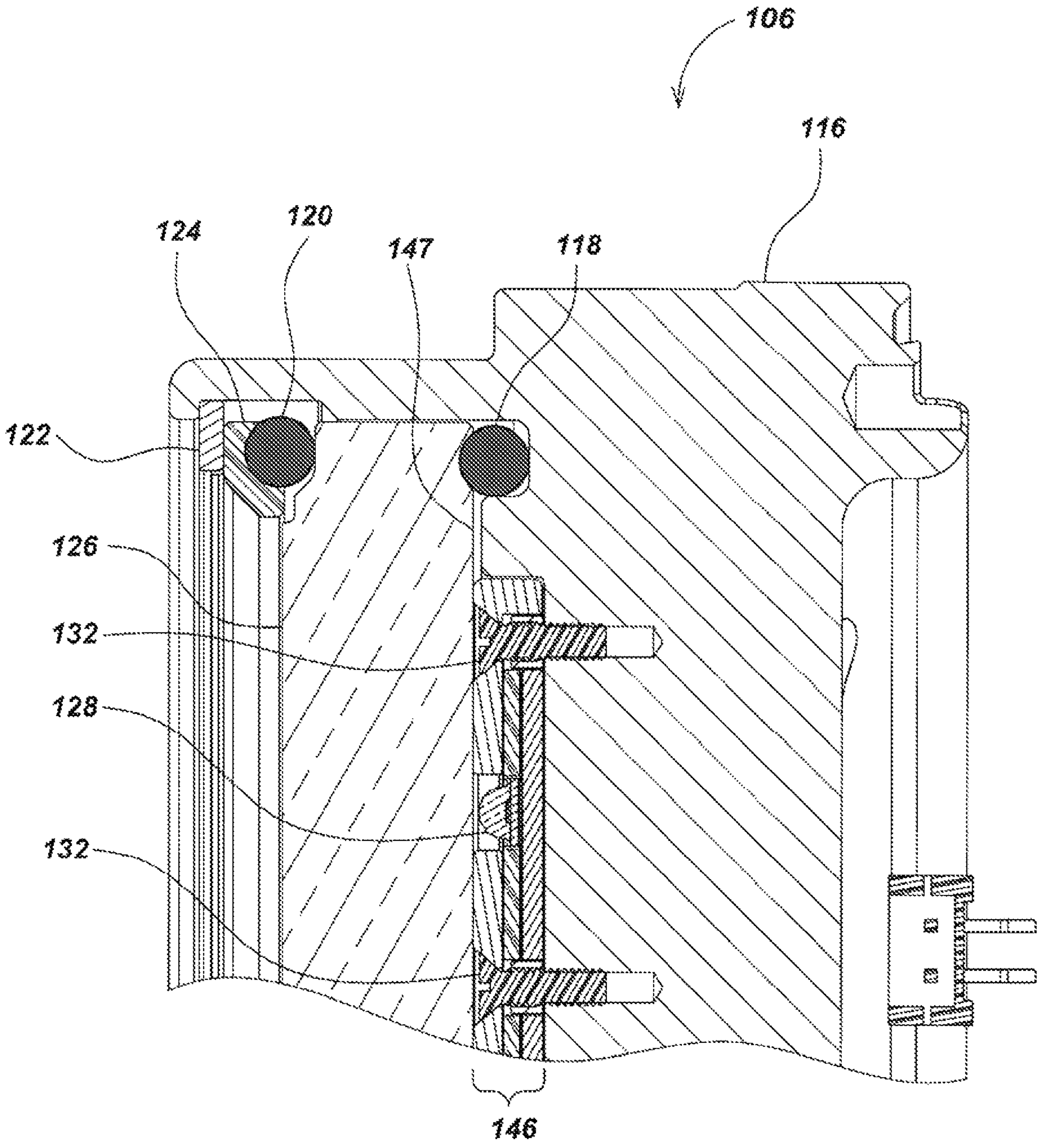
FIG. 4 is an enlarged fragmentary section view of a portion of FIG. 3.

FIG. 4 illustrates the window sealing approach in the light head subassembly 106. The window face seal O-ring 118 is in a compressed state due to compressive pre-load pressure from the window front O-ring 120, the O-ring retainer 124, and the retaining ring 122. The window 126 is in full contact with the multilayer stack 146 in this view. There is a gap 147 between the window 126 and the light head body 116 in the area between the inside diameter (ID) of the window face seal O-ring 118 and the outside diameter (OD) of the multilayer stack 146. The gap 147 is exaggerated to illustrate the embodiment of the invention in which the multilayer stack 146 takes the full compressive load of the window 126 pressing on it, with no support of the window 126 provided directly by the light head body 116. The gap 147 between the window 126 and the area between the ID of the window face seal O-ring 118 and the OD of the multilayer stack 146 is controlled to be within industry accepted O-ring high pressure seal gap tolerances. While under increasing external pressure with increasing depth, the additional compressive load is transferred through the multilayer stack 146 to the light head body 116. The plurality of LEDs 128 and the plurality of recessed flat head screws 132 are recessed below the top surface of the multilayer stack 146 and do not bear any of the load induced by external pressure. The plurality of recessed flat head screws 132 are thermally-conductive to provide additional pathways for excess heat from the light head body 116, to pass through the multilayer stack 146, and be conducted out through the window 126. In the full assembly, the multilayer stack 146 is supported by the light head body 116 which takes the compressive force generated by high external pressure on the window 126.

Figure 5:
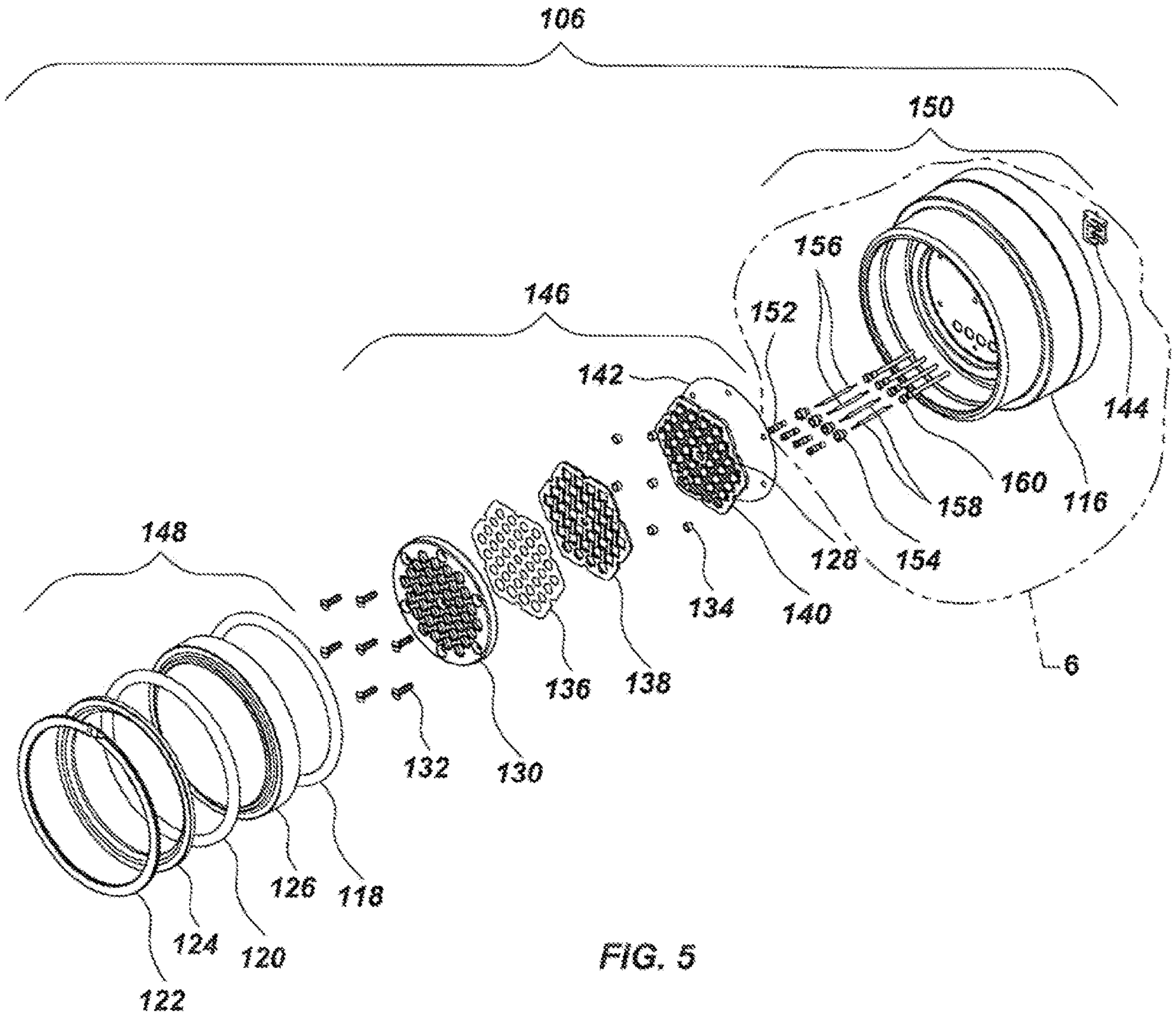
FIG. 5 is an isometric exploded view of the light head subassembly of FIG. 3.

FIG. 5 illustrates the longitudinal relationship of the components of the light head subassembly 106. The three principle groups are the window and retainer subassembly 148, the multilayer stack 146, and a light head body subassembly 150. The window and retainer subassembly 148 includes the retaining ring 122, the O-ring retainer 124, the window front O-ring 120, the window 126, and the window face seal O-ring 118. The multilayer stack 146 includes the window support spacer 130, the front Kapton sheet 136, the LED spacer 138, the light engine printed circuit board 140, and the rear Kapton sheet 142. The light engine printed circuit board 140 is populated with the plurality of LEDs 128. Additionally, the multilayer stack 146 contains within its structure the plurality of recessed flat head screws 132, and the plurality of flat head screw insulating sleeves 134. The light head body subassembly 150 includes a plurality of spring loaded electrical contacts 152, a plurality of flanged insulating washers 154, a plurality of insulated copper wires signifying polarity, black wires for negative 156, and red wires for positive 158, a plurality of shrink tubing segments 160, the light head body 116 and the electrical connector 144.

Figure 6:
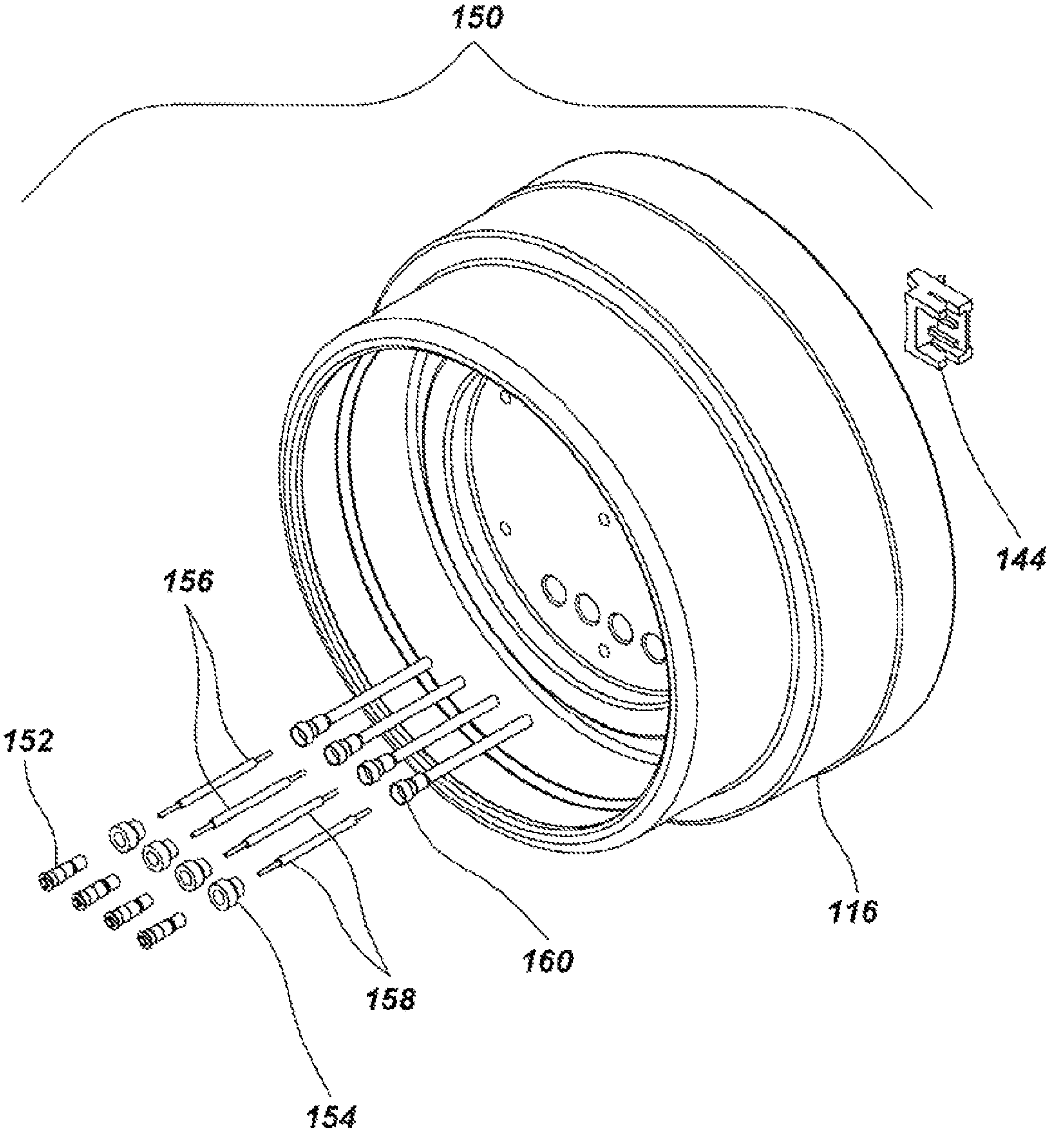
FIG. 6 is an enlarged fragmentary portion of FIG. 5.

Referring to FIG. 6, the light head body subassembly 150 includes the plurality of spring loaded electrical contacts 152, each passing through the plurality of flanged insulating washers 154, to the plurality of insulated copper wires signifying polarity, the black wires for negative 156, and the red wires for positive 158. The plurality of shrink tubing segments 160 provides a second layer of insulation. The wires pass through the light head body 116 and terminate in the electrical connector 144. The arrangement brings electrical power from the electronics driver circuit board 114 (not illustrated) to the LED light engine circuit board 140 (not illustrated).

Figure 7:
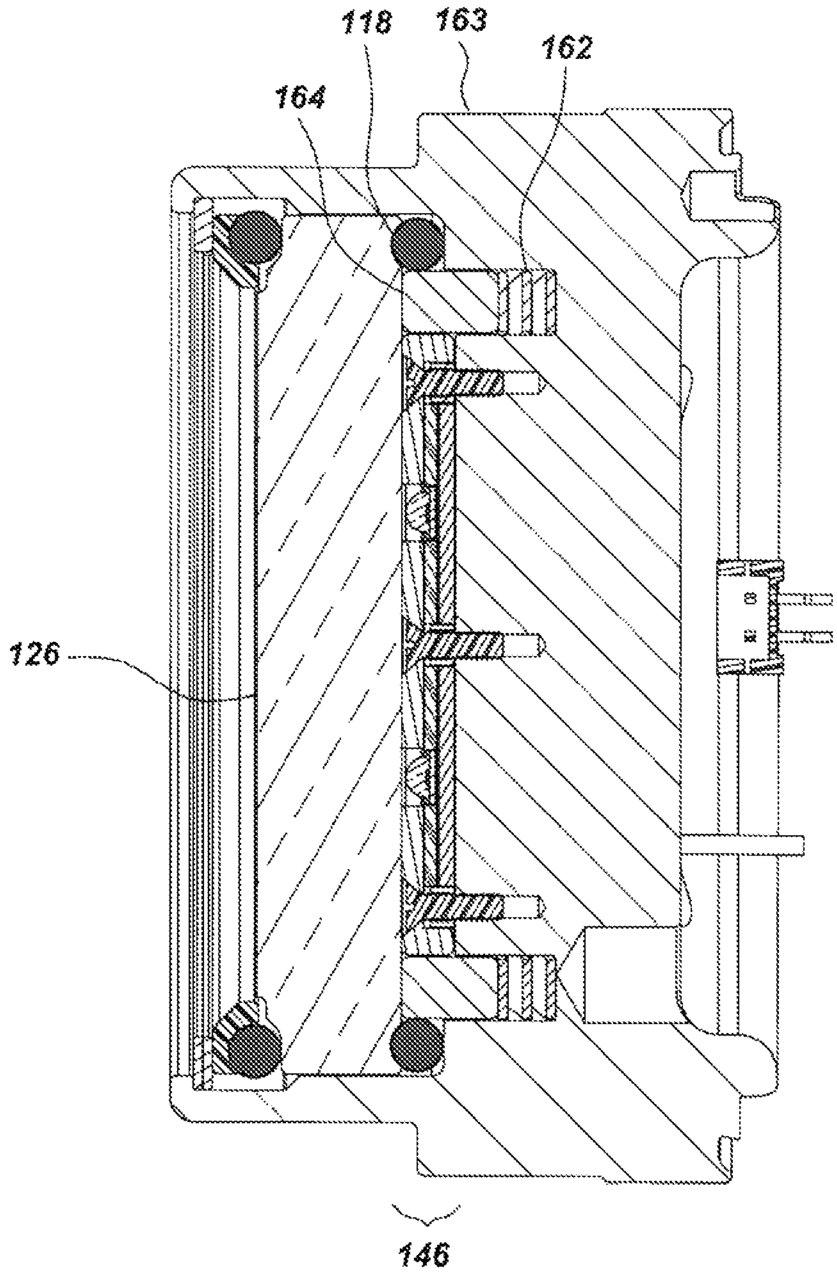
FIG. 7 is an enlarged section view of an alternate embodiment of the present invention incorporating a floating groove ring in the light head subassembly.

FIG. 7 illustrates an alternate embodiment of the present invention, incorporating a spring or wave washer 162, in a grooved light head body 163 used to energize a floating groove ring 164 as part of the window seal. In the full assembly, the spring or wave washer 162 presses the floating groove ring 164 against the interior face of the window 126, creating the interior wall of a standard O-ring groove for the window face seal O-ring 118. The floating groove ring 164 provides minimal, if any, support to the window 126, and substantially all of the full compressive load is carried solely by the multilayer stack 146.

Figure 8:
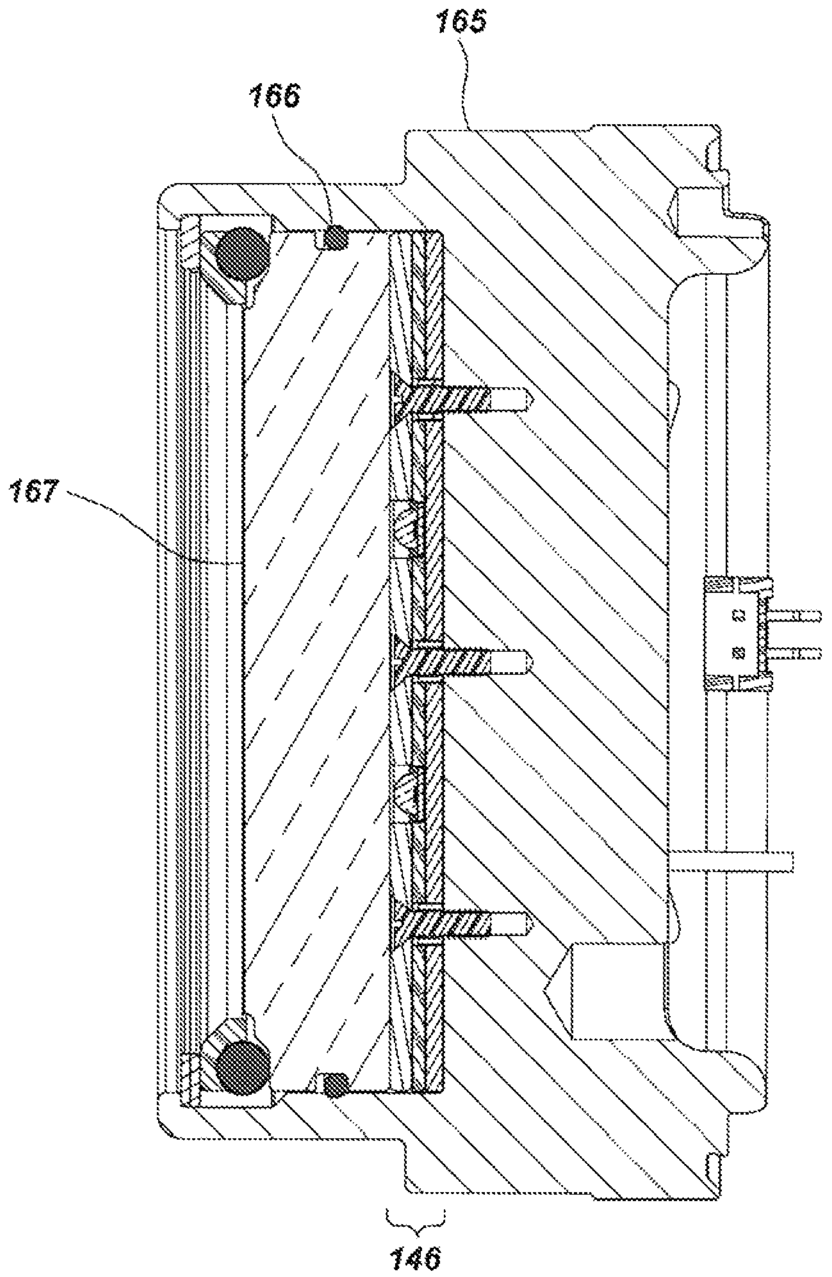
FIG. 8 illustrates an enlarged section view of an alternate embodiment of the present invention incorporating a radial seal O-ring installed in the light head subassembly window.

FIG. 8 illustrates an alternate embodiment of the present invention that uses a light head body 165, incorporating a radial seal O-ring 166 installed in a groove cut into a window 167. This construction eliminates the tight tolerance of the multilayer stack 146 with respect to the window face seal O-ring 118 illustrated in FIG. 3, providing a simple machined bore.

Figure 9:
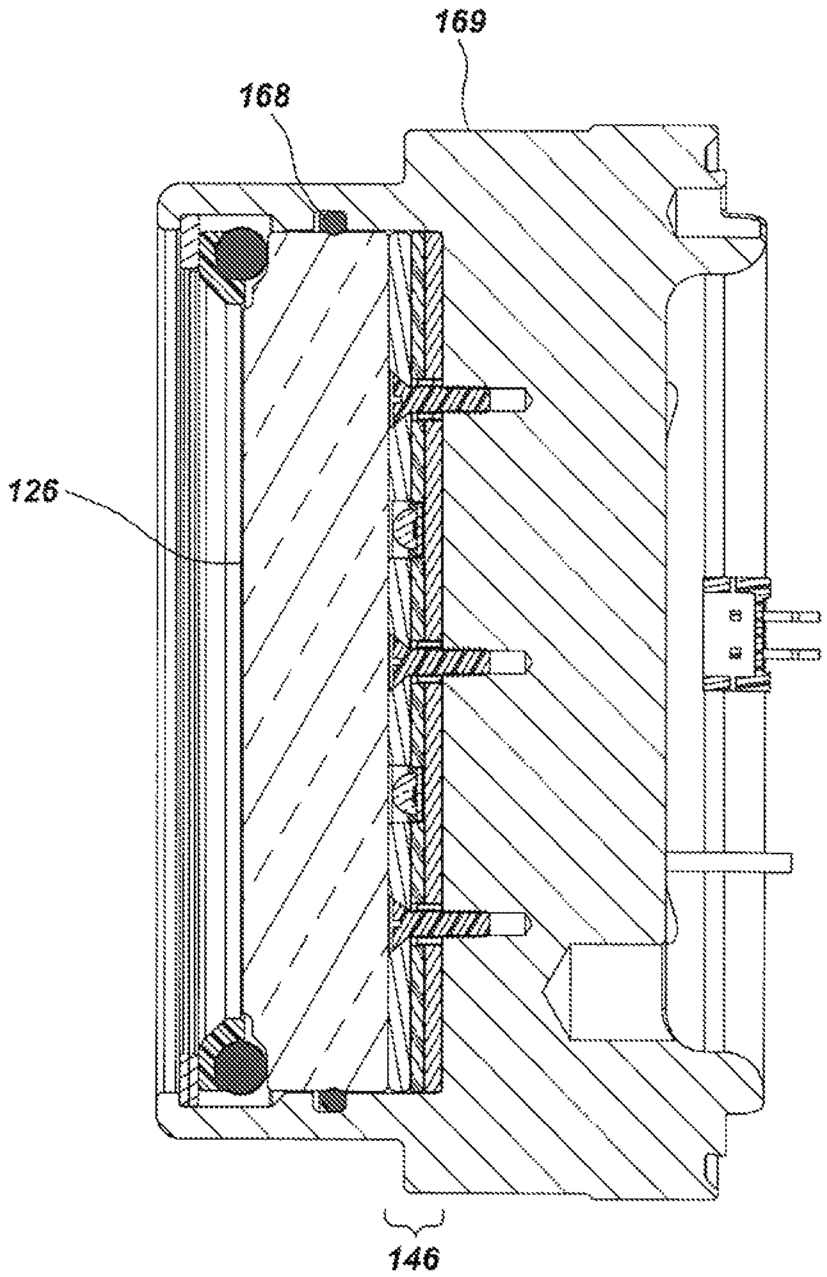
FIG. 9 illustrates an enlarged section view of an alternate embodiment of the present invention incorporating a radial seal O-ring installed in the light head subassembly body.

FIG. 9 illustrates an alternate embodiment of the present invention that uses a light head body 169, incorporating a radial seal O-ring 168 installed in a groove cut into the light head body 169 to eliminate the tight height tolerance of the multilayer stack 146 with respect to the window face seal O-ring 118 illustrated in FIG. 3. The window 126 can thereby be a simpler cylindrical shape.

Figure 10:
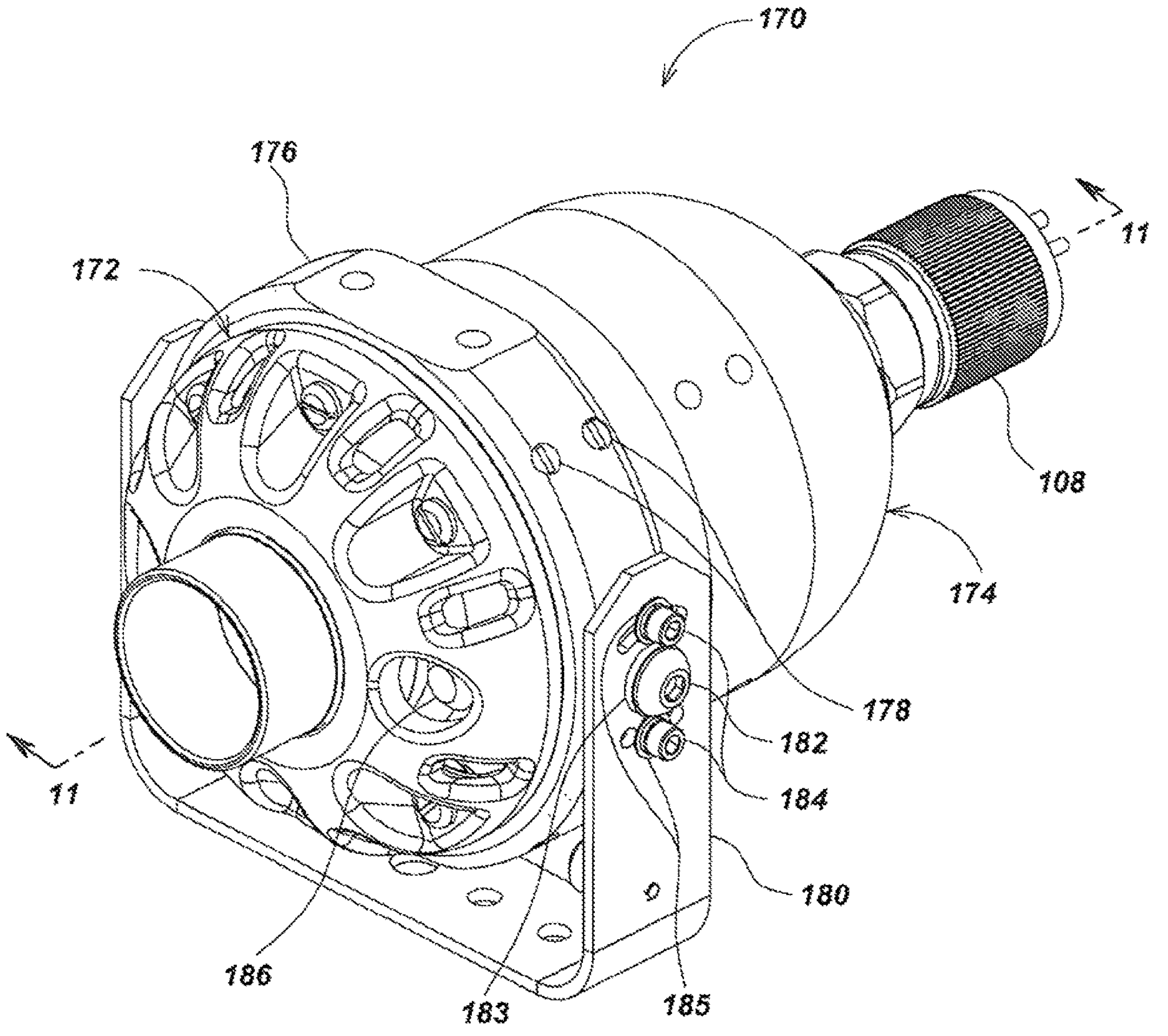
FIG. 10 is an isometric view of the exterior of an embodiment of the present invention in the form of a single multilayer LED light fixture.

FIG. 10 illustrates an alternate embodiment of the present invention that uses a single multilayer LED light fixture 170. A single light head subassembly 172 is attached to a driver subassembly 174, and held by a coupling collar 176, using a plurality of ball tipped glass-filled nylon screws 178. The underwater electrical connector 108 connects the single multilayer LED light fixture 170 to an electrical power source. A mount 180 is attached to the coupling collar 176 by a large centering screw 182, a large centering screw flat washer 183, a plurality of retaining screws 184, and a plurality of retaining screw flat washers 185. A range of angular adjustment of the light head is permitted by loosening the plurality of retaining screws 184, and rotating the single multilayer LED light fixture 170 around the large centering screw 182 within the range of the slots cut into the mount 180. A plurality of sacrificial anodes 186, made of a material galvanically less noble than the single light head subassembly 172 and the driver subassembly 174, provides galvanic corrosion protection.

Figure 11:
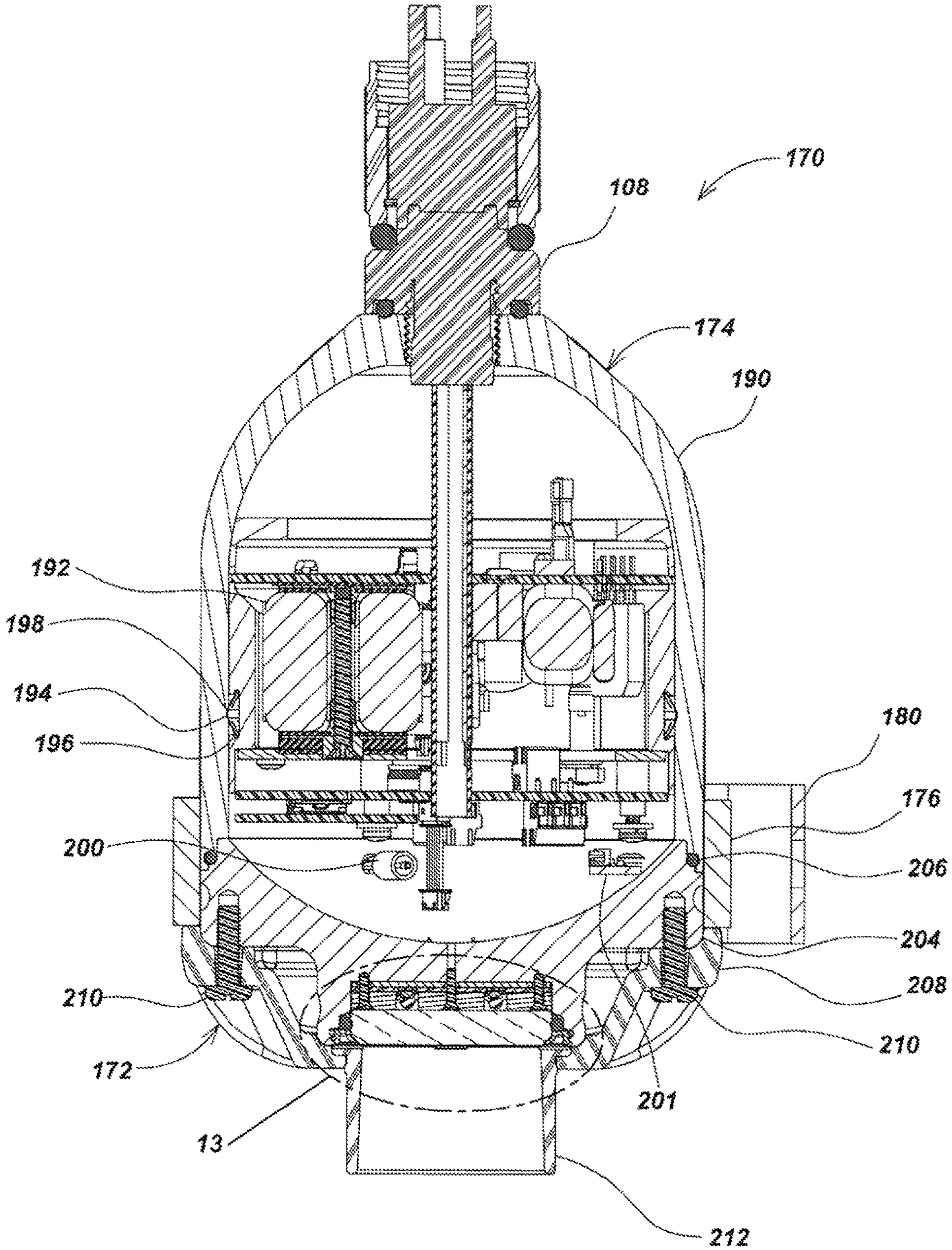
FIG. 11 is a vertical section view of the single multilayer LED light fixture of FIG. 10 taken along the line 11-11 of FIG. 10.

Referring to FIG. 11, the single multilayer LED light fixture 170 is comprised of the driver subassembly 174, and the single light head subassembly 172, held together by the coupling collar 176, and sealed against outside pressure by the pressure resistant housing O-ring 206. The driver subassembly 174 is comprised of a pressure resistant driver housing 190, to which is mounted the underwater electrical connector 108. The underwater electrical connector 108 brings electrical power to an electronic driver subassembly 192.

An outside groove 196 cut into the outside diameter of the electronic driver subassembly 192 holds a circular beryllium-copper spring 194. The circular beryllium-copper spring 194 functions as a positioning and retaining device, locating the electronic driver subassembly 192 inside the pressure resistant driver housing 190 which has an inside groove 198 cut into the inside diameter. The circular beryllium-copper spring 194 further functions to absorb vibrations imposed on the electronic driver subassembly 192, and improves thermal coupling to remove excess heat from the electronic driver subassembly 192 to the surrounding cold ocean. The circular body of the electronic driver subassembly 192 further functions as an internal ring to support the pressure resistant driver housing 190, which allows the housing to function to a greater depth. A grounding tap 200 provides for a common electrical ground. A thermal sensor board 201 measures the temperature of the single light head subassembly 172 as part of the electronic driver subassembly 192. If an overheat condition were to occur as detected by the thermal sensor board 201, the electronic driver subassembly 192 rolls back the current delivered to the plurality of LEDs 128, thereby lowering the heat of the single light head subassembly 172. The electronic driver subassembly 192 also contains a thermal sensor integrated within its circuitry to self-monitor its own temperature. If an overheat condition occurs as detected by the thermal sensor integrated into the electronic driver subassembly 192, it rolls back the current delivered to the plurality of LEDs 128, thereby lowering the heat developed by the driver itself. The response of the electronic driver subassembly 192 to an overheat condition can be one of linear rollback, where gradual increasing temperature is cause for uniform reduction of current. In the case of rapid overheat, where the rate of change of increasing heat appears to be exponential, the electronic driver subassembly 192 can roll back at a compounded higher rate to prevent thermal overshoot or thermal runaway.

The single light head subassembly 172 includes a pressure resistant housing end cap 204, which is aligned and held to the pressure resistant driver housing 190 by the coupling collar 176. The pressure resistant housing O-ring 206 seals the housing, and prevents seawater from entering the interior space. A plastic bumper guard 208 is attached to the pressure resistant housing end cap 204 by means of a plurality of machine screws 210. The plurality of machine screws 210 may be made from either marine grade metal or high strength plastic. An optional light tube 212 provides for a sharp light beam edge cut-off. The mount 180 allows for attachment of the light to a larger underwater structure.

Figure 12:
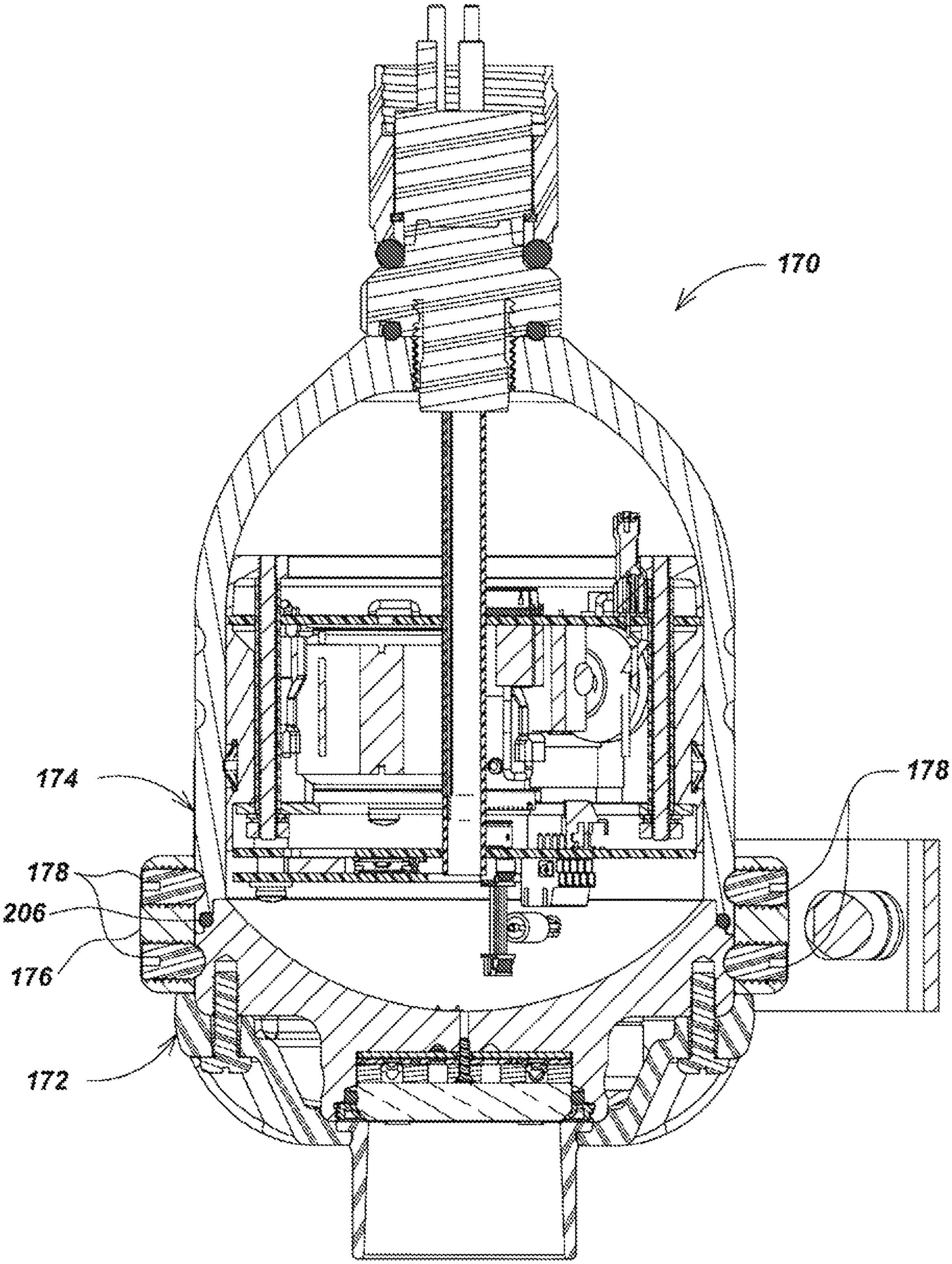
FIG. 12 is a vertical section view of the single multilayer LED light fixture of FIG. 10 rotated 45° to FIG. 11.

FIG. 12 illustrates the plurality of ball tipped glass-filled nylon screws 178, used in the coupling collar 176, to align and restrain the single light head subassembly 172 to the driver subassembly 174. The plurality of ball tipped glass-filled nylon screws 178 are designed to shear should the interior pressure of the light housing exceed a predetermined maximum pressure, e.g. 100 psi (nominal), as can occur if the pressure resistant housing O-ring 206 fails at depth, the housing partially floods, and the pressure resistant housing O-ring 206 seals high internal pressure on return to the surface.

Figure 13:
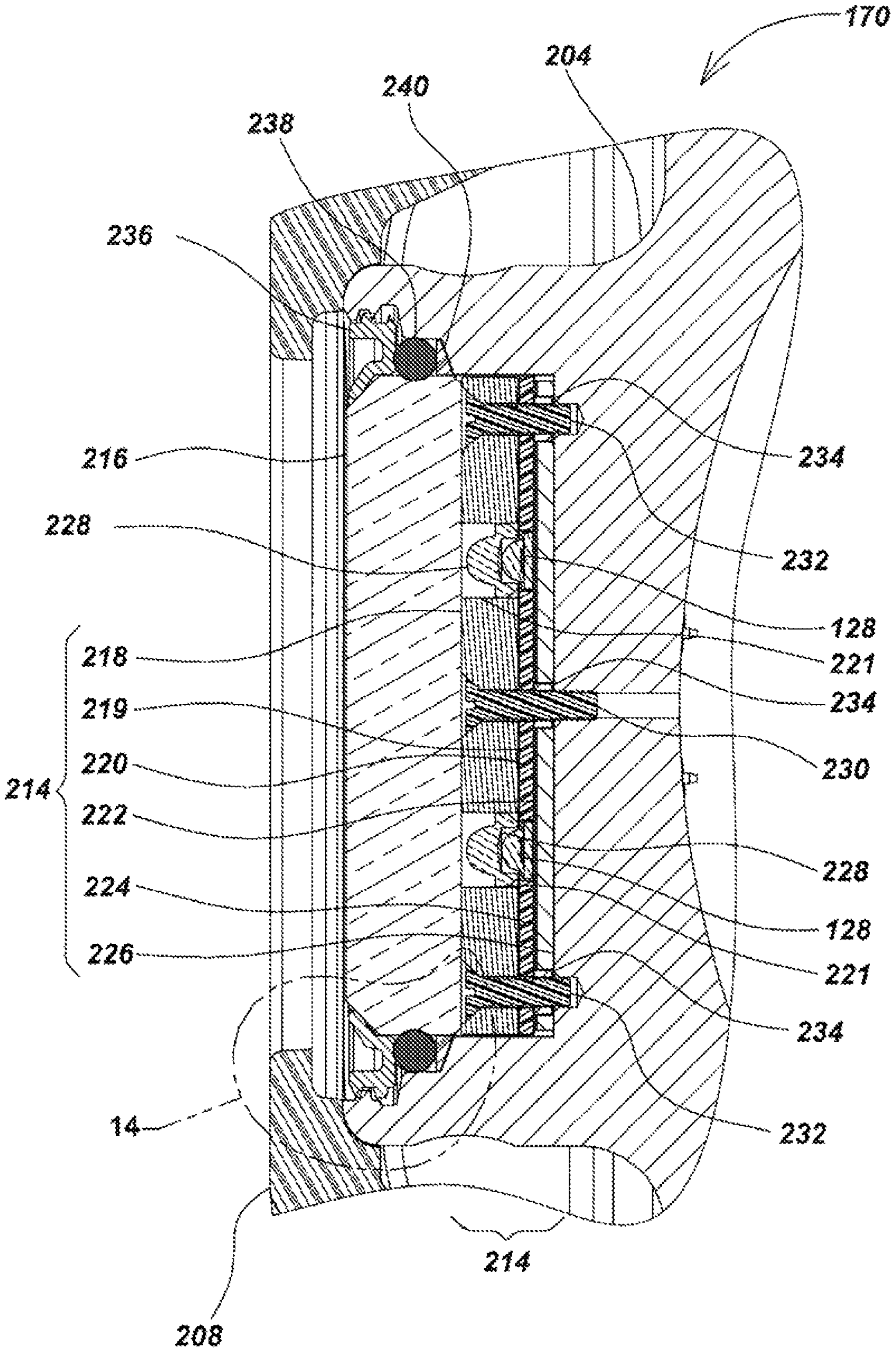
FIG. 13 is an enlarged fragmentary view of a portion of FIG. 11 illustrating details of the embodiment of the invention using a plurality of lenses within the multilayer stack.

FIG. 13 illustrates details of the single multilayer LED light fixture 170. The light tube 212, illustrated in FIG. 11, is removed to improve the clarity of this fixture. The multilayer LED light fixture 170, a multilayer stack 214 is comprised of a window support plate 218, a front Kapton sheet 219, an LED spacer 220, a middle Kapton sheet 222, a light engine printed circuit board 224, and a rear Kapton sheet 226. Load imposed by external pressure on a sapphire window 216 is transferred directly through the multilayer stack 214 to the pressure resistant housing end cap 204. Pressure is carried around the plurality of LEDs 128 which is centered inside a plurality of apertures 221 in the window support plate 218, the front Kapton sheet 219, the LED spacer 220, and the middle Kapton sheet 222.

The window support plate 218 is preferably made from a material with a high compressive strength, including but not limited to: stainless steel, aluminum, PEEK, FR-4 and G-10 fiberglass reinforced epoxy, and ceramic. The LED spacer 220 is preferably made from a non-conductive high compressive strength material, including but not limited to: PEEK, FR-4 and G-10 fiberglass reinforced epoxy, and ceramic. A plurality of lenses 228 is pressed into the window support plate 218, which focus the light of the plurality of LEDs 128 into a narrow beam. A light assembly may outfit some or all of the plurality of LEDs 128 with focusing lenses to provide different beam characteristics. The plurality of LEDs 128 is soldered to the light engine printed circuit board 224. The thin layer of the rear Kapton sheet 226 electrically isolates but thermally connects the light engine printed circuit board 224 to the pressure resistant housing end cap 204. This permits heat to be drawn off the back of the plurality of LEDs 128 and routed to the cold surrounding environment. A center screw 230 holds the multilayer stack 214 together during assembly. A plurality of indexing screws 232 provides anti-rotation and alignment of the layers. The center screw 230 and the plurality of indexing screws 232 are surrounded by a plurality of flanged electrically insulating washers 234. The multilayer stack is pre-loaded in compression by a titanium ring 236 that engages the pressure resistant housing end cap 204 by means of machined threads. A group of four slots 237 on the face of the titanium ring 236, better illustrated in FIG. 15, create a plurality of four flexible titanium ring tangs 242, a feature better illustrated in FIG. 14. As the titanium ring 236 is tightened, this plurality of titanium ring tangs 242 engage the sapphire window 216 and create a pre-load compressive force on the multilayer stack 214. A sealing O-ring 238 is compressed by the titanium ring 236, pressing on a tapered sealing wedge 240, which is forced to engage the outer edge of the sapphire window 216, thus acting as a compression seal. The plastic bumper guard 208 provides impact resistance.

Figure 14:
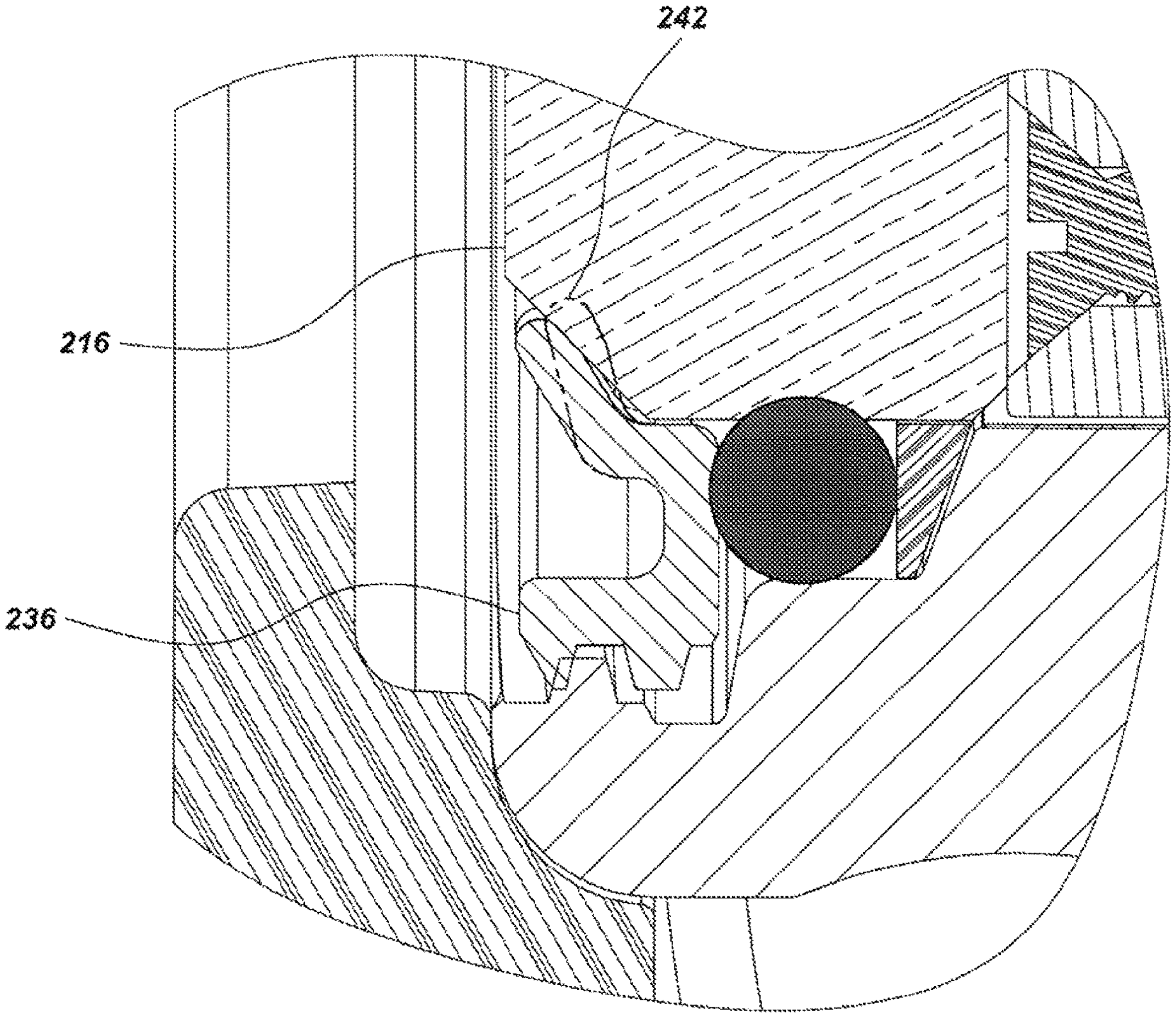
FIG. 14 is an enlarged fragmentary view of a portion of FIG. 13 illustrating the function of the titanium ring with a plurality of flexible titanium ring tangs.

FIG. 14 illustrates the titanium ring 236, and the titanium ring tang 242 flexing in contact with the sapphire window 216. The degree of flexure is illustrated by the titanium ring tang 242 in its unflexed (dotted) and flexed (solid line) positions. This flexure provides positive initial compressive force for the multilayer stack 214 illustrated in FIG. 13.

Figure 15:
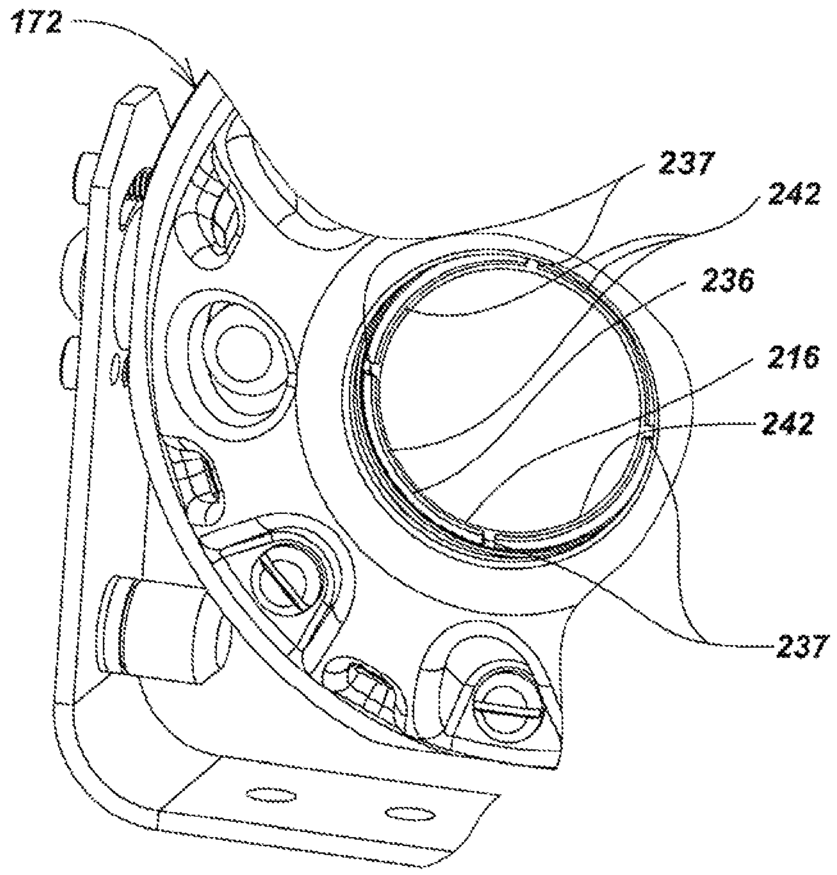
FIG. 15 is an enlarged fragmentary view of a portion of FIG. 10 illustrating installation of the titanium ring with the plurality of flexible titanium ring tangs.

FIG. 15 illustrates the installation of the titanium ring 236 with the plurality of flexible titanium ring tangs 242 as installed in the single light head assembly 172. The light tube 212, referred to in FIG. 11, and illustrated in FIG. 10, is removed to improve the clarity of this view. The four slots 237 on the face of the titanium ring 236 create the four flexible titanium ring tangs 242 illustrated in FIG. 14 that flex to engage the sapphire window 216, and preload the multilayer stack 214 illustrated in FIG. 13. Additionally, the four slots 237 serve as spanner wrench drive points for ease of installation.

Figure 16:
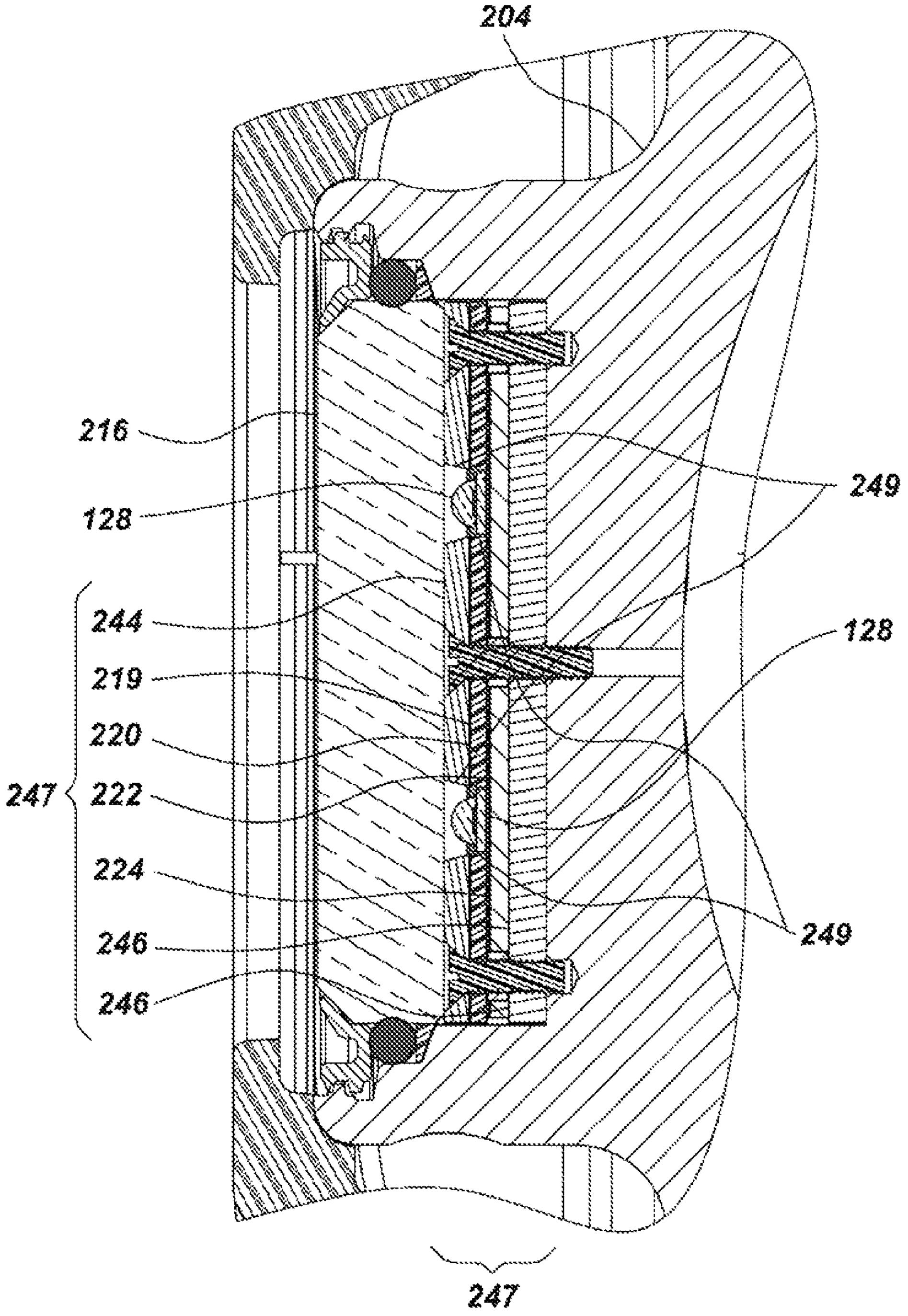
FIG. 16 is an illustration of an alternate embodiment of the present invention using a reflector plate within the multilayer stack.

FIG. 16 illustrates of an alternate embodiment of the present invention which utilizes a window support plate 244 for wide beam illumination, and an anodized aluminum spacer plate 246. A multilayer stack 247 is comprised of the window support plate 244 into which are cut a plurality of apertures 249 which function as reflectors, the front Kapton sheet 219, the LED spacer 220, the middle Kapton sheet 222, the light engine printed circuit board 224, and a rear Kapton sheet 226. Load imposed by external pressure on a sapphire window 216 is transferred directly through the multilayer stack 247 to the pressure resistant housing end cap 204. Pressure is carried around the plurality of LEDs 128 which are centered inside the plurality of apertures 249 in the window support plate 244, and also centered inside the plurality of apertures 221 in the front Kapton sheet 219, the LED spacer 220, and the middle Kapton sheet 222.

Figure 17:
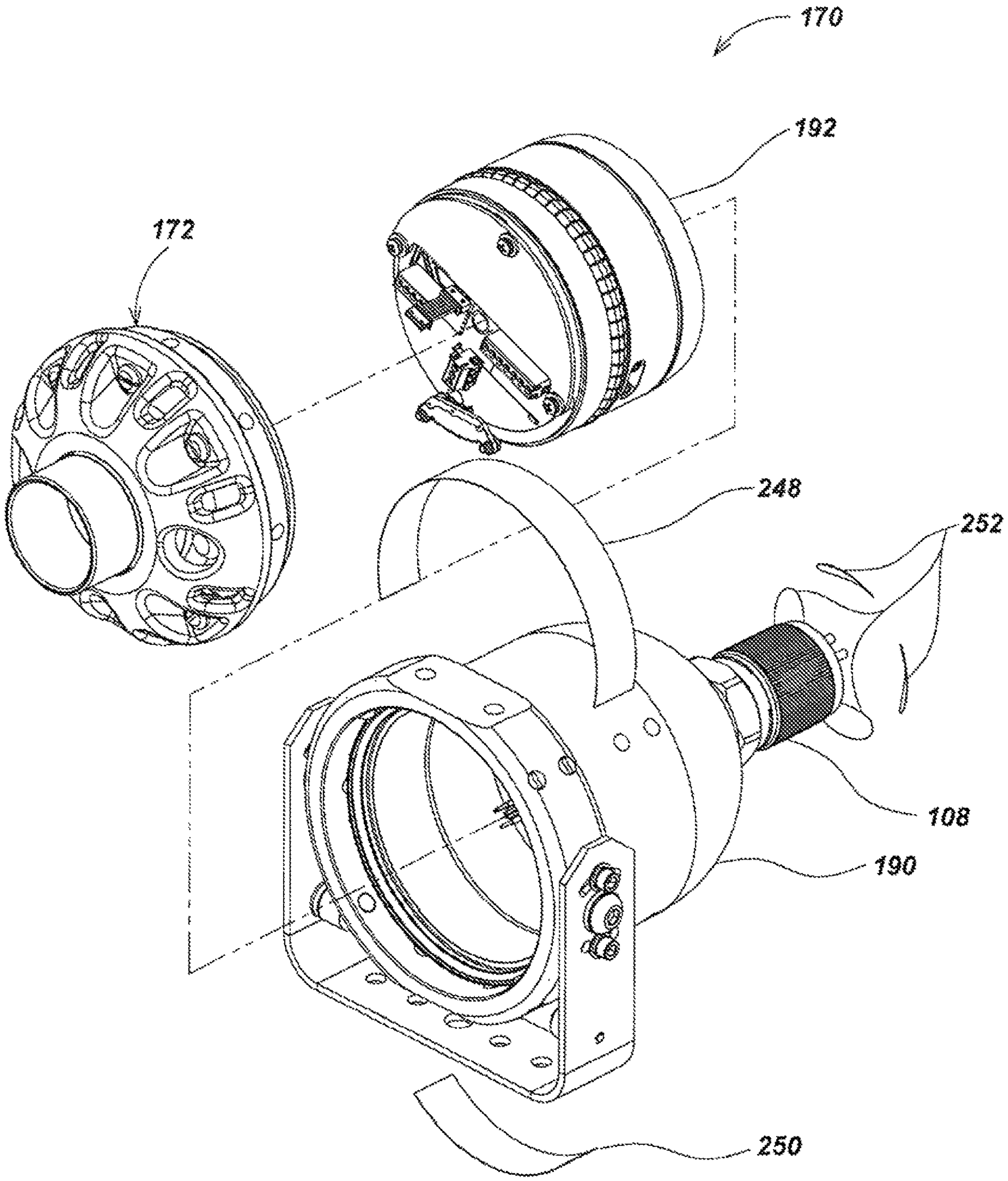
FIG. 17 is an isometric exploded view of the single multilayer LED light fixture of FIG. 10.

FIG. 17 illustrates the single multilayer LED light fixture 170, illustrating the single light head subassembly 172, the electronic driver subassembly 192, the pressure resistant driver housing 190, and the underwater electrical connector 108. An exterior top label 248, an exterior bottom label 250, and a plurality of exterior rear labels 252 are also illustrated.

Figure 18:
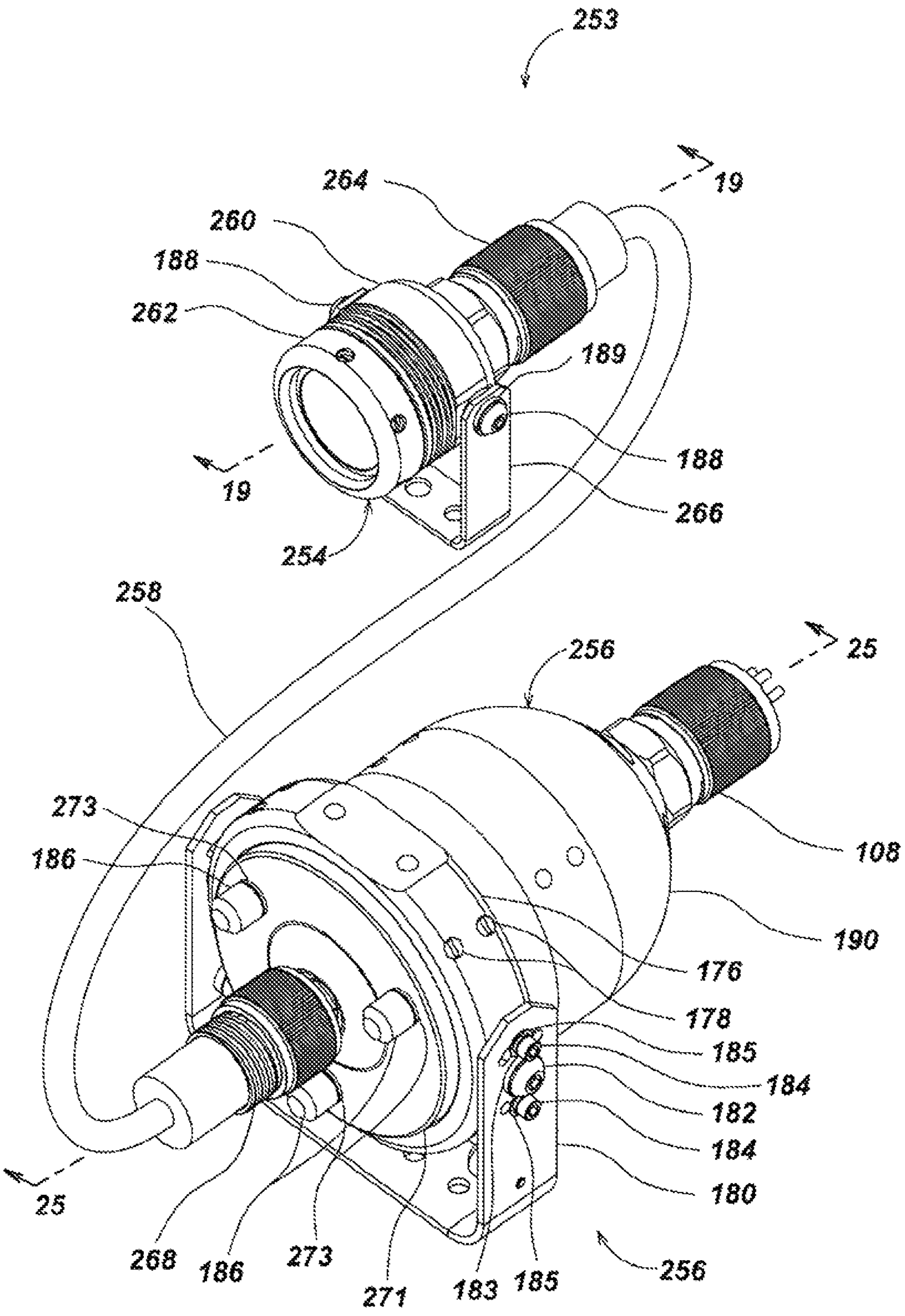
FIG. 18 is an isometric view of the exterior of an alternate embodiment of the present invention in the form of a remote single multilayer LED light fixture.

FIG. 18 illustrates an embodiment of the present invention in the form of a remote single multilayer LED light fixture 253, comprised of a remote single multilayer LED light head 254, a remote electronic driver assembly 256, and a connecting electrical cable 258. The remote single multilayer LED light head 254 is comprised of a remote light head body 260, a cowl 262, and a remote light head underwater electrical connector 264. A mounting bracket 266 is fastened to the remote single multilayer LED light head 254 by a plurality of small centering screws 188 and a plurality of small centering screw flat washers 189. A range of angular adjustment for pointing the light can be made by loosening the plurality of small centering screws 188, rotating the remote single multilayer LED light head 254 in the mounting bracket 266 to the desired angle, and then re tightening the plurality of small centering screws 188. The remote electronic driver assembly 256 is comprised of the pressure resistant driver housing 190, the underwater electrical connector 108 for power input and control, the coupling collar 176, the plurality of ball tipped glass-filled nylon screws 178, and a pressure resistant housing blank end cap 271.

The pressure resistant housing blank end cap 271 (FIG. 18) is fitted with a remote driver underwater electrical connector 268. Also illustrated in FIG. 18 are the plurality of sacrificial anodes 186 which use a plurality of nylon washers 273 to provide an isolating spacer with the pressure resistant housing blank end cap 271. The mount 180 is attached to the coupling collar 176 by the large centering screw 182, the large centering screw flat washer 183, the plurality of retaining screws 184, and the plurality of retaining screw flat washers 185. Internal to the remote electronic driver assembly 256 is the electronic driver subassembly 192, illustrated in FIG. 17.

Figure 19:
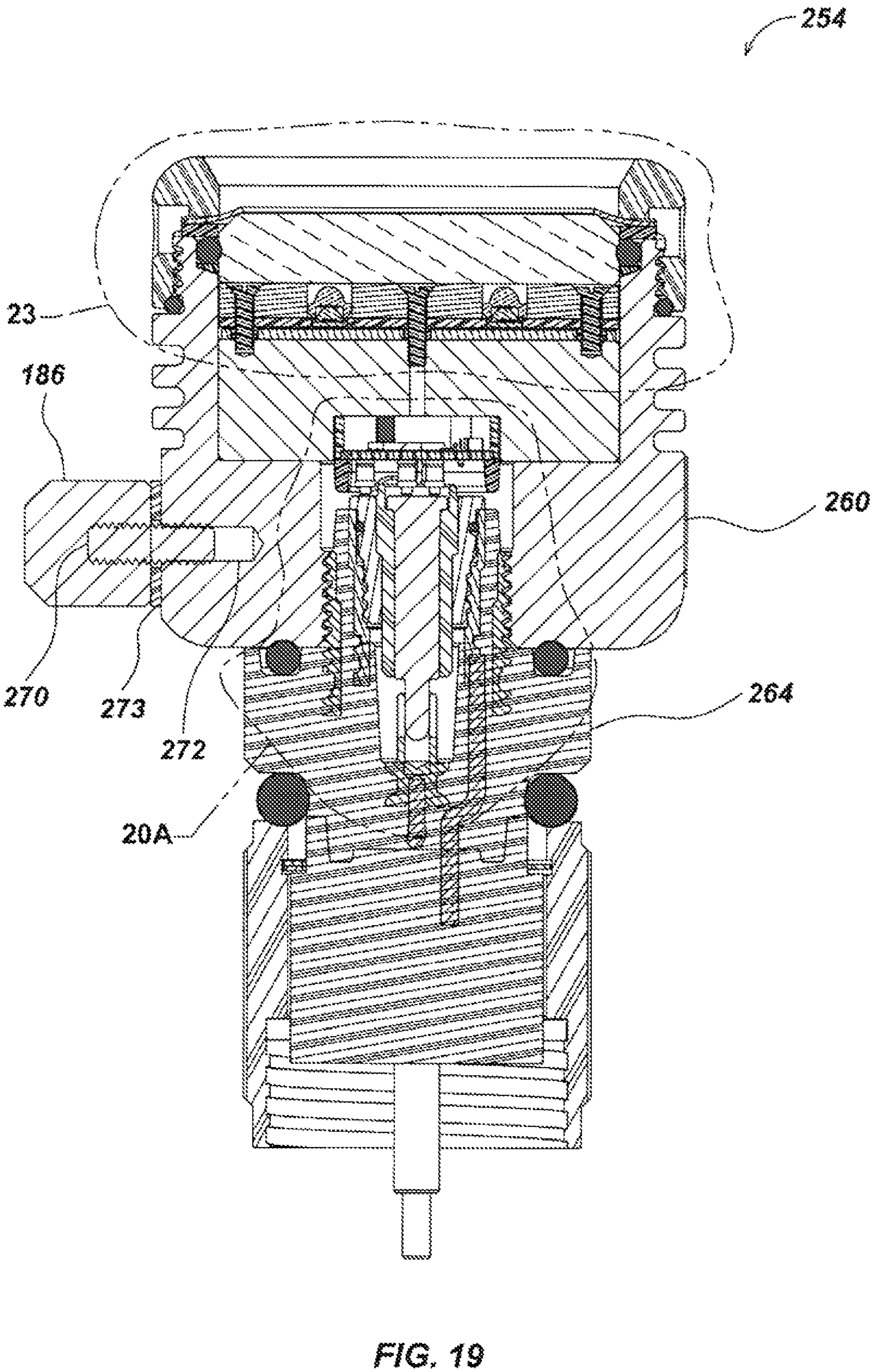
FIG. 19 is a vertical section view of a remote single multilayer LED light head taken along line 19-19 of FIG. 18.

FIG. 19 illustrates the remote single multilayer LED light head 254 taken along line 1919 of FIG. 18. The construction of the plurality of sacrificial anodes 186 is clearly illustrated. A galvanically active material, such as anode grade zinc or magnesium, that makes the plurality of sacrificial anodes 186, is fixed to a short segment of threaded rod 270 made of an electrically conductive metal such as stainless steel. The threaded rod 270 screws into a bare tapped hole 272 made into the side of the remote light head body 260. The plurality of nylon washers 273 acts as a compression gasket to seal the interface between the plurality of sacrificial anodes 186 and the remote light head body 260, keeping seawater from entering the electrical contact interface between the two when installed with grease. The remote light head underwater electrical connector 264 is mounted to the rear of the remote light head body 260.

Figure 20A:
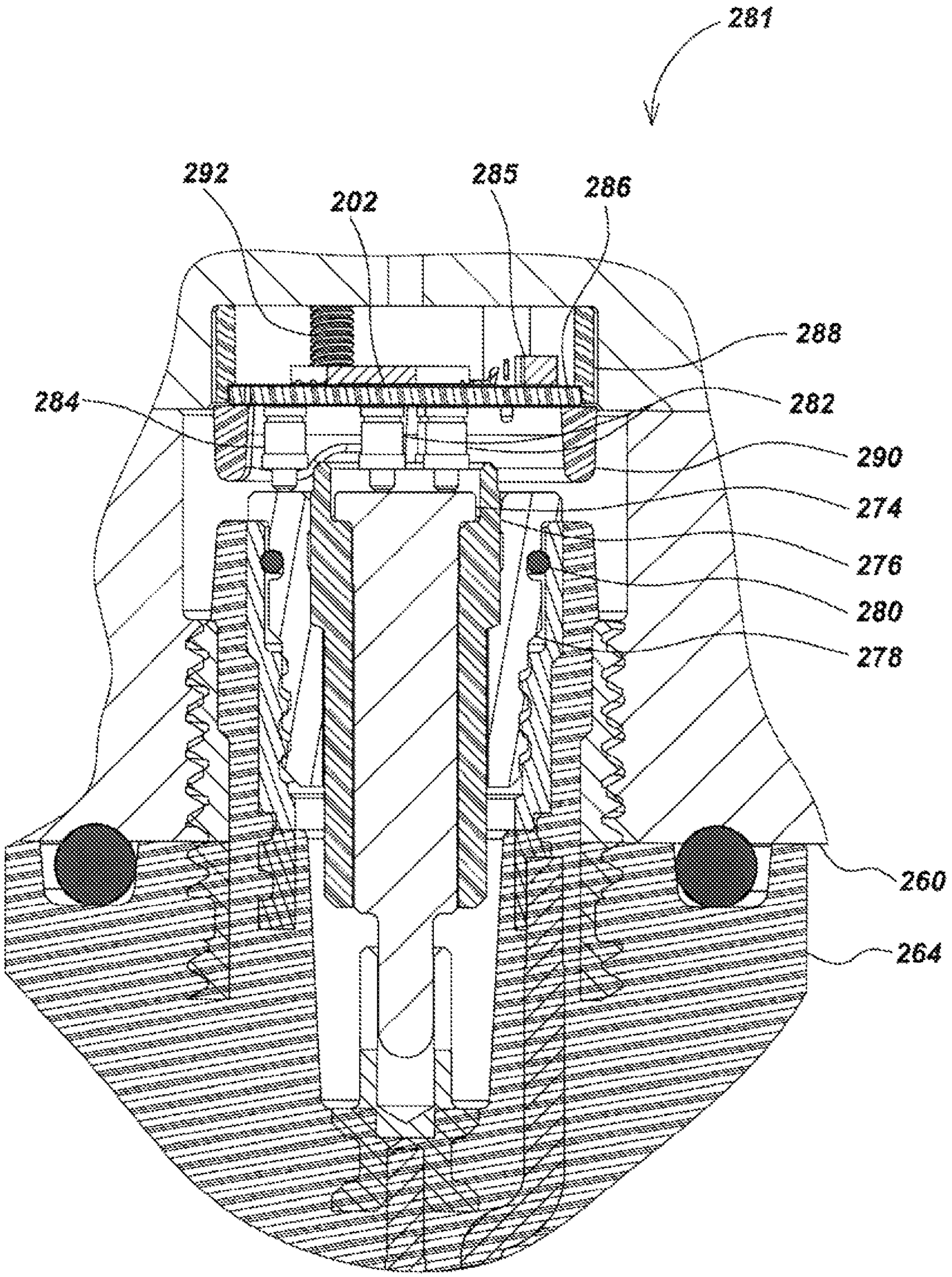
FIG. 20A is an enlarged fragmentary view of a portion of FIG. 19 illustrating a slip ring subassembly of the remote single multilayer LED light head with an integral thermal sensing circuit.

FIG. 20A illustrates a slip ring subassembly 281 that permits a shortened light head assembly. A central slip ring printed circuit board 286 holds a plurality of inner spring contacts 282, a plurality of outer spring contacts 284, and a temperature cut-off sensor 285, which is part of an FET based thermal cut-out switch circuit 202 that provides a solid state thermal cut-out safety feature in the event of a defined overheat condition inside the remote single multilayer LED light head 254 illustrated in FIG. 18. In addition, the central slip ring printed circuit board 286 provides reverse voltage protection for the LEDs 128, in the event the connecting electrical cable 258 is plugged in backwards. The central slip ring printed circuit board 286 is prevented from shorting to the housing by a set-back of the copper trace from the edge of the central slip ring printed circuit board 286, and by an upper plastic ring 288, and a lower plastic ring 290. The slip ring subassembly 281 is held together by a plurality of retaining screws 292 that is threaded into the remote light head body 260. The remote light head underwater electrical connector 264 has a bulb socket into which is screwed an assembly consisting of a center tap 274, an insulating ring 276, an outer tap 278, and a locking O-ring 280 used to hold the assembly from rotating loose. The plurality of inner spring contacts 282 engage the center tap 274, while the plurality of outer spring contacts 284 engage the outer tap 278 as the remote light head underwater electrical connector 264 is screwed into the remote light head body 260.

Figure 20B:
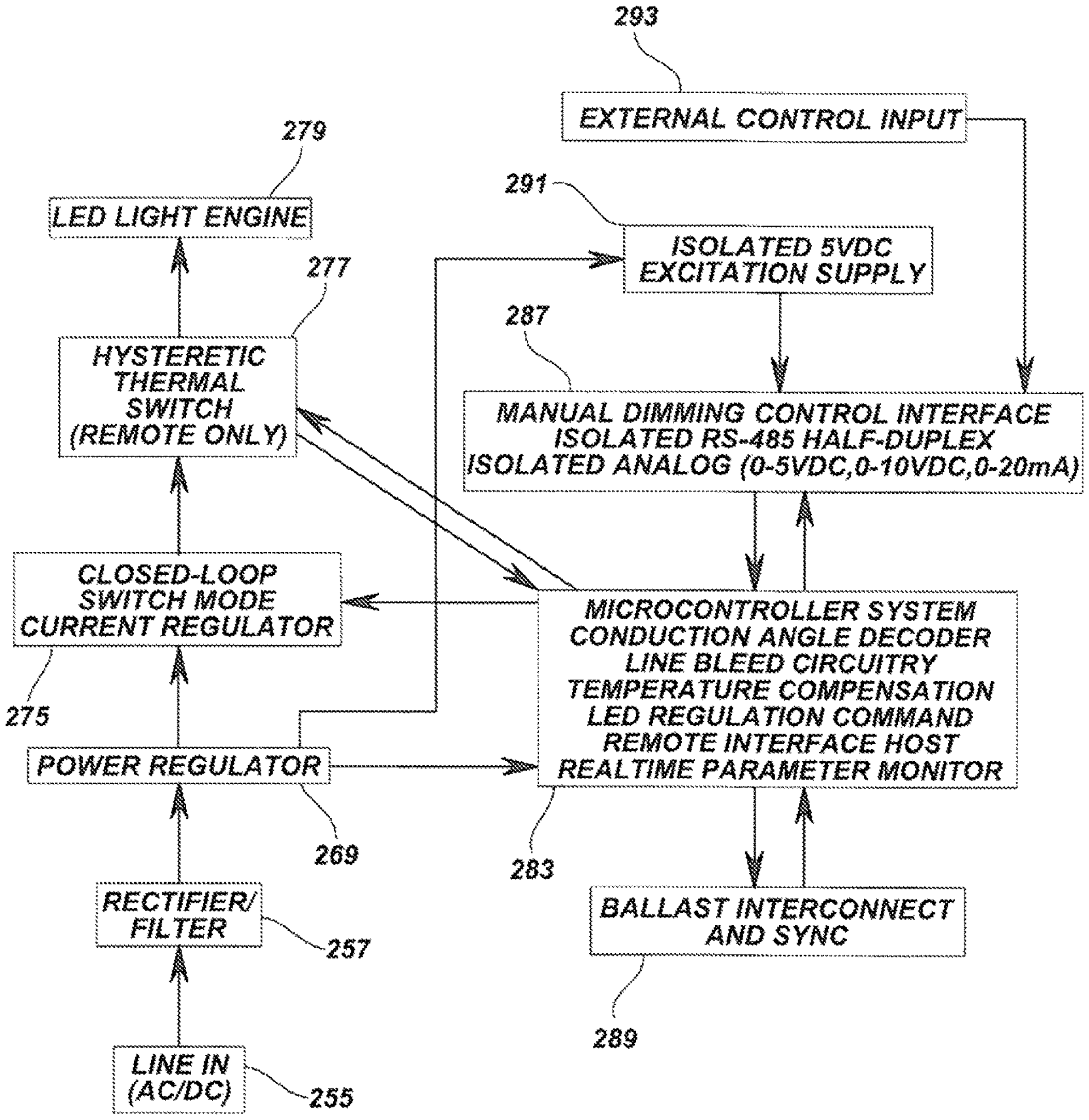
FIG. 20B is a block diagram of the LED driver circuit of the light head of FIG. 18.

An alternate embodiment of the FET based thermal cut-out switch circuit 202, illustrated as a block diagram in FIG. 20B, provides a power line communications (PLC) scheme from the remote single multilayer LED light head 254 to the remote electronic driver assembly 256 of FIG. 18, creating an automatic dimming control capability for thermal protection. The scheme uses either a modulated or digitally superimposed signal generated in the remote single multilayer LED light head 254 to control a dimming circuit within the remote electronic driver assembly 256. Temperature sensing devices, control logic, and data encoding circuitry located within the remote single multilayer LED light head 254, monitor the local operating temperature and convert that measurement into digital data. The digital data is then encoded into a digital waveform suited for transmission from the remote single multilayer LED light head 254 along the power lines back to the remote electronic driver assembly 256 of FIG. 18.

Modulation of the encoded digital temperature data is accomplished through a power switching technique where the control logic in the remote single multilayer LED light head 254 switches a load rapidly on-and-off in a specific pattern. The power shift pattern signals the encoded temperature. At the electronic driver subassembly 192 the modulated data is received and a de-modulation device retrieves the encoded digital data derived from the power shift pattern. The encoded digital data is then decoded and the temperature data retrieved by the electronic driver subassembly 192, the closed loop thermal rollback is complete, and power to the remote light is decreased or increased in order to maximize light output while maintaining safe operating temperatures. This modulation communication technique can be used to tell the ballast when preset thermal limits are crossed (for example, 50% rated temperature, 80% rated temperature, etc.) or to simply report temperature data at regular intervals.

An alternate dimming control solution uses a digital overlay technique to transmit encoded temperature data as a signal superimposed on the DC power carried through the electrical wires supplying power to the remote single multilayer LED light head 254. This relays data to the driver dimming control circuit in the remote electronic driver assembly 256. The closed loop thermal rollback is now complete and power to the remote light can be decreased or increased in order to maximize light output while maintaining safe operating temperatures.

Either of these methods establishes a closed loop thermal roll back control in the remote light head configuration without additional wires for data transfer between the remote single multilayer LED light head 254 and the remote electronic driver assembly 256. The digital overlay technique has the advantages that its transmitted temperature measurement data are more precise, and does it not use the power shift pattern of the modulation technique, which cause the remote single multilayer LED light head 254 to toggle on-and-off.

FIG. 20B illustrates the manner in which the LED driver circuit of the remote single multilayer LED light fixture 253 follows the power flow from an AC/DC power source 255, through an input rectifier/filter 257, through a power regulator 269, through a closed-loop switch mode power regulator 275, through a hysteretic thermal switch/temperature transmitter 277, to an LED light engine 279. The power regulator 269 additionally provides power to a microcontroller system 283, which controls the closed-loop switch mode power regulator 275, based on measurements sent from the hysteretic thermal switch/temperature transmitter 277. The microcontroller system 283 provides timing to a ballast interconnect and sync circuit 289. The microcontroller system 283 incorporates such elements as conduction angle decoder, line bleed circuitry, temperature compensation, LED regulation command, remote interface host, and real time parameter monitor. The power regulator 269 additionally provides power to an isolated 5 volts DC excitation supply 291 which powers a manual dimming control interface 287, whose function is to interpret signals (such as isolated RS-485 half-duplex, isolated analog 0-15 volts DC, 0 10 volts DC, or 0-20 mA) received from an external control input 293.

Figure 21:
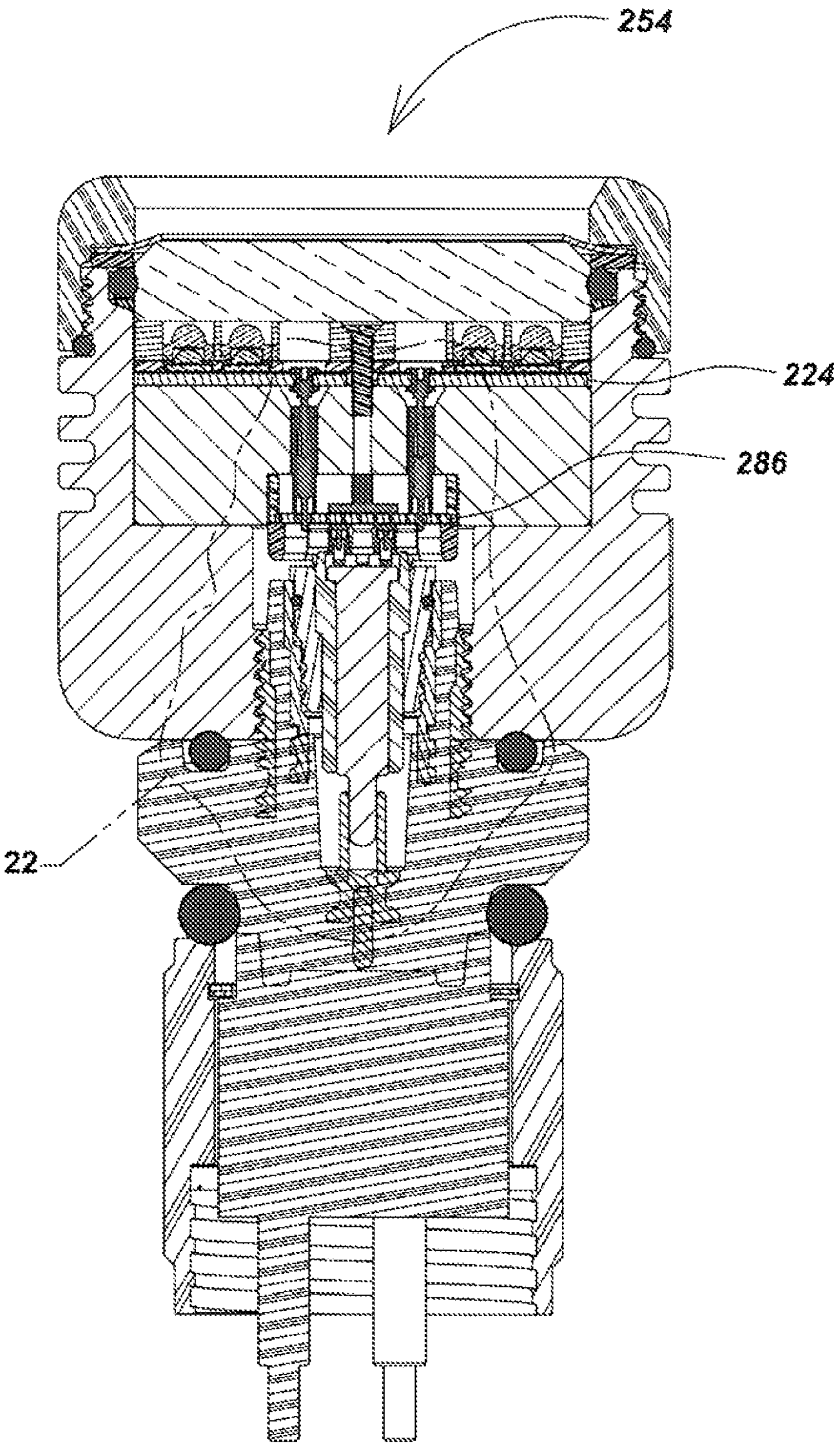
FIG. 21 is a vertical section view of the remote single multilayer LED light head rotated 30° to FIG. 19.

FIG. 21 illustrates the remote single multilayer LED light head 254. This view illustrates the relative position of the interior components which connect the light engine printed circuit board 224 of the remote single multilayer LED light head 254 to the central slip ring printed circuit board 286, better illustrated in FIG. 22.

Figure 22:
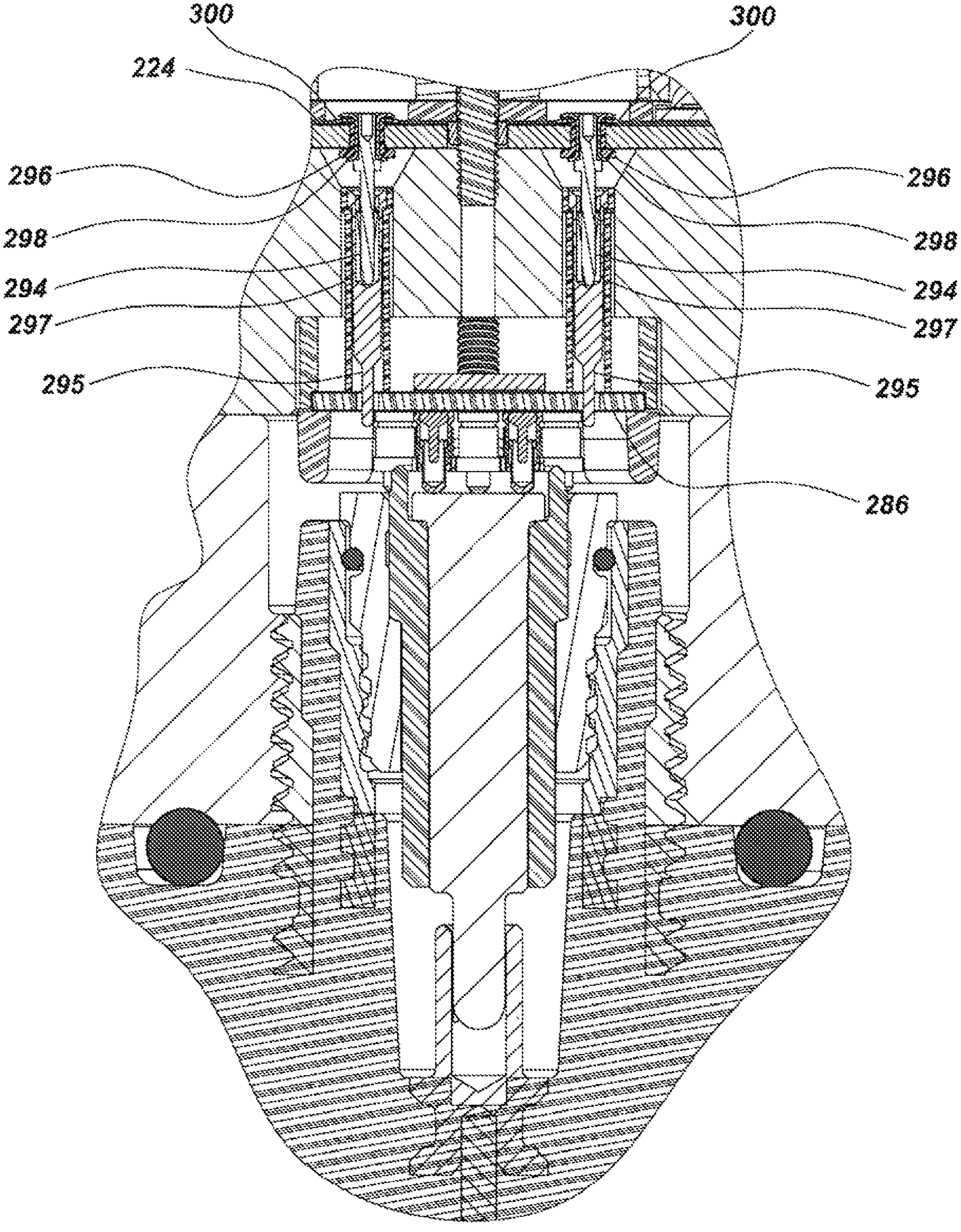
FIG. 22 is an enlarged fragmentary view of a portion of FIG. 21, illustrating a slip ring subassembly.

FIG. 22 illustrates the means that connect the light engine printed circuit board 224 to the central slip ring printed circuit board 286. A plurality of copper washers 300 are held in place by a plurality of copper rivets 298, which are individually insulated from the core of the light engine printed circuit board by a plurality of plastic flanged washers 296. A plurality of electrical contact pins 294 are soldered into each of the plurality of copper rivets 298. The plurality of copper washers 300 are likewise soldered to the top conductive traces of the light engine printed circuit board 224. The plurality of electrical contact pins 294 engage a plurality of sockets 295 that are part of the central slip ring printed circuit board 286. The plurality of sockets 295 are electrically insulated using a short segment of heat shrink tubing 297.

Figure 23:
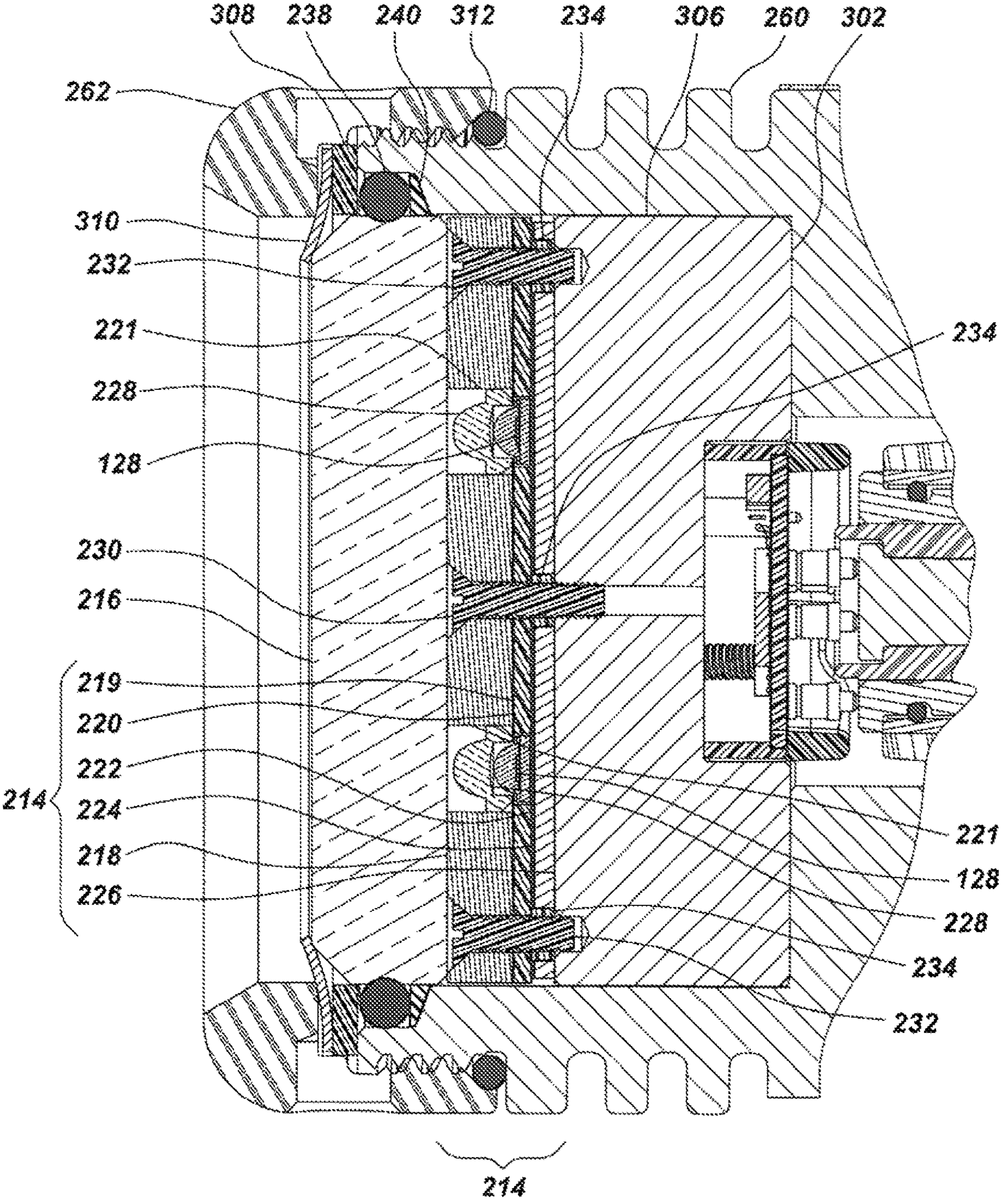
FIG. 23 is an enlarged fragmentary view of a portion of FIG. 19 illustrating one embodiment of the multilayer stack.

FIG. 23 illustrates the composition of the multilayer stack 214 which is comprised of the window support plate 218, the front Kapton sheet 219, the LED spacer 220, the middle Kapton sheet 222, the light engine printed circuit board 224, and the rear Kapton sheet 226. The plurality of LEDs 128 is soldered to the light engine printed circuit board 224. The load imposed by external pressure on the sapphire window 216 is transferred directly through the multilayer stack 214, through an anodized aluminum puck 302 to the remote light head body 260. The anodize coating of the anodized aluminum puck 302 acts as the primary electrical insulator. The anodized aluminum puck 302 is secondarily electrically insulated by a Kapton collar 306. Pressure is carried around the plurality of LEDs 128 which is centered inside the plurality of apertures 221 in the window support plate 218, the front Kapton sheet 219, the LED spacer 220, and the middle Kapton sheet 222. The plurality of lenses 228 are pressed into the plurality of apertures 221 in the window support plate 218, which individually focus the light of the plurality of LEDs 128 into a narrow beam. The window support plate 218 may outfit some or all of the plurality of apertures 221 with the plurality of lenses 228 to provide different light beam characteristics.

The rear Kapton sheet 226 electrically isolates but thermally connects the light engine printed circuit board 224 to the remote light head body 260. This permits heat to be drawn off the back of the plurality of LEDs 128 and routed to the cold surrounding environment. The center screw 230 holds the multilayer stack together during assembly. The plurality of indexing screws 232 provides anti-rotation and alignment of the layers. The plurality of indexing screws 232 and the center screw 230 are electrically isolated by the plurality of flanged electrically insulating washers 234.

The multilayer stack 214 is pre-loaded in compression by a titanium convex flat spring 310 (FIG. 23) that engages the sapphire window 216 on its inside diameter, and rests on a plastic galvanic insulator 308 on its outer diameter, and is pressed on a circle midway between its inside diameter and outside diameter by the cowl 262 creating a compressive force on the sapphire window 216. As the cowl 262 is tightened, the pre-load compressive force on the multilayer stack 214 is increased by the downward force imposed by the titanium convex flat spring 310. In addition, the titanium convex flat spring 310 presses downward on the plastic galvanic insulator 308, which then compresses the sealing O-ring 238 and the tapered sealing wedge 240 below that. The tapered sealing wedge 240 is forced to engage the outer edge of the sapphire window 216, acting as a secondary compression seal. An anti-rotation O-ring 312 locks the cowl from rotating loose.

Figure 24:
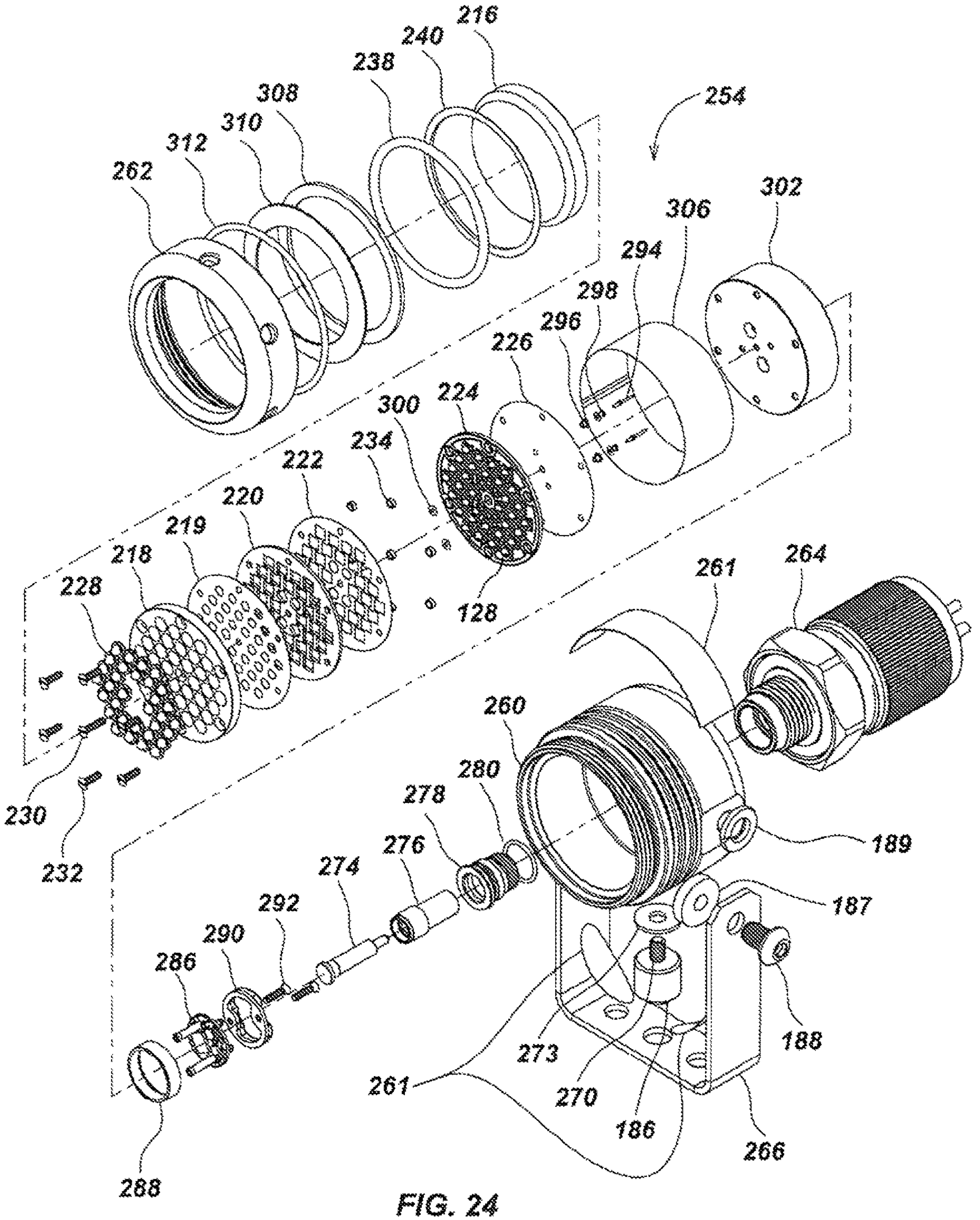
FIG. 24 is an isometric exploded view of the remote single multilayer LED light head of FIG. 19.

Referring to FIG. 24, the remote single multilayer LED light head 254 includes the cowl 262, the anti-rotation O-ring 312, the titanium convex flat spring 310, the plastic galvanic insulator 308, the sealing O-ring 238, the tapered sealing wedge 240, and the sapphire window 216. The LED light head 254 further includes the center screw 230, the plurality of indexing screws 232, the plurality of lenses 228, the window support plate 218, the front Kapton sheet 219, the LED spacer 220, and the middle Kapton sheet 222. The LED light head 254 further includes the plurality of flanged electrically insulating washers 234, the plurality of copper washers 300, and the light engine printed circuit board 224 populated with the plurality of LEDs 128. The LED light head 254 further includes the rear Kapton sheet 226, the plurality of plastic flanged washers 296, the plurality of copper rivets 298, the plurality of electrical contact pins 294, and the Kapton collar 306. The LED light head 254 further includes the anodized aluminum puck 302, the upper plastic ring 288, the central slip ring printed circuit board 286, the lower plastic ring 290, the plurality of retaining screws 292, and the center tap 274. The LED light head 254 further includes the insulating ring 276, the outer tap 278, the locking O-ring 280, the remote light head body 260, a plurality of exterior labels 261, and the remote light head underwater electrical connector 264. The LED light head 254 further includes the mounting bracket 266, the plurality of small centering screws 188, a mount washer 187, the small centering screw flat washers 189, the sacrificial anode 186, the threaded rod 270, and the nylon washer 273.

Figure 25:
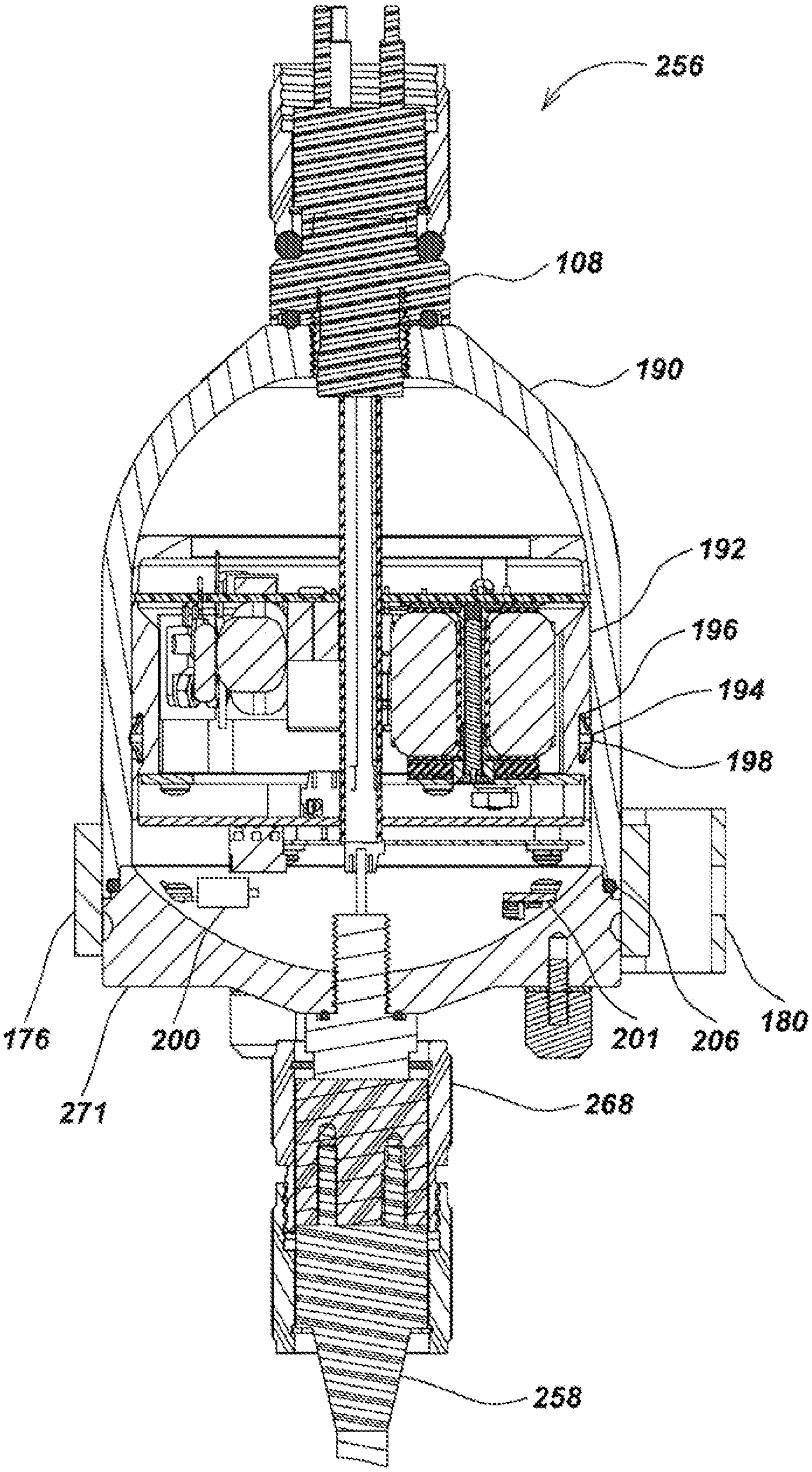
FIG. 25 is a vertical section view of the remote electronic driver assembly taken along line 25-25 of FIG. 18.

Referring to FIG. 25, the remote electronic driver assembly 256 includes the pressure resistant driver housing 190, to which is mounted the underwater electrical connector 108. This brings power to the electronic driver subassembly 192, which is retained inside the pressure resistant driver housing 190 by use of the circular beryllium-copper spring 194 that seats in the outside groove 196 machined into the outside diameter of the electronic driver subassembly 192, positioning it in the inside groove 198 machined into the interior diameter of the pressure resistant driver housing 190. The circular beryllium-copper spring 194 functions as a positioning and retaining device, absorbing vibrations imposed on the electronic driver subassembly 192, and improves thermal coupling to remove excess heat from the electronic driver subassembly 192 to the surrounding cold environment. The circular body of the electronic driver subassembly 192 further functions as an internal ring to support the pressure resistant driver housing 190, which allows it to function to a greater depth. The grounding tap 200 provides for a common electrical ground. The thermal sensor board 201, measures the temperature of the remote electronic driver assembly 256 as part of the electronic driver subassembly 192. As fully described in FIG. 11, the electronic driver subassembly 192 also contains a thermal sensor integrated within its circuitry to self-monitor its own temperature. If an overheat condition were to occur as detected by the thermal sensor integrated into the electronic driver subassembly 192, it would roll back the current delivered to the remote single multilayer LED light head 254 (Not illustrated), thereby lowering the heat developed by the remote electronic driver assembly 256 itself.

The pressure resistant housing blank end cap 271 is aligned and held to the pressure resistant driver housing 190 by the coupling collar 176. The pressure resistant housing O-ring 206 prevents seawater from entering the interior space. The remote driver underwater electrical connector 268 brings power for the remote light head through the pressure resistant housing blank end cap 271 and connects to the connecting electrical cable 258. The mount 180 allows for attachment of the light to a larger underwater structure.

Figure 26:
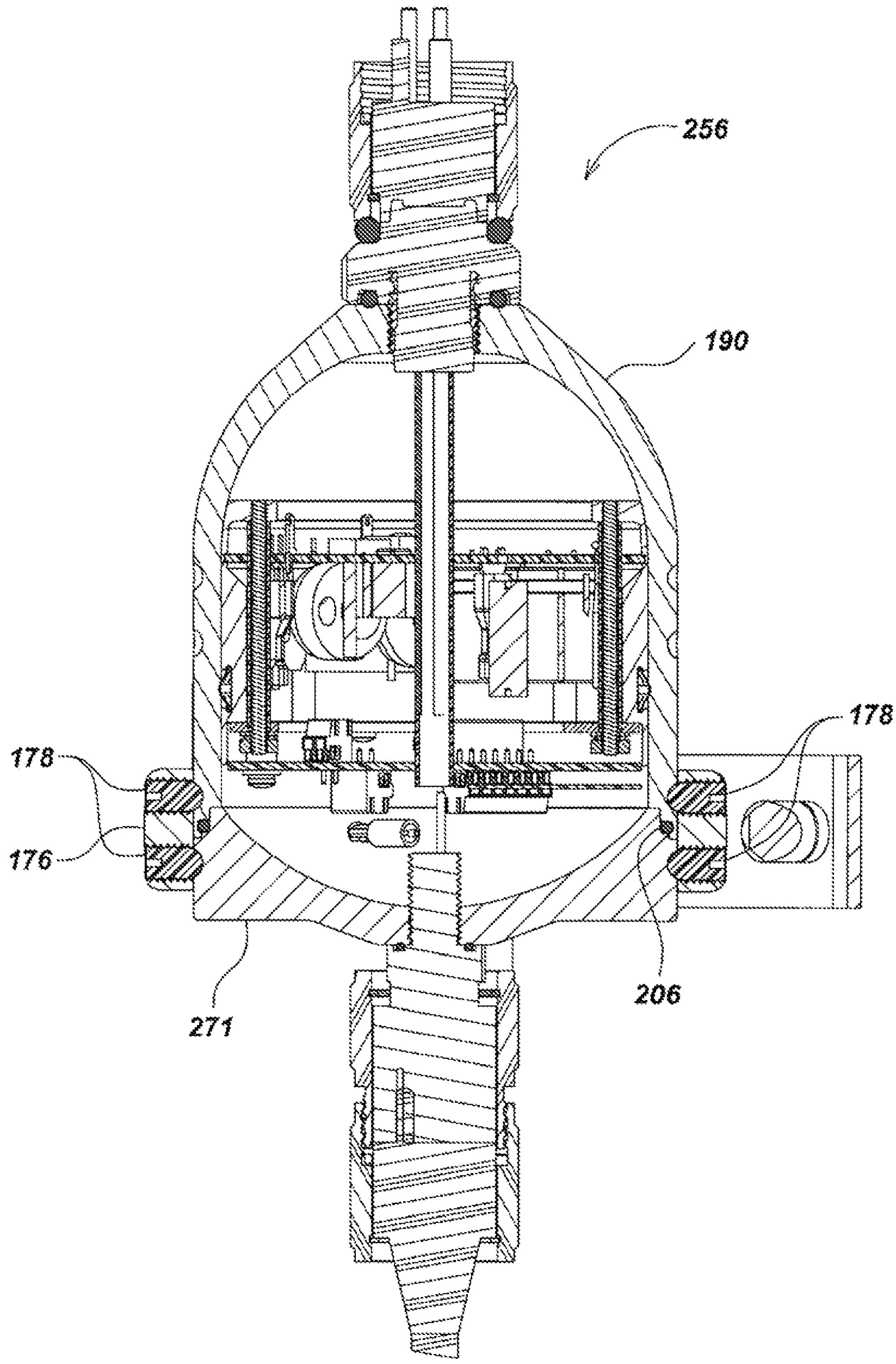
FIG. 26 is a vertical section view of the remote electronic driver assembly rotated to FIG. 25.

Referring to FIG. 26, the plurality of ball tipped glass-filled nylon screws 178 is used in the coupling collar 176 to align and restrain the pressure resistant housing blank end cap 271 to the pressure resistant driver housing 190. The plurality of ball tipped glass-filled nylon screws 178 are designed to shear should the interior pressure of the light housing exceed 100 psi (nominal), as may occur if the pressure resistant housing O-ring 206 fails at depth, the housing partially floods, and the pressure resistant housing O-ring 206 seals high internal pressure on return to the surface.

Figure 27:
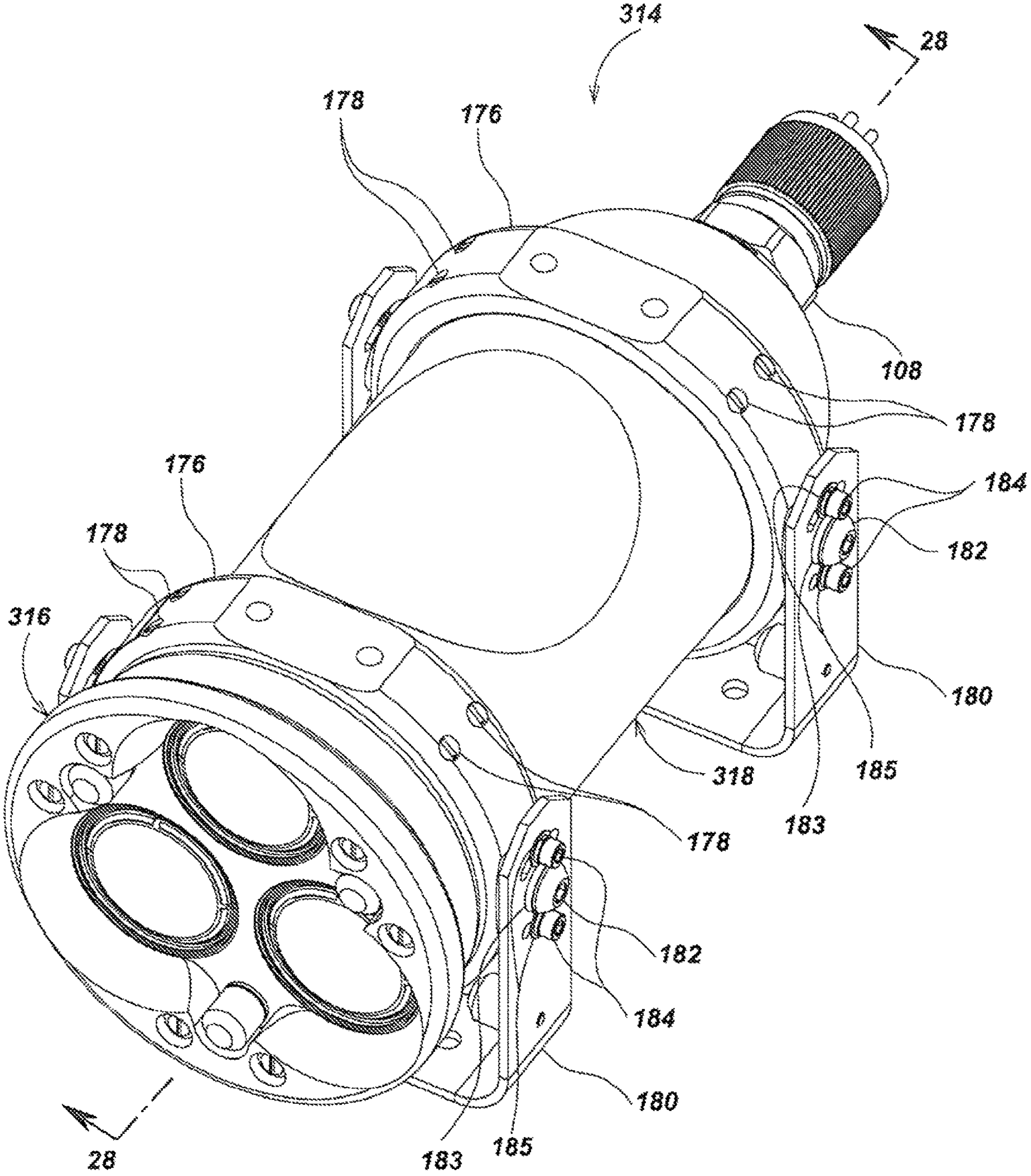
FIG. 27 is an isometric view of the exterior of an embodiment of the present invention in the form of a triple multilayer LED light fixture.

FIG. 27 illustrates the exterior of an alternate embodiment of the present invention in the form of a triple multilayer LED light fixture 314 incorporating three multilayer stack 214 assemblies as illustrated in FIG. 13. The triple multilayer LED light fixture 314 is comprised of a triple multilayer LED light head 316 attached to a triple driver assembly 318, and held by the coupling collar 176, using the plurality of ball tipped glass-filled nylon screws 178. The underwater electrical connector 108 connects the triple multilayer LED light fixture 314 to an electrical power source. The mount 180 is attached to the coupling collar 176 by the large centering screw 182, the large centering screw flat washer 183, the plurality of retaining screws 184, and the plurality of retaining screw flat washers 185. The second mount 180 is placed near the rear of the triple multilayer LED light fixture 314 near the underwater electrical connector 108 for additional support. The second mount 180 is similarly attached to the triple multilayer LED light fixture 314.

Figure 28:
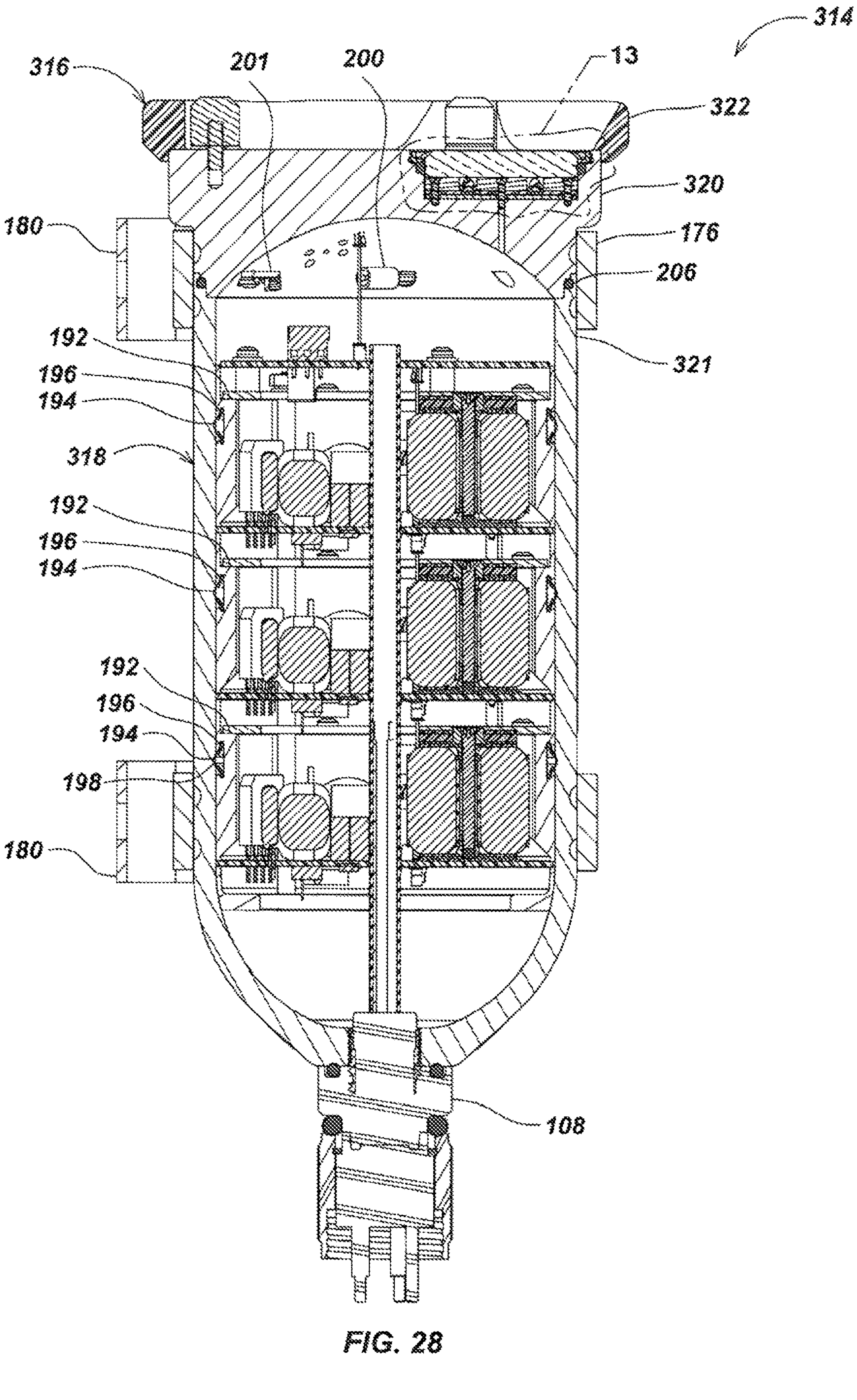
FIG. 28 is a vertical section view of the interior of the triple multilayer LED light fixture taken along line 28-28 of FIG. 27.

Referring to FIG. 28, the triple multilayer LED light fixture 314 includes the triple multilayer LED light head 316 attached to the triple driver assembly 318, and held by the coupling collar 176, using the plurality of ball tipped glass-filled nylon screws 178 as illustrated in FIG. 27. In this embodiment of the invention, the three multilayer stack 214 assemblies, which are individually described in FIG. 13, are incorporated into a triple light head body 320. The triple multilayer LED light fixture 314 includes a pressure resistant driver housing 321, to which is mounted the underwater electrical connector 108. This brings power to the three electronic driver subassemblies 192, bolted together in a manner illustrated in FIG. 29. The circular beryllium-copper spring 194 seats in the outside groove 196 machined into the outside diameter of each of the three electronic driver subassemblies 192.

The sub-assembly of the three electronic driver subassemblies 192 is retained inside the pressure resistant driver housing 321 by use of the single inside groove 198 machined into the inside diameter of the pressure resistant driver housing 321. The single inside groove 198 captures one of the circular beryllium-copper springs 194, thus functioning as a means for positioning and retaining the three electronic driver subassemblies 192. In addition, the circular beryllium-copper springs 194 absorb vibrations imposed on the three electronic driver subassemblies 192, and improve thermal coupling to remove excess heat from the driver to the surrounding cold environment. The circular bodies of the three electronic driver subassemblies 192 secondarily function as internal rings to support the pressure resistant driver housing 321, allowing the housing to operate at greater depths. The grounding tap 200 provides for a common electrical ground. The thermal sensor board 201 measures the temperature of the triple multilayer LED light fixture 314 as part of the plurality of electronic driver subassemblies 192. As fully described in FIG. 11, the plurality of electronic driver subassemblies 192 each contain an integrated thermal sensor to self-monitor their individual temperatures. If an overheat condition were to occur in any single electronic driver subassembly 192, it would roll back the current delivered to the triple multilayer LED light head 316, thereby lowering the heat developed by the plurality of electronic driver subassemblies 192.

Figure 29:
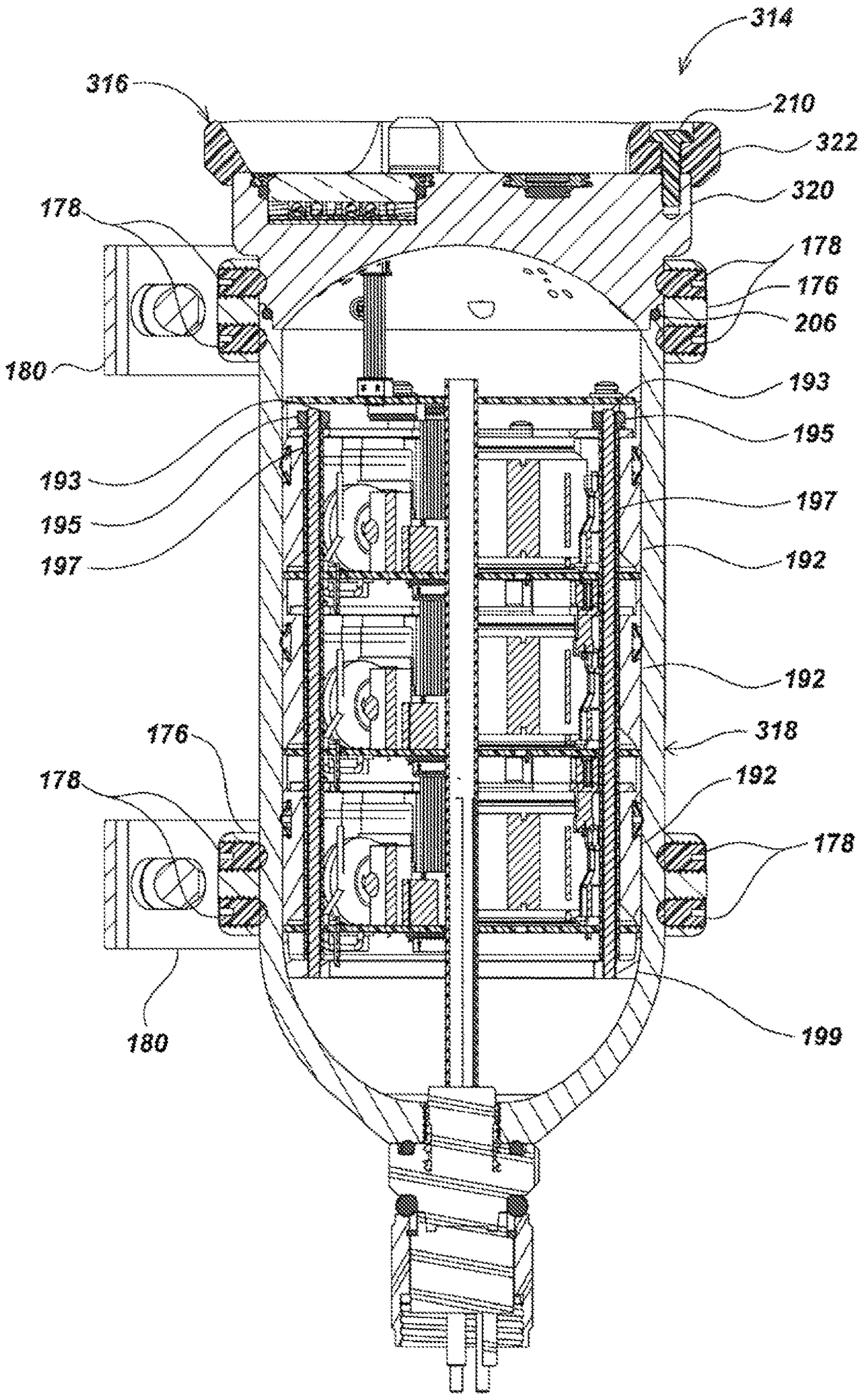
FIG. 29 is a vertical section view of the triple multilayer LED light fixture rotated relative to FIG. 28.

The triple multilayer LED light head 316 is aligned and held to the pressure resistant driver housing 321 by the coupling collar 176. The pressure resistant housing O-ring 206 provides a seal, preventing seawater from entering the interior. A plastic bumper guard 322 is attached to the triple light head body 320 by means of the plurality of machine screws 210, better illustrated in FIG. 29. The pair of mounts 180 allows for attachment of the light to a larger underwater structure, as described in FIG. 27. FIG. 29 illustrates the manner in which the three electronic driver subassemblies 192 are held together as a single module within the triple driver assembly 318 by a plurality of threaded rods 193 passing through the three electronic driver subassemblies 192 and screwing into a lower end ring 199. A plurality of shrink tubing segments 197 are used on the plurality of threaded rods 193 to prevent electrical contact with the three electronic driver subassemblies 192. A plurality of hex nuts 195, tighten onto the plurality of threaded rods 193, securely holding the three electronic driver subassemblies 192 together. The plastic bumper guard 322 is attached to the triple light head body 320 by means of the plurality of machine screws 210. The plurality of machine screws 210 may be made from either marine grade metal or high strength plastic. As described in connection with FIG. 12, the plurality of ball tipped glass-filled nylon screws 178 are used with the coupling collar 176 to align and restrain the triple multilayer LED light head 316 to the triple driver assembly 318. The pressure resistant housing O-ring 206 provides a seal, preventing seawater from entering the interior. The pair of mounts 180 allows for attachment of the triple multilayer LED light fixture 314 to a larger underwater structure, in the manner described connection with in FIG. 27.

Figure 30:
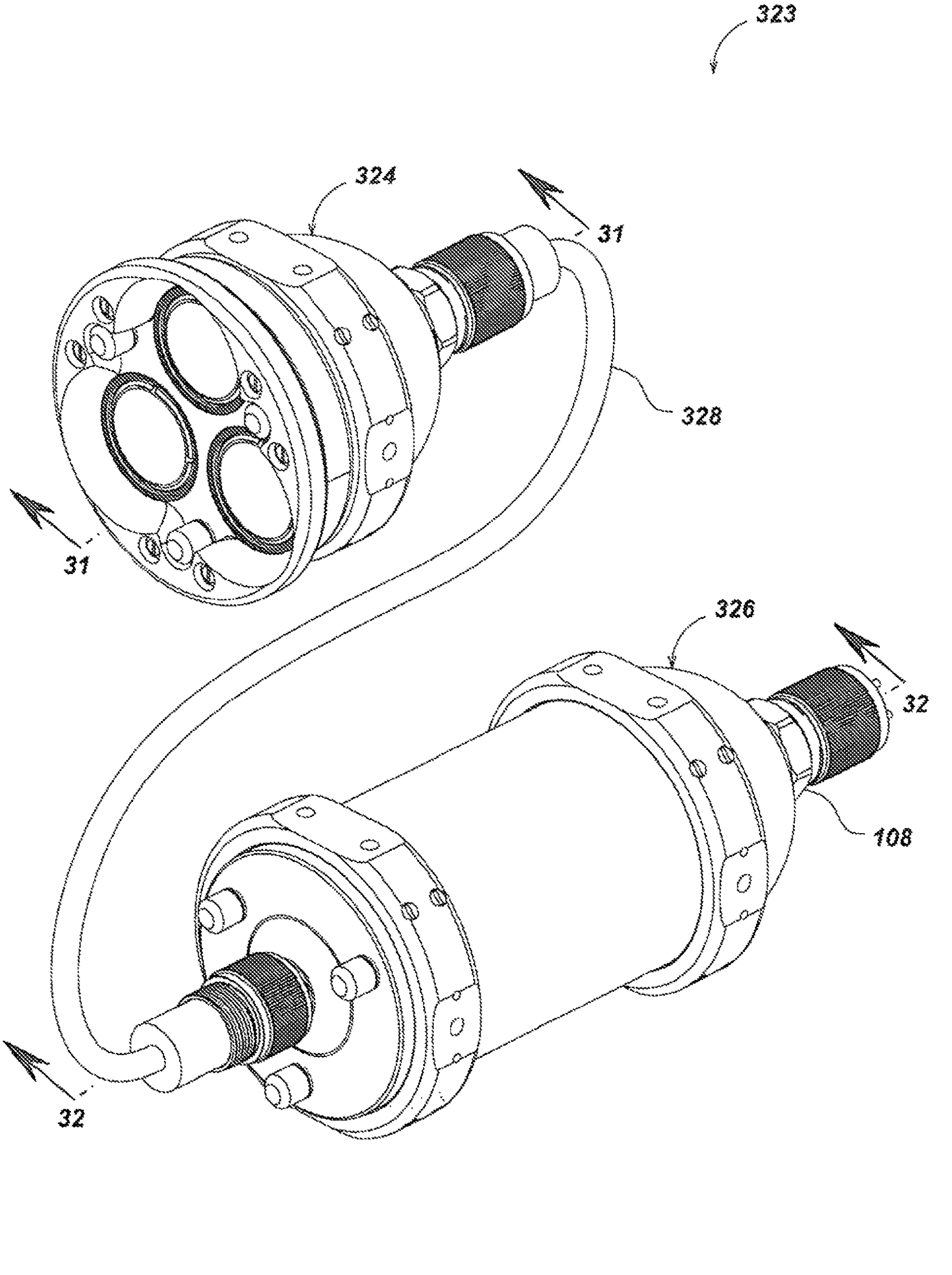
FIG. 30 is an isometric view of the exterior of an alternate embodiment of the present invention in the form of a remote triple multilayer LED light fixture.

FIG. 30 illustrates an alternate embodiment of the present invention in the form of a remote triple multilayer LED light fixture 323, comprised of a remote triple light head 324, and a remote triple electronic driver assembly 326, which are connected by a connecting electrical cable 328. The underwater electrical connector 108 connects the remote triple electronic driver assembly 326 to an electrical power source (not illustrated).

Figure 31:
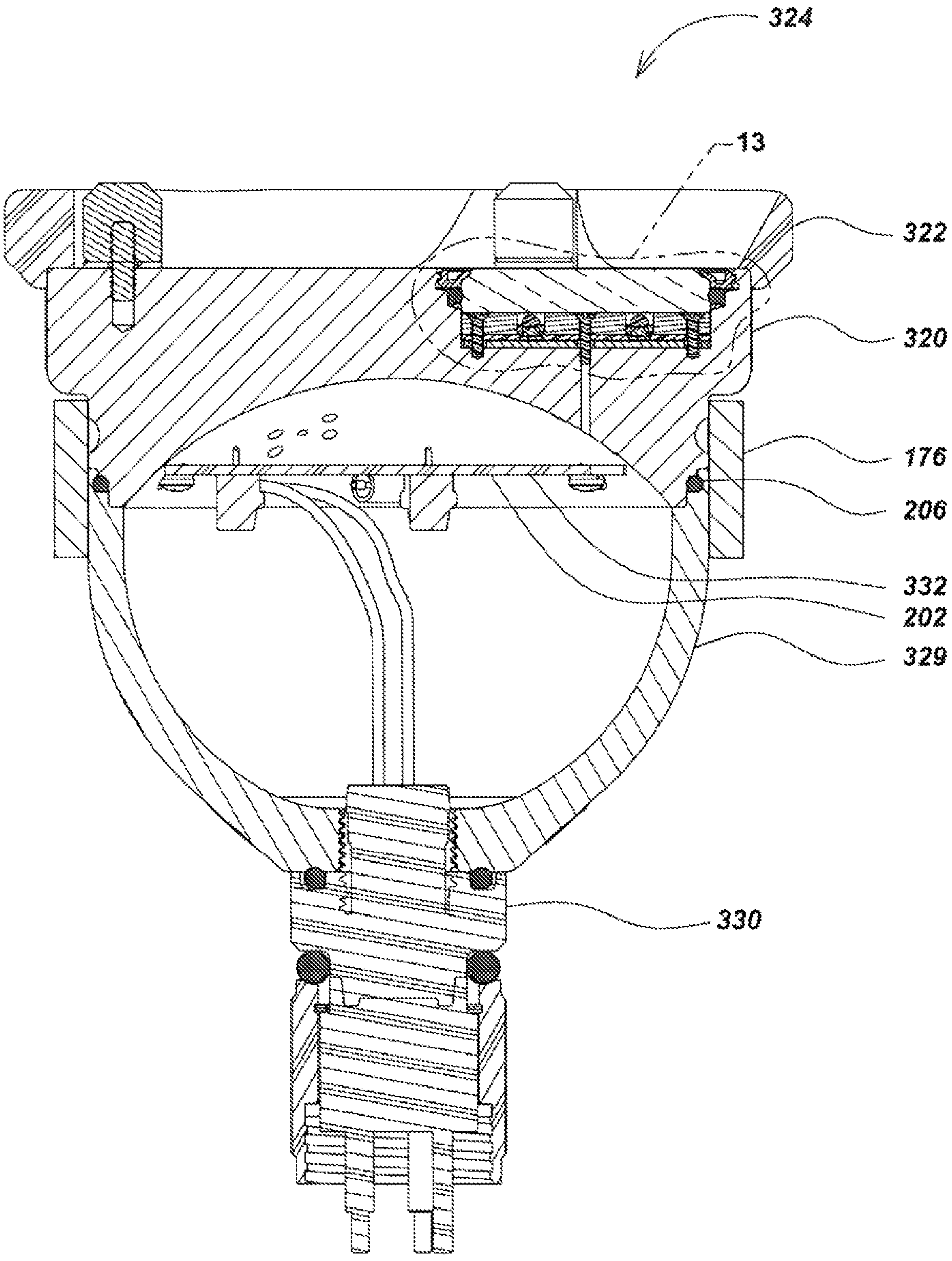
FIG. 31 is a vertical section view of the remote triple light head taken along line 31-31 of FIG. 30.

Referring to FIG. 31, the remote triple light head 324 includes the triple light head body 320 attached to a rear pressure housing 329, held together by the coupling collar 176, and sealed by the pressure resistant housing O-ring 206. A remote light head underwater electrical connector 330 connects the remote triple light head 324 to the remote triple electronic driver assembly 326 through the connecting electrical cable 328, as illustrated in FIG. 30. Power is brought into the interior of the remote triple light head 324 through the remote light head underwater electrical connector 330 and delivered to an interface control board 332. The interface control board 332 distributes power to each of the three multilayer stack 214 assemblies, which are illustrated in FIG. 13. The interface control board 332 also contains the FET based thermal cut-out switch circuit 202 which monitors the temperature of the remote triple light head 324, and shuts off the power if an over-temperature threshold has been exceeded. Interface control board 332 may contain three separate FET based thermal cut out switch circuits 202 separately controlling each of the three multilayer stack 214 assemblies. The temperature cut out point for each of these thermal cut out circuits 202 may be set to cascade turning off one after another as the temperature rises. For example, the first cut out switch might operate at 60C, the next at 65C and third at 70C, allowing at least partial sustained operation at elevated temperatures. As described in connection with FIG. 20A, an alternate embodiment of the FET based thermal cut-out switch circuit 202 provides a power line communications (PLC) scheme from the remote triple light head 324 to the remote triple electronic driver assembly 326 inside the remote triple electronic driver assembly 326, thus creating a remote automatic dimming control capability. The scheme uses either a modulated or digitally superimposed signal generated in the remote triple light head 324 to control a dimming circuit within the remote triple electronic driver assembly 326. In addition, the interface control board 332 provides reverse voltage protection for the LEDs 128, in the event the connecting electrical cable 328 is plugged in backwards. As described in connection with FIG. 29, the plastic bumper guard 322 is attached to the triple light head body 320.

Figure 32:
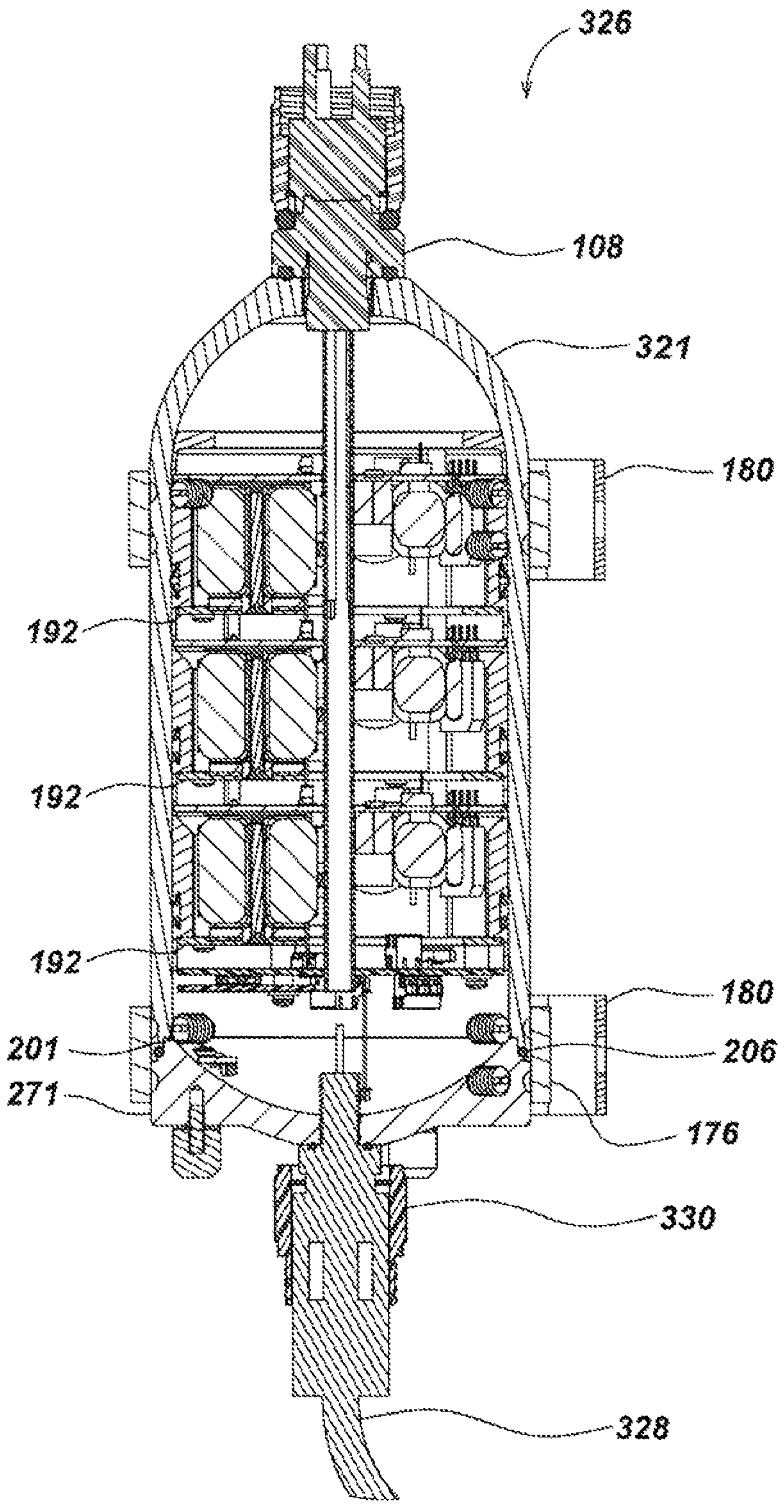
FIG. 32 is a vertical section view of the remote triple electronic driver assembly taken along line 32-32 of FIG. 30.

FIG. 32 illustrates the pressure resistant housing blank end cap 271 mated to the pressure resistant driver housing 321. The remote light head underwater electrical connector 330 connects the three electronic driver subassemblies 192 to the remote triple light head 324 of FIG. 31 through the connecting electrical cable 328. The underwater electrical connector 108 connects the remote triple electronic driver assembly 326 to an electrical power source (Not illustrated). The pair of mounts 180 allows for attachment of the remote triple electronic driver assembly 326 to a larger underwater structure, in the manner described in connection with FIG. 27. As described in connection with FIG. 12, the plurality of ball tipped glass-filled nylon screws 178 (not illustrated) are used with the coupling collar 176 to align and restrain the pressure resistant housing blank end cap 271 to the pressure resistant driver housing 321. The pressure resistant housing O-ring 206 provides a seal, preventing seawater from entering the interior. The thermal sensor board 201, measures the temperature of the remote triple electronic driver assembly 326 as part of the plurality of electronic driver subassemblies 192. As fully described in FIG. 11, the plurality of electronic driver subassemblies 192 each contain an integrated thermal sensor to self-monitor their individual temperatures. If an overheat condition were to occur in any single electronic driver subassembly 192, it would roll back the current delivered to the remote triple light head 324, thereby lowering the heat developed by the plurality of electronic driver subassemblies 192.

Figure 33:
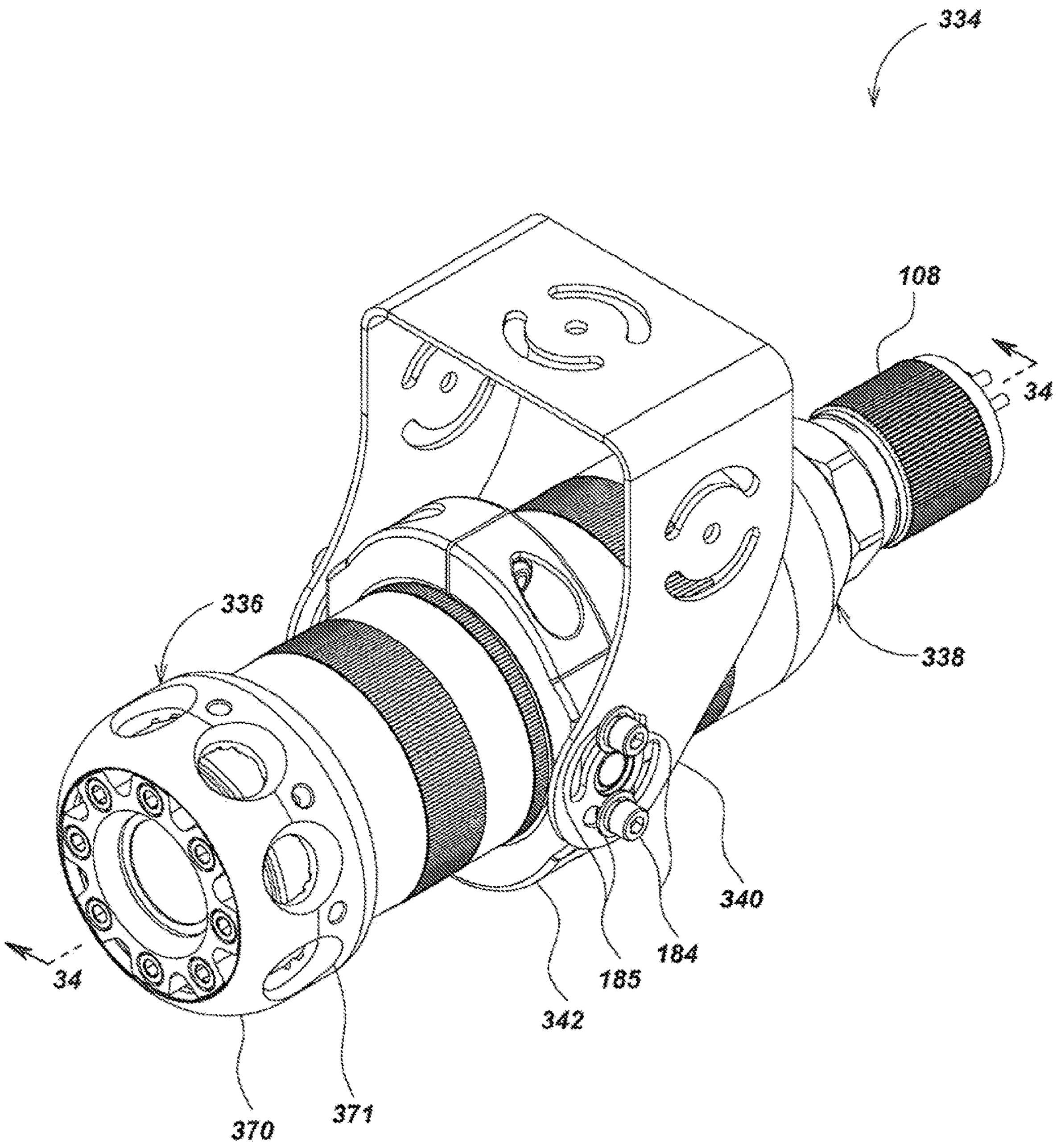
FIG. 33 is an isometric view of the exterior of an alternate embodiment of the present invention in the form of a mid-size LED light.

FIG. 33 illustrates an alternate embodiment of the present invention in the form of a mid-size LED light fixture 334, which is comprised of a light head subassembly 336, an electronics driver subassembly 338, the underwater electrical connector 108, a mount 340, a housing clamp 342, the plurality of retaining screws 184, and the plurality of retaining screw flat washers 185. Angular adjustment of the mid-size LED light fixture 334 with respect to the mount 340 is accomplished by loosening the plurality of retaining screws 184, rotating the mid-size LED light fixture 334 within the angular range possible by the slots cut into the mount 340, then retightening the plurality of retaining screws 184. A plurality of circular openings 371 is visible in a cowl 370, which are used to improve water flow for cooling.

Figure 34:
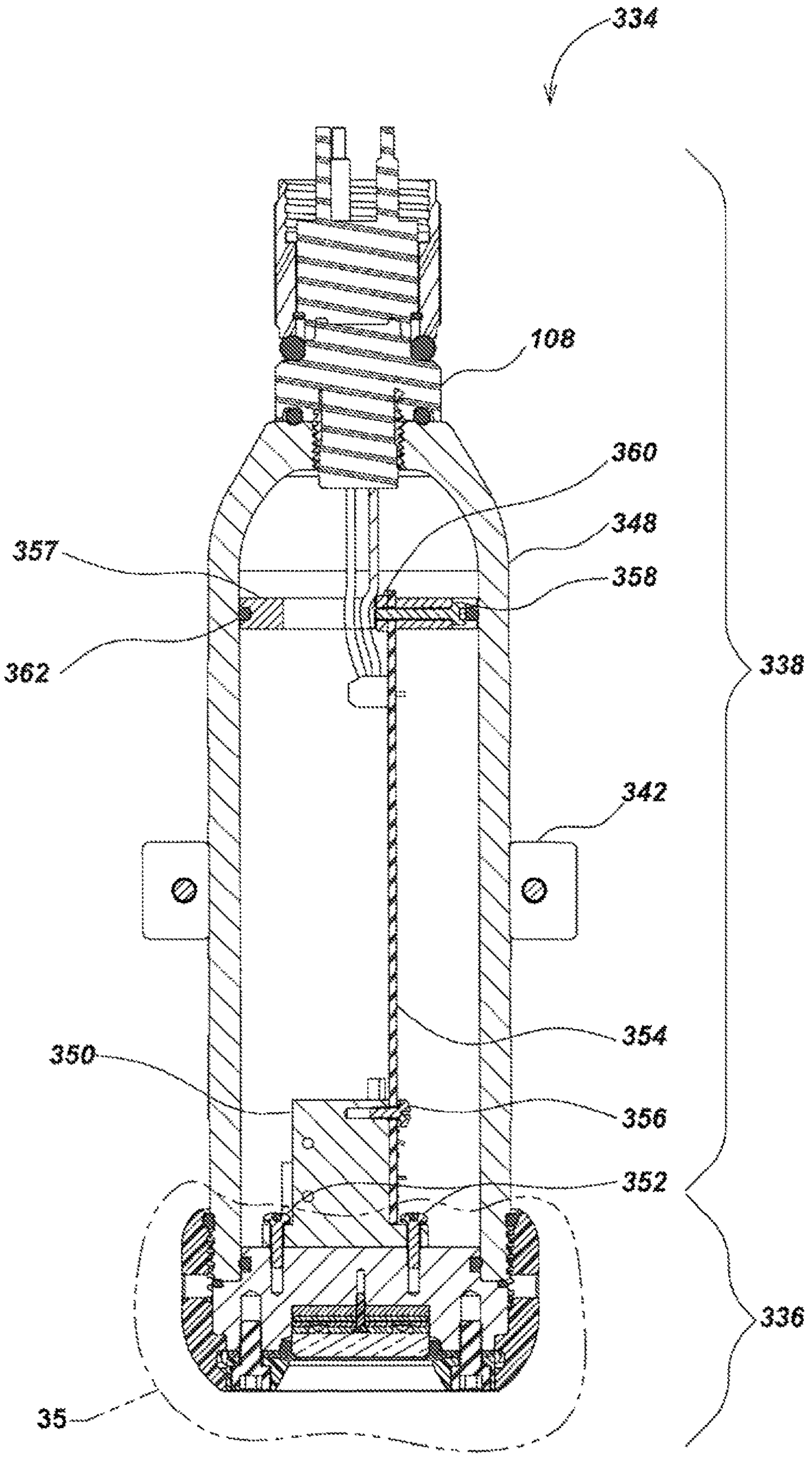
FIG. 34 is a vertical section view of the mid-size LED light fixture taken along line 34-34 of FIG. 33.

FIG. 34 illustrates further details of the mid-size LED light fixture 334. These include the light head subassembly 336 and the electronics driver subassembly 338. The light head subassembly 336 is attached to an interior mounting flange 350 by a plurality of light head interior screws 352. An electronic driver printed circuit board 354 is attached to the interior mounting flange 350 by means of a PCB screw 356. The opposite end of the electronic driver printed circuit board 354 is fastened to a support ring 357 by a long screw 358 and a hex nut 360. A cushion O-ring 362 is used as a compliant interface between the support ring 357 and a driver pressure housing 348. The underwater electrical connector 108 provides an attachment to an external electrical power supply. The housing clamp 342 provides attachment to a larger structure as described in connection with FIG. 33.

Figure 35:
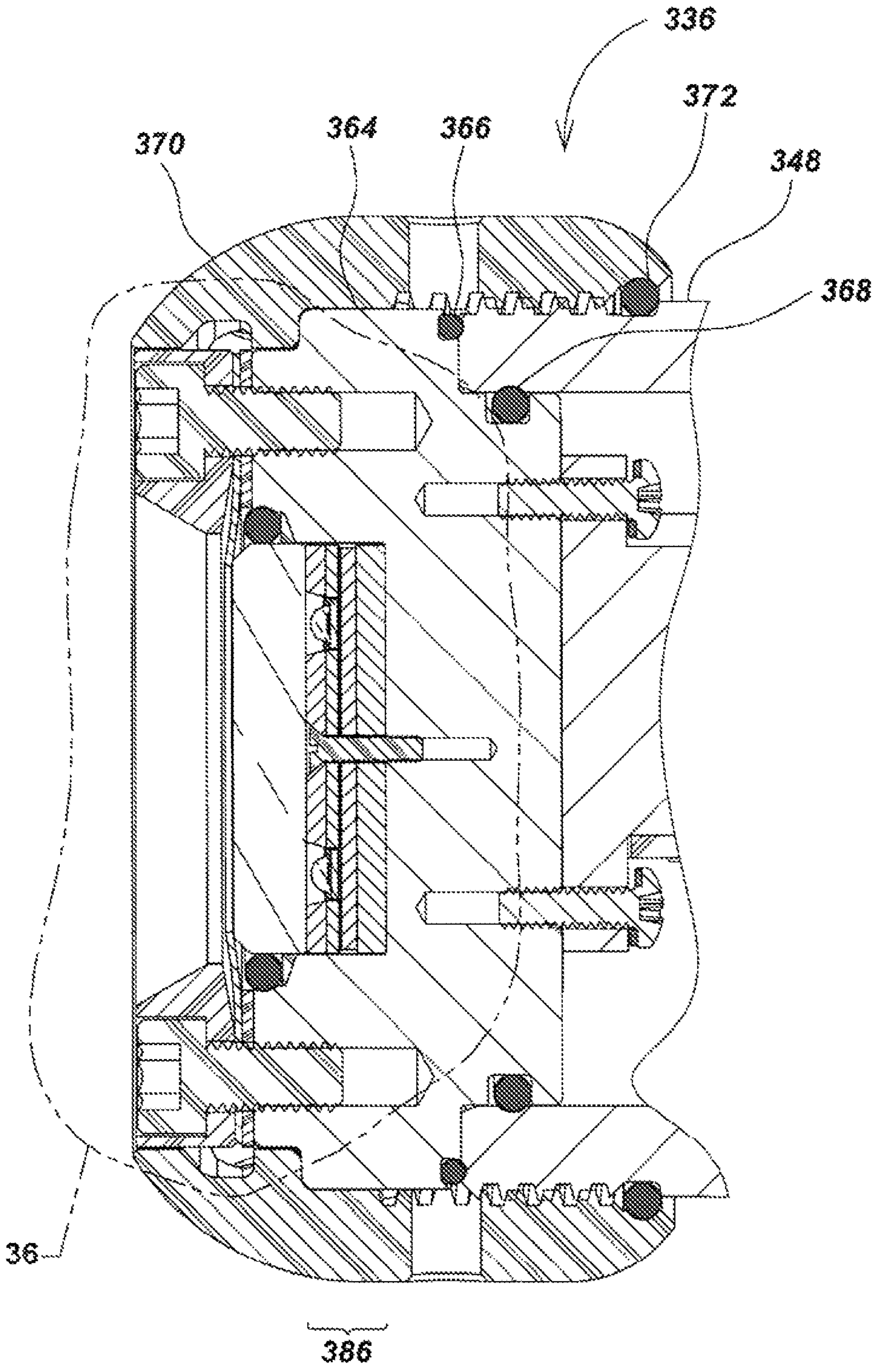
FIG. 35 is an enlarged fragmentary view of a portion of FIG. 34 illustrating one embodiment of the multilayer stack.

FIG. 35 illustrates an alternate embodiment of the present invention in the form of a multilayer stack 386 in the light head subassembly 336. The cowl 370 presses a light head body 364 against the driver pressure housing 348. A face seal O-ring 366 provides the primary seal, while a radial seal O-ring 368 provides a secondary seal, preventing seawater from entering the interior of the light body. A friction O-ring 372 is used to prevent the cowl 370 from rotating loose from the driver pressure housing 348.

Figure 36:
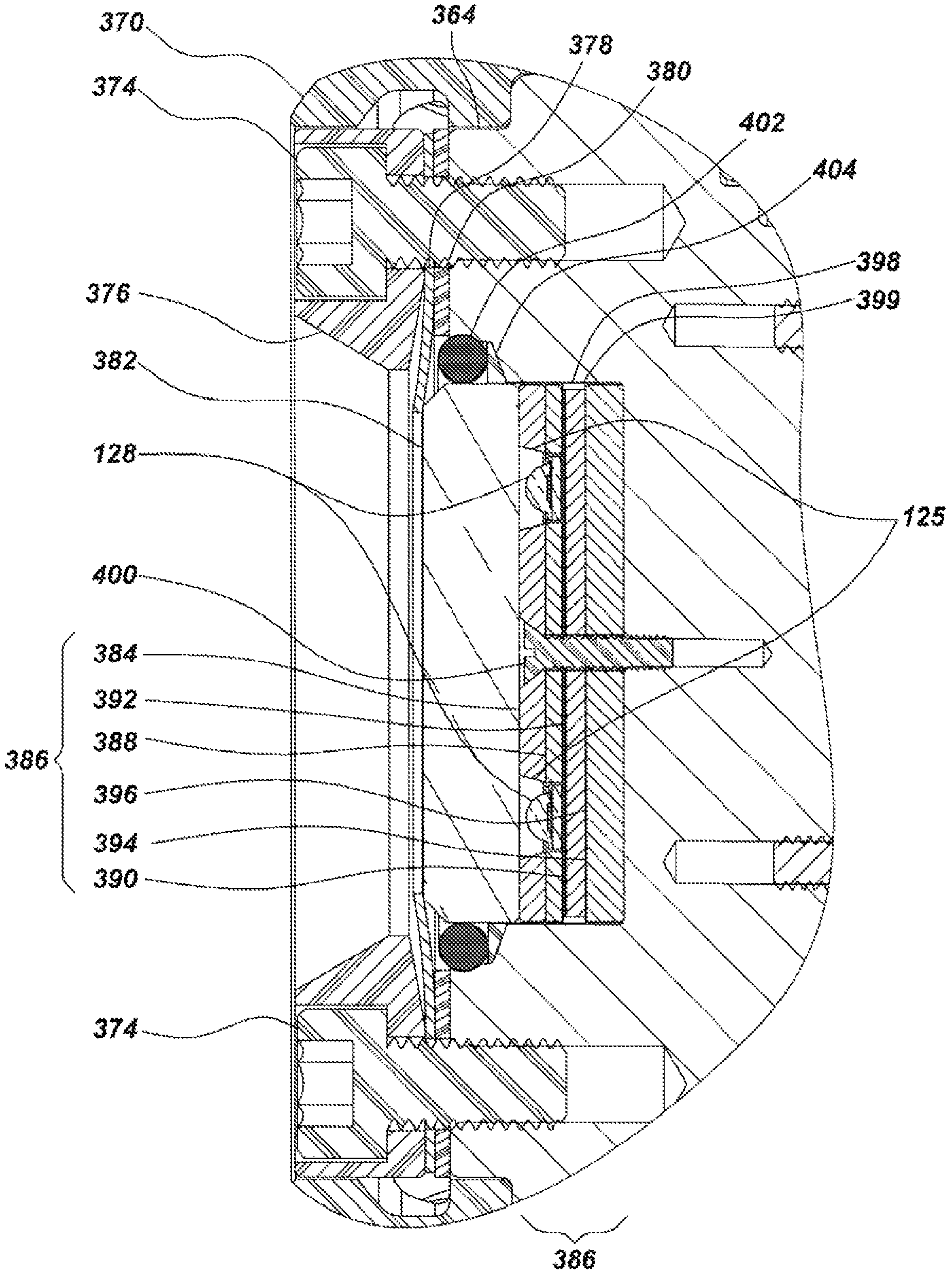
FIG. 36 is an enlarged fragmentary view of a portion of FIG. 35.

Referring to FIG. 36, the cowl 370 engages the light head body 364. The multilayer stack 386 consists of a window support plate 384, an LED spacer 388, a front Kapton sheet 390, a light engine printed circuit board 392, a rear Kapton sheet 394, and an anodized aluminum spacer 396. A recessed flathead screw 400 holds the multilayer stack 386 in the light head body 364. The light engine printed circuit board 392 is populated with the plurality of LEDs 128. Load imposed by external pressure on a sapphire window 382 is transferred directly through the multilayer stack 386 to the light head body 364. Pressure is carried around the plurality of LEDs 128 which is centered inside the plurality of apertures 125 in the window support plate 384, the LED spacer 388, and the front Kapton sheet 390.

The multilayer stack 386 (FIG. 36) is pre-loaded in compression by a titanium convex flat spring 378 that engages the sapphire window 382 on its inside diameter, and rests on a plastic galvanic insulator 380 on its outer diameter. The titanium convex flat spring 378 is pressed on a circle midway between it's inside diameter and outside diameter by a front retainer ring 376 energized by a plurality of head screws 374. As the plurality of head screws 374 are tightened, the compressive force on the multilayer stack 386 is increased by the downward force imposed by the titanium convex flat spring 378. In addition, the titanium convex flat spring 378 captures and compresses a window sealing O-ring 402 and a tapered sealing wedge 404 behind the sealing O-ring 402. The tapered sealing wedge 404 is forced to engage the outer edge of the sapphire window 382, and acts as a compression seal. A Kapton collar 398 and an air gap 399 provide two additional layers of electrical insulation between the anodized light head body 364 and the light engine printed circuit board 392.

Figure 37:
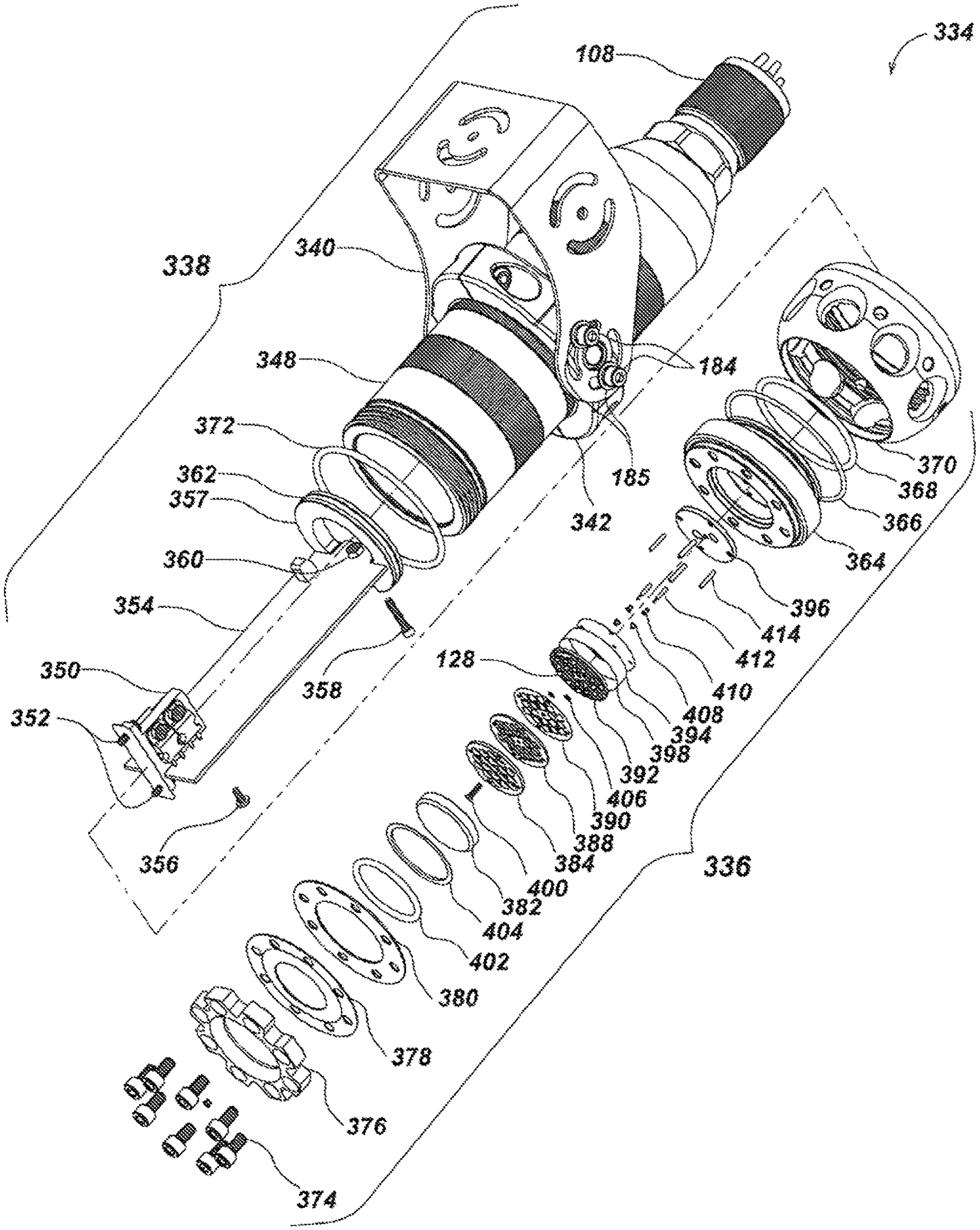
FIG. 37 is an isometric exploded view of the mid-size LED light fixture of FIG. 33.

Referring to FIG. 37, the mid-size LED light fixture 334 includes the light head subassembly 336 and the electronics driver subassembly 338. Additionally illustrated are the plurality of head screws 374, the front retainer ring 376, the titanium convex flat spring 378, and the plastic galvanic insulator 380. FIG. 37 also illustrates the window sealing O-ring 402, the tapered sealing wedge 404, the sapphire window 382, and the recessed flathead screw 400. FIG. 37 also illustrates the window support plate 384, the LED spacer 388, the front Kapton sheet 390, and a plurality of copper washers 406. FIG. 37 also illustrates the light engine printed circuit board 392 populated with the plurality of LEDs 128. FIG. 37 also illustrates the Kapton collar 398, the rear Kapton sheet 394, a plurality of plastic flanged washers 408, and a plurality of copper rivets 410. FIG. 37 also illustrates a plurality of electrical contact pins 412 jacketed in an extra layer of heat shrink tubing 414, the anodized aluminum spacer 396, the light head body 364, the face seal O-ring 366, and the radial seal O-ring 368. FIG. 37 also illustrates the cowl 370, the light head interior screws 352, the interior mounting flange 350, and the PCB screw 356. FIG. 37 also illustrates the electronic driver printed circuit board 354, the long screw 358, the hex nut 360, the support ring 357, the cushion O-ring 362, and the friction O-ring 372. FIG. 37 also illustrates the driver pressure housing 348, the mount 340, the housing clamp 342, the plurality of retaining screws 184, the plurality of retaining screw flat washers 185, and the underwater electrical connector 108.

The embodiments described above are well suited for use on manned and un manned submersible vehicles that can descend to significant depths, e.g. 1,500 meters and more. At these depths there is no ambient light, the ambient water temperature is near 32 degrees F. and pressures exceed 3,000 PSI. The submersibles may rest on the deck of a ship traveling in icy waters where the ambient air temperature may be well below 32 degrees F.

Figure 38:
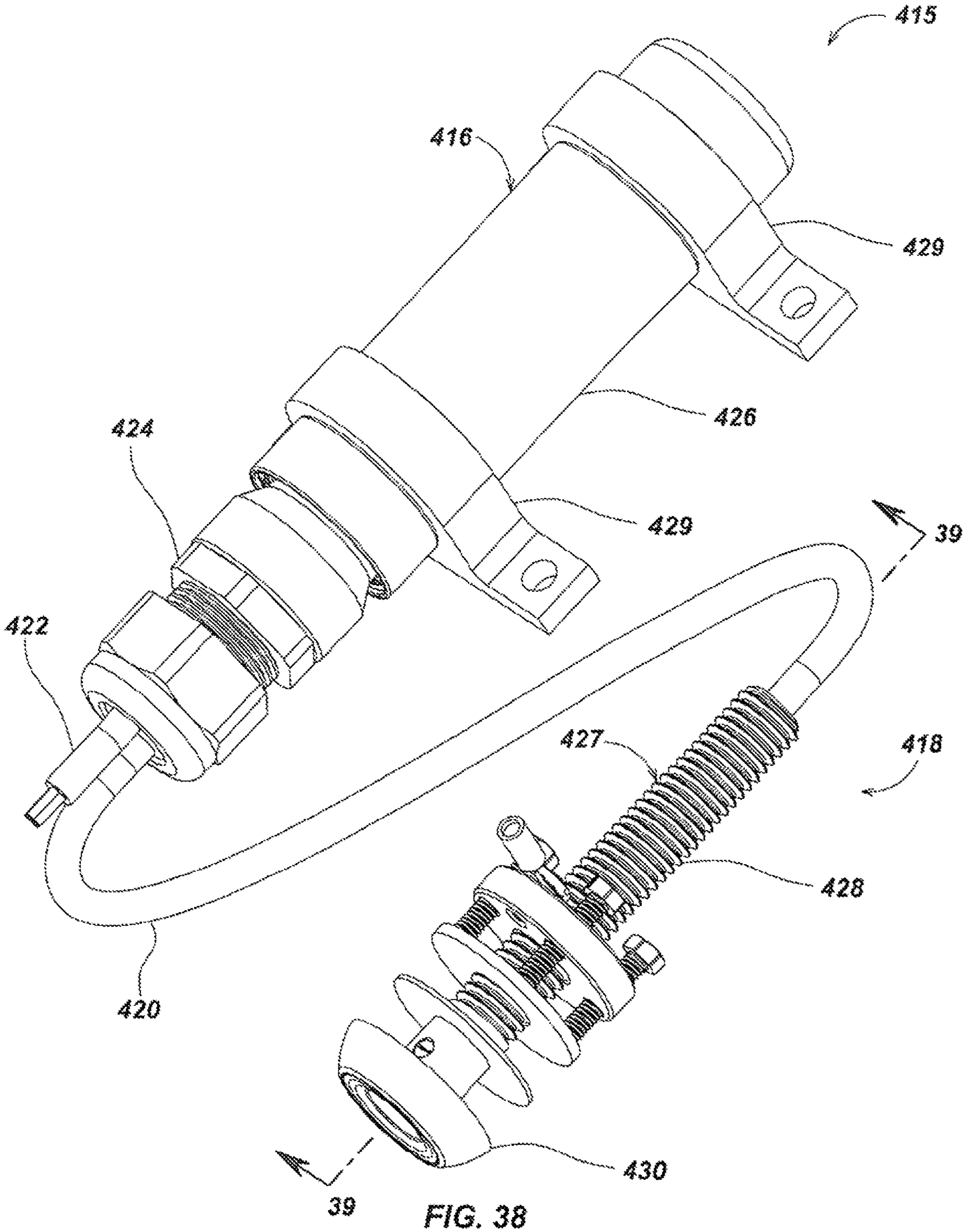
FIG. 38 is an isometric view of the exterior of an alternate embodiment of the present invention in the form of a boat thru-hull light fixture.

FIG. 38 illustrates an alternate embodiment of the present invention in the form of a boat thru-hull light fixture 415, comprised of a driver electronics module 416, and a remote thru-hull light head 418 connected by a light head electrical cable 420. A thru-hull flanged threaded housing 427 is a single piece, but functionally comprised of a threaded body 428, and a thru-hull flanged light head 430. Electrical power is delivered to the driver electronics module 416 by a power input electrical cable 422. Both the power input electrical cable 422 and the light head electrical cable 420 pass through a waterproof compression fitting 424 that is fitted to one end of a driver electronics module housing 426. A plurality of brackets 429 allows the driver electronics module 416 to be conveniently restrained inside a vessel.

Figure 39:
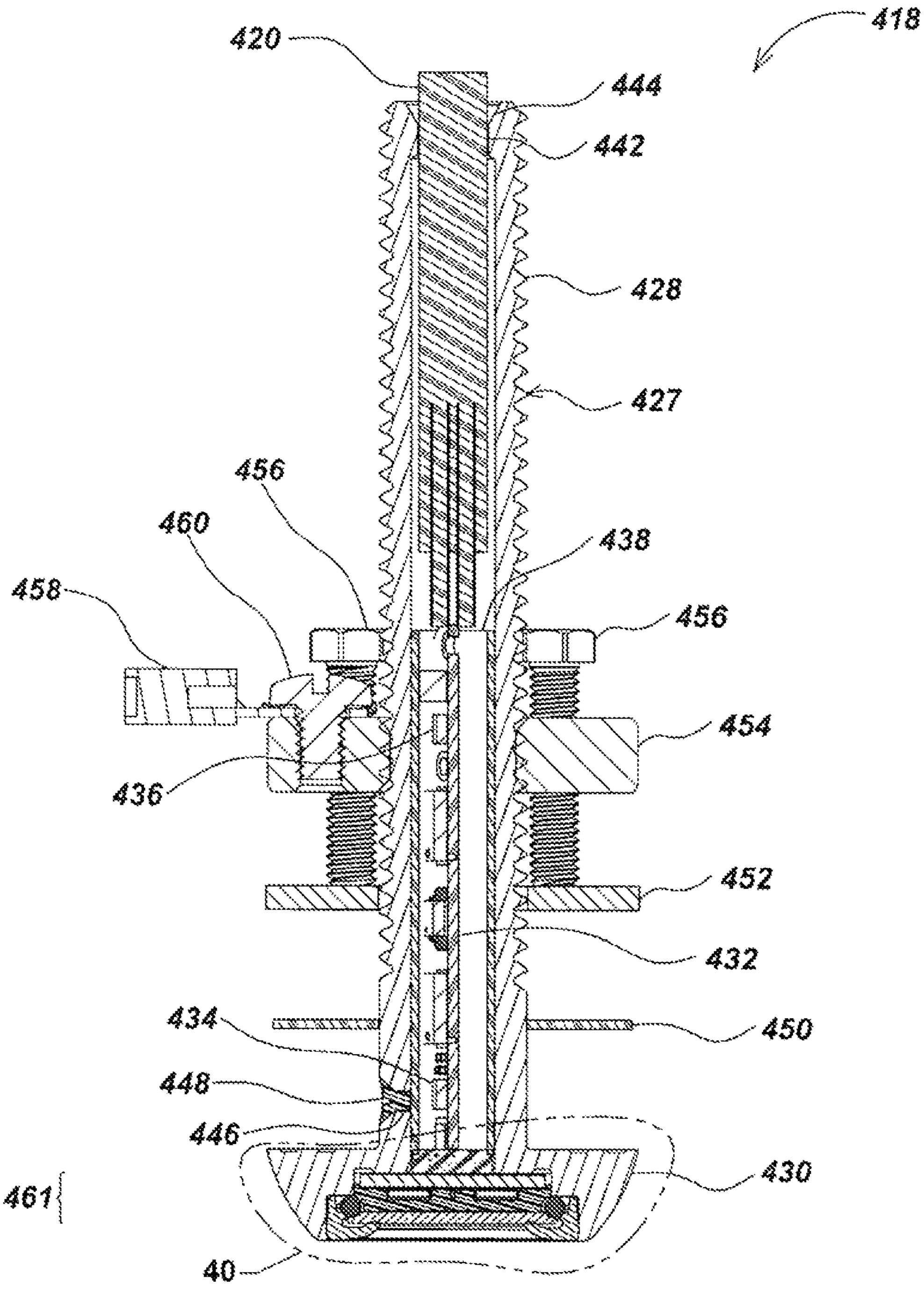
FIG. 39 is a vertical section view taken along line 39-39 of FIG. 38.

Referring to FIG. 39, the thru-hull flanged threaded housing 427 is illustrated as a single piece, functionally divided into the threaded body 428, and the thru-hull flanged light head 430, made of a material possessing a high coefficient of heat transfer. Such materials include, but are limited to, copper, brass, aluminum, aluminum alloy and some plastics which incorporate specific fillers and modifiers that permit high heat transfer. The thru-hull flanged light head 430 contains a multilayer stack 461, better described in FIG. 40. The center of the thru-hull flanged threaded housing 427 is hollow. A thermal sensing printed circuit board 432 is inserted into this space, and connects the thru-hull flanged light head 430, described in detail in connection with FIG. 40, to the light head electrical cable 420. The thermal sensing printed circuit board 432 contains a forward thermal sensor 434 immediately behind the thru-hull flanged light head 430, and a rear thermal sensor 436, positioned in the middle of the threaded body 428. The design of the thru-hull light fixture 415 permits the driver electronics module 416, illustrated in FIG. 38, to constantly monitor temperature at both the thru-hull flanged light head 430, where heat is largely generated, and inboard, where excess radiant heat may pose a hazard to personnel. The driver electronics module 416 can determine safe levels at these independent locations, and reduce electrical current to the thru-hull flanged light head 430 to achieve a safe operating condition. A layer of electrically insulating shrink tubing 438 protects the thermal sensing printed circuit board 432 from electrically shorting to the thru-hull flanged threaded housing 427. The light head electrical cable 420 passes from the rear of the thru-hull flanged threaded housing 427 through a portion with a smaller inside diameter 442. This region then flares outward to form a conic section 444. Epoxy (not illustrated) is pumped into the center of the thru-hull flanged threaded housing 427 through a fill port 446 located on the threaded body 428 just behind the thru-hull flanged light head 430. The epoxy is forced through the center of the thru-hull flanged threaded housing 427 until it exits out the back of the fitting, past the portion of the housing with the smaller inside diameter 442 and filling the conic section 444. A flat head fill port screw 448 seals the fill port 446 after the epoxy fill operation is complete. This action seals the thermal sensing printed circuit board 432 from the damaging effects of moist marine air, inadvertent splash or shallow water immersion, and additionally provides a strain relief between the light head electrical cable 420 and the thru-hull flanged threaded housing 427, the light head electrical cable 420 and the thermal sensing printed circuit board 432 internal to the thru-hull flanged threaded housing 427.

The thru-hull flanged threaded housing 427 is mounted to a boat hull by first drilling a hole through the boat hull (not illustrated) of a diameter large enough to pass the threaded body 428 of the thru-hull flanged threaded housing 427. A compressible rubber gasket 450 seals the thru-hull flanged light head 430 to the outside surface of the boat hull. Alternately a marine adhesive may be used. On the inside of the boat hull, an internally threaded jacking ring 454 is fitted with a plurality of jacking screws 456, that pass through and engage a jacking plate 452. The jacking ring 454 is installed on the threads of the thru-hull flanged threaded housing 427 from the inside of the vessel and screwed down until the jacking plate 452 engages the interior surface of the boat hull. A socket wrench (not illustrated) is used to drive the plurality of jacking screws 456 in a direction that presses down on the jacking plate 452. The jacking ring 454 cannot rotate with this axial application of force. An increasing clamping force is applied until a watertight seal is achieved. A bonding screw 460 and a bonding wire 458 are supplied to properly attach the remote thru-hull light head 418 to the vessel's corrosion protection system.

Figure 40:
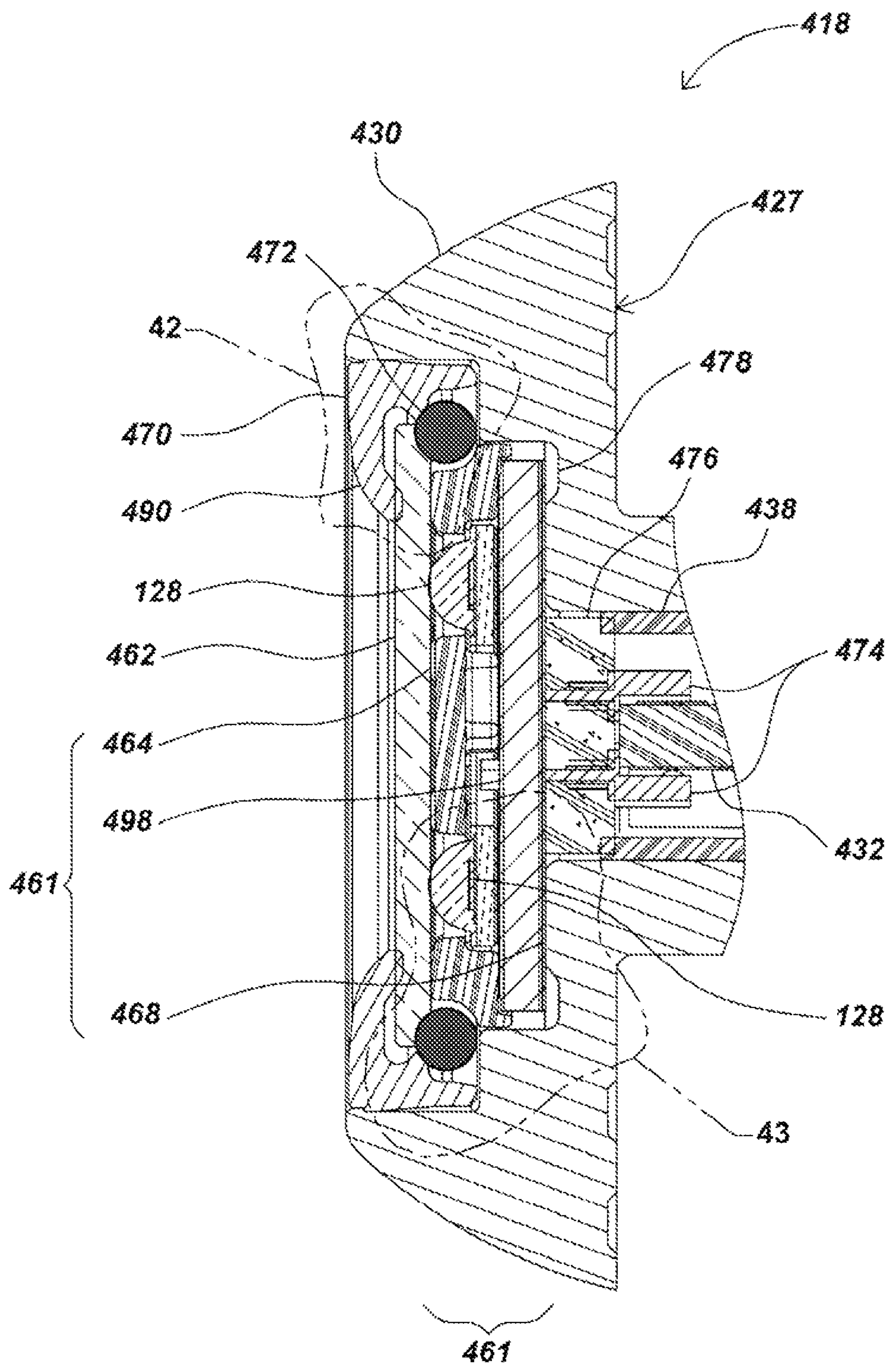
FIG. 40 is an enlarged fragmentary section view of a portion of FIG. 39 illustrating one embodiment of the multilayer stack.

Referring to FIG. 40, the multilayer stack 461 of the remote thru-hull light head 418 includes a window support plate 464, a double-sided metal core printed circuit board (DS-MCPCB) 498, and a rear phase change material (PCM) sheet 468. The DS-MCPCB 498 is preferentially a copper or an aluminum metal core, with both the front and rear faces clad first in a thin electrical dielectric and then with copper clad, better illustrated in FIG. 43. The DS-MCPCB 498 is populated with the plurality of LEDs 128. The multilayer stack 461 is positioned within the thru-hull flanged light head 430. A sapphire window 462 presses the multilayer stack 461, forcing it into contact with the interior of the thru-hull flanged light head 430. The sapphire window 462 and the multilayer stack 461 are held firmly by a press fit ring 470 with a flexible inner rim 490 that contacts the sapphire window 462, better illustrated in FIG. 42. The press fit ring 470 additionally energizes a front sealing O-ring 472 by compressing it under the sapphire window 462. A plurality of electrical contacts 474 pass through a foam block 476 to connect the DS-MCPCB 498 populated with the plurality of LEDs 128, to the thermal sensing printed circuit board 432 and power from the driver electronics module 416 carried by the light head electrical cable 420 as illustrated in FIG. 39. The shrink tubing 438 protects the thermal sensing printed circuit board 432 from electrically shorting to the thru-hull flanged threaded housing 427.

The rear PCM sheet 468 electrically isolates but thermally connects the DS-MCPCB 498 to the thru-hull flanged threaded housing 427. This permits heat to be drawn off the back of the plurality of LEDs 128 and routed to the cooler surrounding environment. Additionally, the rear PCM sheet 468 seals any gaps between the DS-MCPCB 498 and the thru-hull flanged light head 430, and prevents the epoxy fill described in FIG. 39 from entering into the space where the plurality of LEDs 128 are located. An outer groove 478, machined into the interior face of the thru-hull flanged light head 430, together with the plastic window support plate 464, provide an air gap electrical insulator around and under the DS-MCPCB 498 and the thru-hull flanged threaded housing 427, better illustrated in FIG. 43. Load imposed by external pressure or wave slap on the sapphire window 462 is transferred directly through the multilayer stack 461 to the thru-hull flanged light head 430.

Figure 41:
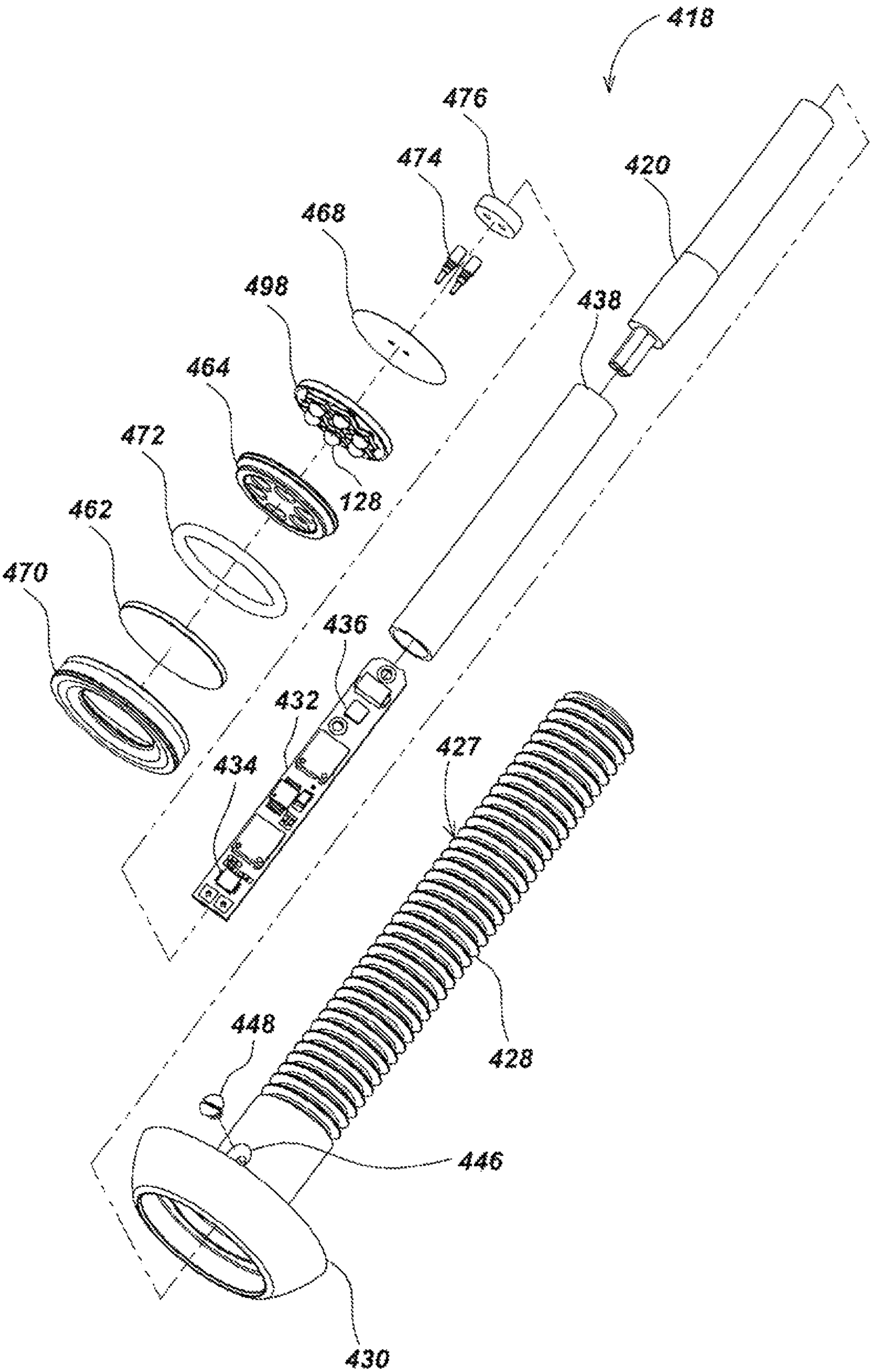
FIG. 41 is an isometric exploded view of the boat thru-hull light fixture of FIG. 38.

Referring to FIG. 41, the remote thru-hull light head 418 includes the press fit ring 470, the sapphire window 462, the front sealing O-ring 472, the window support plate 464, the DS-MCPCB 498 populated with the plurality of LEDs 128. The rear PCM sheet 468, the plurality of electrical contacts 474, and the foam block 476 are also illustrated in FIG. 41. This figure also illustrates the thermal sensing printed circuit board 432 with the forward thermal sensor 434 and the rear thermal sensor 436. Also visible in FIG. 41 are the shrink tubing 438, the light head electrical cable 420, the fill port 446, the fill port screw 448, and the thru-hull flanged threaded housing 427. The thru-hull flanged threaded housing 427 is a single piece, functionally divided into the threaded body 428, and the thru-hull flanged light head 430. In an alternate embodiment, the threaded body 428 and the thru-hull flanged light head 430 may be separate pieces that are welded or brazed to create the single thru-hull flanged threaded housing 427.

Figure 42:
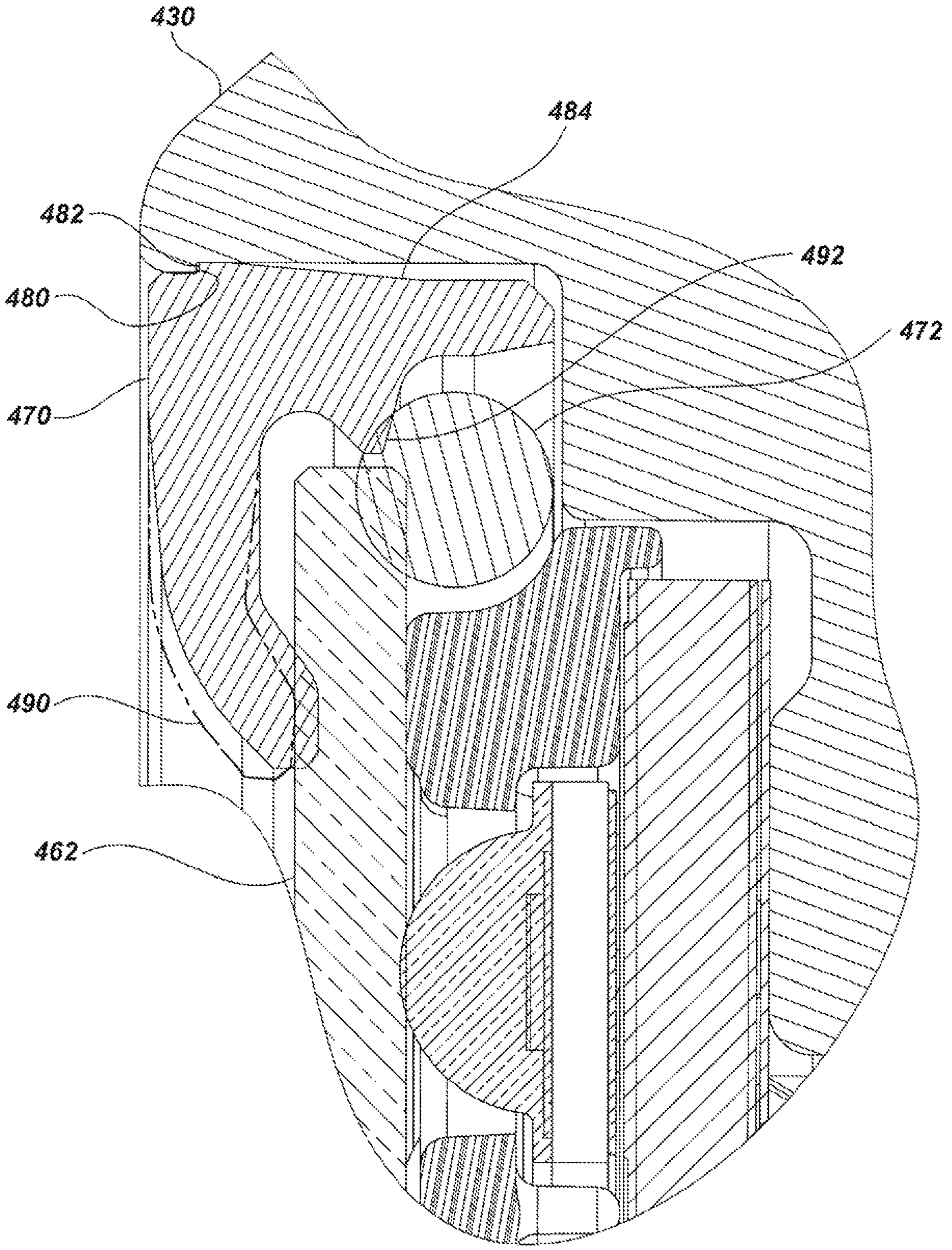
FIG. 42 is an enlarged fragmentary section view of a portion of FIG. 40 illustrating a window assembly utilizing a press fit ring.

FIG. 42 illustrates an undercut snap edge 480 and a chamfer 484 of the press fit ring 470. The chamfer 484 provides a means to align the press fit ring 470 within the inside diameter of a stepped inside edge 482 that is part of the thru-hull flanged light head 430. On assembly, the press fit ring 470 is forced axially inward until the undercut snap edge 480 is forced past the stepped inside edge 482. Upon release the two square edges of the undercut snap edge 480 and the stepped inside edge 482 engage and lock, creating a strong snap fit that captures the press fit ring 470 in position. This design creates a very flat, low profile structure that is advantageous to the function of the remote thru-hull light head 418 illustrated in FIG. 38. The flexible rim 490 of the press fit ring 470 is illustrated in its unflexed (solid line) and flexed positions (dotted line). The press fit ring 470 is preferentially made of a hard or half hard copper alloy. The flexible rim 490 is flexed within its elastic limit and will maintain the clamping pressure indefinitely. The flexible rim 490 also allows for stack height tolerances of the multilayer stack 461, as detailed in FIG. 40. The window 462 is positioned within a window centering ring 492 of the press fit ring 470. The window 462 compresses and energizes the O-ring 472 on assembly.

Figure 43:
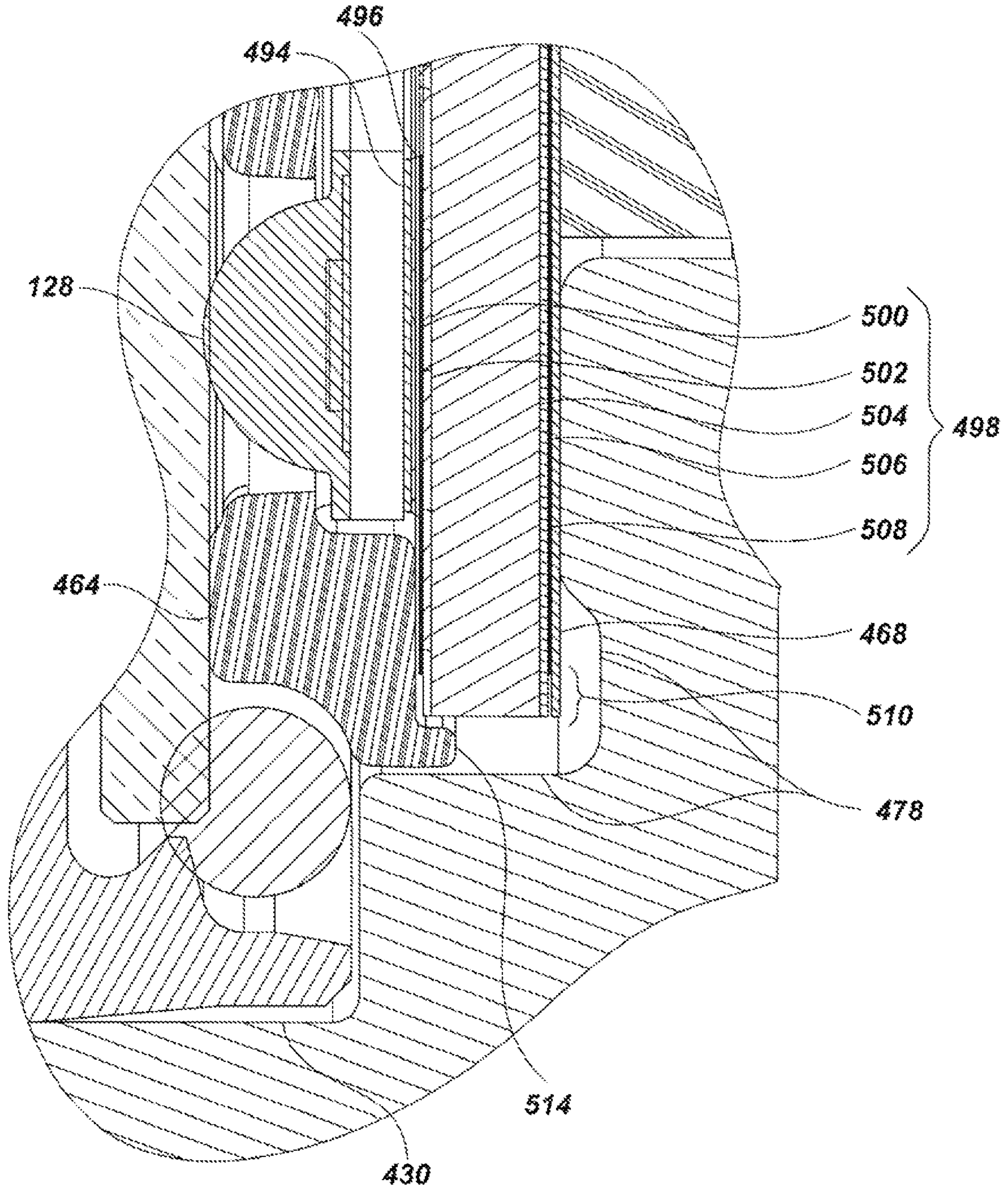
FIG. 43 is an enlarged fragmentary section view of a portion of FIG. 40 illustrating the double electrical isolation of the LED electrical circuit and the boat thru-hull light fixture housing.

FIG. 43 illustrates the construction and application of the double-sided metal core printed circuit board (DS-MCPCB) 498 in an embodiment of the present invention. The DS-MCPCB 498 is seen to be comprised of a top copper circuit 500, a top dielectric layer 502, a metal core of copper or aluminum 504, a bottom dielectric layer 506, and a bottom copper clad 508. The plurality of LEDs 128 are made with a plurality of electrically conductive pads 494 to permit the devices to be attached the top copper circuit 500 by means of a plurality of solder junctions 496 for electrical power and heat dissipation. As fully described in FIG. 40, the rear Phase Change Material (PCM) sheet 468 electrically isolates but thermally connects the DS-MCPCB 498 to the thru-hull flanged light head 430.

Turning again to FIG. 43, a means of providing multiple layers of electrical insulation between the top copper circuit 500 and the thru-hull flanged threaded housing 427 is illustrated. The top copper circuit 500 carries electrical current to the plurality of LEDs 128. The DS-MCPCB 498 is centered within the thru-hull flanged threaded housing 427 by a DS-MCPCB centering ring 514, a feature of the window support plate 464, which is molded from a non-DEEP electrically conductive high strength plastic. The DS-MCPCB centering ring 514 captures the edge of the DS-MCPCB 498, preventing it from contacting the interior wall of the thru-hull flanged light head 430. The top copper circuit 500 and the bottom copper clad 508 are recessed from the edge of the DS-MCPCB 498 by a set-back 510. The set-back 510 prevents the top copper circuit 500, which carries electrical power, from contacting the interior face of the thru-hull flanged light head 430 by both the insulation properties of the plastic DS-MCPCB centering ring 514, and an air gap caused by the set-back 510. In addition, the set-back 510 increases the isolation distance between the edge of the top copper circuit 500, the edge of the bottom copper clad 508, and the edge of the metal core 504.

Triple electrical isolation from the plurality of LEDs 128 to the back wall of the thru-hull flanged light head 430 is achieved by the top dielectric layer 502, the bottom dielectric layer 506, and the rear Phase Change Material (PCM) sheet 468. The bottom copper clad 508 provides improved thermal connection to the thru-hull flanged light head 430. Additionally, the groove 478 creates an air gap that provides electrical isolation of the DS-MCPCB 498 from the interior wall of the thru-hull flanged light head 430. This double insulation increases the operational safety of the remote thru-hull light head 418 of FIG. 38. Additionally, the bottom copper clad 508 extends slightly into groove 478 to avoid pressing the edge of the bottom copper clad 508 through the bottom dielectric layer 506 and into the metal core 504, creating a more reliable structure.

While various embodiments of the present multilayer LED light fixture have been described in detail, it will be apparent to those skilled in the art that the present invention can be embodied in various other forms not specifically described herein. The innovative structures described herein are applicable to a wide variety of submersible luminaires besides deep submersible LED light fixtures. Therefore, the protection afforded the present invention should only be limited in accordance with the following claims and their equivalents.

We claim:

1. A lighting apparatus for high pressure underwater use, comprising:

a non-pressure compensated housing shaped and sized for withstanding ambient exterior pressure at a water depth of approximately 500 feet or more;

a transparent pressure bearing window positioned at a forward end of the non-pressure compensated housing;

a multilayered stack positioned directly behind and in contact with the transparent pressure bearing window, the multilayer stack comprising:

one or more substantially flat spacers of a high compressive strength material;

an electronic circuit element comprising a thermally conductive printed circuit board (PCB) configured and positioned within the housing behind the transparent pressure bearing window; and a plurality of LEDs mounted on the PCB; and a water-tight seal between the transparent pressure bearing window and the housing;

wherein the one or more substantially flat spacers have holes for allowing light output from the plurality of LEDs to pass through the spacers and to the transparent pressure bearing window, and wherein the one or more substantially flat spacer bear substantially all of the pressure applied to the transparent pressure bearing window by ambient water on the exterior side of the window.

2. The electronics assembly of claim 1, wherein the electronic circuit board is a metal core printed circuit board (MCPCB).

3. The electronics assembly of claim 2, wherein the MCPCB comprises copper.

4. The electronics assembly of claim 2, wherein the MCPCB comprises aluminum.

5. The electronics assembly of claim 1, further including thermal sensor electronics including a temperature sensor for measuring temperature and automatically reducing current applied to the plurality of LEDs when a predetermined temperature is reached.

6. The electronics assembly of claim 1, further comprising one or more reflectors positioned around one or more of the plurality of LEDs.

7. The electronics assembly of claim 6, further comprising one or more lenses positioned around one or more of the plurality of LEDs.

8. The lighting apparatus of claim 1, further including thermal sensor electronics including a temperature sensor for measuring temperature and automatically reducing current applied to the solid state light source when a predetermined temperature is reached.

9. The lighting apparatus of claim 1, further comprising one or more reflectors positioned around one or more of the plurality of LEDs.

10. The lighting apparatus of claim 9, further comprising one or more lenses positioned around one or more of the plurality of LEDs.

11. The lighting apparatus of claim 1, further comprising an underwater electrical connector disposed at or near a rearward end of the housing.

12. The lighting apparatus of claim 1, wherein the multilayer stack further comprises a window retainer assembly positioned to retain the transparent pressure bearing window relative to the housing.

13. The electronics assembly of claim 1, wherein the LEDs include silicone domes and wherein the silicone domes are trimmed to a width equal to or less than a width of the window support spacer.

14. The electronics assembly of claim 1, wherein the electronic circuit board is a double sided metal core printed circuit board (MCPCB).

15. The electronics assembly of claim 1, wherein the multilayer stack further comprises one or more thin layers of Kapton plastic sheets.

16. The apparatus of claim 1, wherein the LEDs are domed LEDs and no spherical lens element is positioned in front of the LEDs.

17. The apparatus of claim 1, wherein the housing comprises a thermally conductive metal and a portion of the thermally conductive PCB is in thermal contact with the housing.

18. The apparatus of claim 17, wherein the PCB comprises an MCPCB.

19. A lighting apparatus for high pressure underwater use, comprising:

a non-pressure compensated housing shaped and sized for withstanding ambient exterior pressure at a water depth of approximately 500 feet or more;

a transparent pressure bearing window positioned at a forward end of the non-pressure compensated housing;

a multilayered stack positioned directly behind and in contact with the transparent pressure bearing window, the multilayer stack comprising:

one or more substantially flat spacers of a high compressive strength material;

an electronic circuit element comprising a thermally conductive printed circuit board (PCB) configured and positioned within the housing behind the transparent pressure bearing window; and a plurality of LEDs mounted on the PCB; and a water-tight seal between the transparent pressure bearing window and the housing;

wherein the one or more substantially flat spacers have holes for allowing light output from the plurality of LEDs to pass through the spacers and to the transparent pressure bearing window, and wherein the one or more substantially flat spacer bear substantially all of the pressure applied to the transparent pressure bearing window by ambient water on the exterior side of the window, and wherein the LEDs are domed LEDs and no spherical lens element is positioned in front of the LEDs.

* * * * *